US011860694B2

United States Patent
Shin et al.

(10) Patent No.: US 11,860,694 B2
(45) Date of Patent: Jan. 2, 2024

(54) ELECTRONIC DEVICE INCLUDING ROLLABLE DISPLAY

(71) Applicant: SAMSUNG ELECTRONICS CO., LTD., Suwon-si (KR)

(72) Inventors: Moonchul Shin, Suwon-si (KR); Youngmin Kang, Suwon-si (KR); Yeonggyu Yoon, Suwon-si (KR); Seungjoon Lee, Suwon-si (KR); Joongyeon Cho, Suwon-si (KR); Junyoung Choi, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 17/433,404

(22) PCT Filed: Jul. 14, 2021

(86) PCT No.: PCT/KR2021/009046
§ 371 (c)(1),
(2) Date: Aug. 24, 2021

(87) PCT Pub. No.: WO2022/015048
PCT Pub. Date: Jan. 20, 2022

(65) Prior Publication Data
US 2022/0342448 A1    Oct. 27, 2022

(30) Foreign Application Priority Data

Jul. 14, 2020  (KR) .................. 10-2020-0086823
Oct. 7, 2020   (KR) .................. 10-2020-0129528
(Continued)

(51) Int. Cl.
G06F 1/16    (2006.01)

(52) U.S. Cl.
CPC .......... *G06F 1/1652* (2013.01); *G06F 1/1624* (2013.01)

(58) Field of Classification Search
CPC .... G06F 1/1652; G06F 1/1624; G06F 1/1637; H04M 1/0237
See application file for complete search history.

(56) References Cited

U.S. PATENT DOCUMENTS

| 6,771,232 B2 | 8/2004 | Fujieda et al. |
| 7,667,962 B2 | 2/2010 | Mullen |
(Continued)

FOREIGN PATENT DOCUMENTS

| CN | 101370366 | 8/2011 |
| CN | 108259649 | 7/2018 |
(Continued)

OTHER PUBLICATIONS

International Search Report and Written Opinion dated Oct. 12, 2021 in corresponding International Application No. PCT/KR2021/008289.
(Continued)

*Primary Examiner* — Rockshana D Chowdhury
(74) *Attorney, Agent, or Firm* — Nixon & Vanderhye P.C.

(57) ABSTRACT

The disclosure relates to an electronic device including a rollable display, the electronic device including: a first housing; a second housing configured to slide in a first direction from the first housing in a second state and slide in a second direction opposite to the first direction in a first state so as to be coupled to the first housing; a rollable display having a display area varying depending on sliding of the second housing, the rollable display including a first portion visible to the outside in the first state and the second state, and a second portion visible to the outside in the second state, movements of the second portion being guided
(Continued)

by a bendable support; a sliding support configured to slide based on movements of the second housing and support the second portion by supporting the bendable support in the second state; a bracket including a recess providing a space into which the sliding support is configured to slide in the first state; and a support plate disposed above the space to support the first portion.

19 Claims, 39 Drawing Sheets

(30) Foreign Application Priority Data

| Oct. 12, 2020 | (KR) | ......................... 10-2020-0131321 |
| Oct. 12, 2020 | (KR) | ......................... 10-2020-0131459 |
| Feb. 18, 2021 | (KR) | ......................... 10-2021-0022106 |

(56) References Cited

U.S. PATENT DOCUMENTS

| 7,724,508 | B2 | 5/2010 | Bemelmans et al. |
| 8,536,667 | B2 | 9/2013 | de Graff et al. |
| 9,823,697 | B2 | 11/2017 | Hsu et al. |
| 10,209,742 | B2 | 2/2019 | Shin |
| 10,250,729 | B1 | 4/2019 | Jeon et al. |
| 10,684,714 | B2* | 6/2020 | Seo ..................... G06F 1/3218 |
| 10,708,395 | B1 | 7/2020 | Han |
| 10,868,897 | B2 | 12/2020 | Cha et al. |
| 10,936,100 | B2 | 3/2021 | Park et al. |
| 10,990,208 | B2 | 4/2021 | Jung et al. |
| 11,315,443 | B2* | 4/2022 | Han ..................... G06F 1/1652 |
| 2003/0109286 | A1 | 6/2003 | Hack et al. |
| 2003/0218860 | A1 | 11/2003 | Shiraiwa |
| 2004/0183958 | A1 | 9/2004 | Akiyama et al. |
| 2005/0041012 | A1 | 2/2005 | Daniel et al. |
| 2008/0153558 | A1 | 6/2008 | Mifune et al. |
| 2010/0177020 | A1 | 7/2010 | Bemelmans et al. |
| 2011/0051347 | A1 | 3/2011 | Yamagiwa et al. |
| 2012/0314400 | A1 | 12/2012 | Bohn et al. |
| 2013/0058063 | A1 | 3/2013 | O'Brien |
| 2017/0006738 | A1 | 1/2017 | Lee et al. |
| 2018/0077808 | A1 | 3/2018 | Seo et al. |
| 2018/0102072 | A1 | 4/2018 | Lee et al. |
| 2018/0103550 | A1 | 4/2018 | Seo et al. |
| 2018/0164852 | A1 | 6/2018 | Lim et al. |
| 2018/0181164 | A1 | 6/2018 | Chen |
| 2018/0188778 | A1* | 7/2018 | Shin ..................... G06F 1/1652 |
| 2018/0329456 | A1 | 11/2018 | Myers |
| 2019/0146558 | A1 | 5/2019 | Ohata et al. |
| 2019/0296259 | A1 | 9/2019 | Baek et al. |
| 2019/0305237 | A1 | 10/2019 | Shin et al. |
| 2019/0384438 | A1 | 12/2019 | Park et al. |
| 2020/0022269 | A1 | 1/2020 | Liao |
| 2020/0170114 | A1 | 5/2020 | Choi et al. |
| 2020/0201394 | A1 | 6/2020 | Choi et al. |
| 2020/0218353 | A1 | 7/2020 | Song et al. |
| 2020/0264660 | A1 | 8/2020 | Song et al. |
| 2020/0329572 | A1 | 10/2020 | Wittenberg et al. |
| 2020/0371558 | A1 | 11/2020 | Kim et al. |
| 2020/0409421 | A1 | 12/2020 | Cho et al. |
| 2021/0044683 | A1 | 2/2021 | He et al. |
| 2021/0116959 | A1 | 4/2021 | Heo et al. |
| 2021/0185835 | A1* | 6/2021 | Song ..................... G02F 1/13332 |
| 2021/0219437 | A1 | 7/2021 | Kim et al. |
| 2022/0011821 | A1* | 1/2022 | Han ..................... G06F 1/1624 |
| 2022/0019261 | A1 | 1/2022 | Kang et al. |
| 2022/0232716 | A1 | 7/2022 | Lim et al. |
| 2022/0240400 | A1 | 7/2022 | Zhou |
| 2022/0322551 | A1* | 10/2022 | Cheng ..................... H05K 5/0217 |
| 2022/0361347 | A1* | 11/2022 | Feng ..................... H05K 5/0018 |
| 2023/0095247 | A1* | 3/2023 | Feng ..................... G06F 1/1652 |
| | | | 361/679.27 |

FOREIGN PATENT DOCUMENTS

| CN | 110599912 | 12/2019 |
| CN | 110839095 | 2/2020 |
| JP | 2005-309086 A | 11/2005 |
| JP | 2011-049805 | 3/2011 |
| KR | 10-2008-0058168 | 6/2008 |
| KR | 10-2011-0066562 | 6/2011 |
| KR | 10-2014-0059274 | 5/2014 |
| KR | 10-1606064 | 3/2016 |
| KR | 10-2017-0004068 | 1/2017 |
| KR | 10-2017-0116551 | 10/2017 |
| KR | 10-2018-0030301 | 3/2018 |
| KR | 10-2018-0039027 | 4/2018 |
| KR | 10-2018-0039799 | 4/2018 |
| KR | 10-2019-0034063 | 4/2019 |
| KR | 10-2019-0069575 | 6/2019 |
| KR | 10-2019-0077107 | 7/2019 |
| KR | 10-2019-0086305 | 7/2019 |
| KR | 10-2019-0106322 | 9/2019 |
| KR | 10-2019-0128843 | 11/2019 |
| KR | 10-2019-0141518 | 12/2019 |
| KR | 10-2019-0143029 | 12/2019 |
| KR | 10-2020-0007510 | 1/2020 |
| KR | 10-2020-0079002 | 7/2020 |

OTHER PUBLICATIONS

International Search Report and Written Opinion dated Sep. 24, 2021 in corresponding International Application No. PCT/KR2021/008290.
International Search Report and Written Opinion dated Oct. 22, 2021 in corresponding International Application No. PCT/KR2021/009046.
International Search Report and Written Opinion dated Oct. 8, 2021 in corresponding International Application No. PCT/KR2021/008354.
Notice of Allowance dated Jul. 29, 2022 in counterpart U.S. Appl. No. 17/363,236.
Extended Search Report and Written Opinion dated May 18, 2022 in European Search Report 21754692.8.
Extended European Search Report dated Aug. 17, 2023 for EP Application No. 21841672.5.
Extended European Search Report dated Sep. 7, 2023 for EP Application No. 21841741.85.

* cited by examiner

ELECTRONIC DEVICE INCLUDING ROLLABLE DISPLAY

This application is a national stage application of International Application No. PCT/KR2021/009046 designating the United States, filed on Jul. 14, 2021, in the Korean Intellectual Property Receiving Office and claiming priority to Korean Patent Application Nos. 10-2020-0086823, filed on Jul. 14, 2020, 10-2020-0129528, filed on Oct. 7, 2020, 10-2020-0131321, filed on Oct. 12, 2020, 10-2020-0131459, filed on Oct. 12, 2020 and 10-2021-0022106, filed on Feb. 18, 2021, in the Korean Intellectual Property Office, the disclosures of which are incorporated by reference herein in their entireties.

FIELD

The disclosure relates to an electronic device including a rollable display.

DESCRIPTION OF RELATED ART

Development of display technologies has been followed by extensive research and development regarding electronic devices having flexible displays. A flexible display can be folded, bent, rolled, or unfolded, and may also referred to as a rollable display.

A rollable display may be implemented as an organic electroluminescent display device or a liquid crystal display device and may be manufactured, in connection with an existing liquid crystal display device or an organic electroluminescent display device, for example, by replacing the glass substrate with flexible plastic film.

There has recently been extensive research/development for applying a rollable display to an electronic device such that the resulting slidable electronic device has a display, the display area of which is variable. As a part of the housing of the slidable electronic device moves in a sliding type, a part of the rollable display may accordingly slide into the housing or slide out of the housing.

Embodiments of the disclosure may provide an electronic device configured such that, when a part of a rollable display has slid in or out, the rollable display is stably supported, thereby preventing and or reducing sagging of the rollable display even when externally pressed.

Embodiments of the disclosure may provide an electronic device including a support member (for example, a support plate or a sliding support) configured to support at least a part of a rollable display (or a flexible display) according to a change in the state of the electronic device (for example, a retracted state or an extended state).

An electronic device according to various example embodiments may include: a first housing; a second housing configured to slide in a first direction from the first housing in a second state and slide in a second direction opposite to the first direction in a first state so as to be coupled to the first housing; a rollable display having a visible display area varying depending on sliding of the second housing, the rollable display including a first portion always visible to the outside in the first state and the second state, and a second portion visible to the outside in the second state, movements of the second portion being guided by a bendable member comprising a bendable support; a sliding support configured to slide according to movements of the second housing and to support the second portion by supporting the bendable member in the second state; a bracket including a recess providing a space into which the sliding support slides in the first state; and a support plate disposed above the space to support the first portion.

An electronic device according to various example embodiments of the disclosure may be configured such that, when a part of a rollable display (or a flexible display) has slid in or out, the rollable display is stably supported, thereby preventing and/or reducing sagging of the rollable display even when externally pressed.

An electronic device according to various embodiments of the present document may be configured such that the members supporting the rollable display and enabling its retraction and extension are compactly contained within the electronic device.

Various other advantageous effects inferable directly or indirectly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
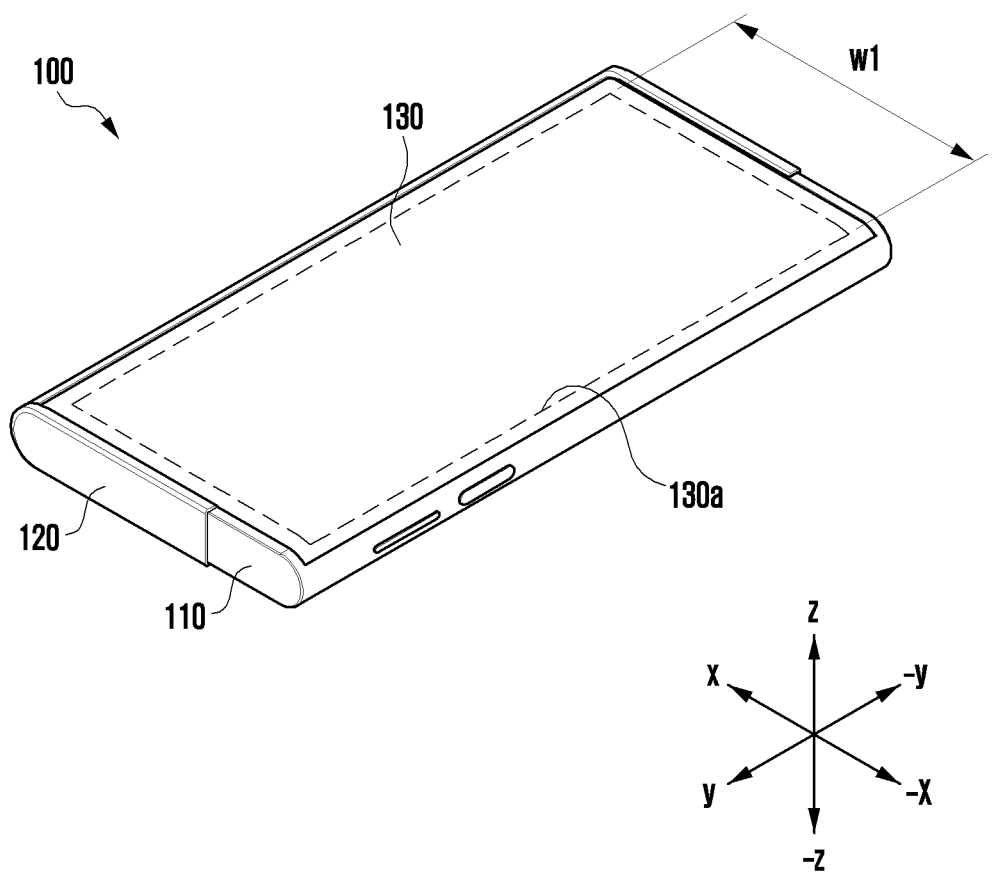
FIG. 1 is a perspective view illustrating an example electronic device in a first state (e.g., a retracted state (slide-in state)) according to various embodiments.
Figure 2:
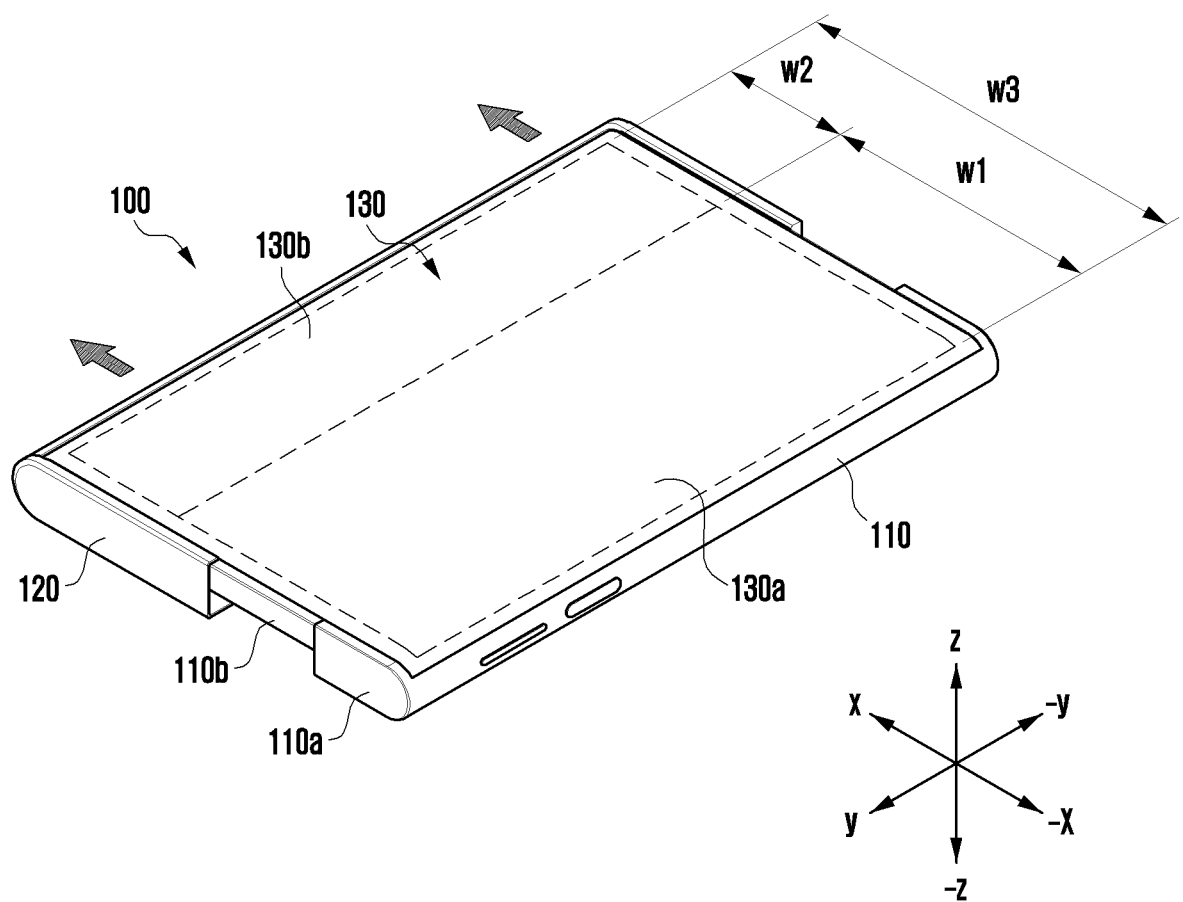
FIG. 2 is a perspective view illustrating an electronic device in a second state (e.g., an extended state (slide-out state)) according to various embodiments.

FIG. 1 is a perspective view illustrating an example electronic device 100 in a first state (e.g., a retracted state (slide-in state)) according to various embodiments. FIG. 2 is a perspective view illustrating the electronic device 100 in a second state (e.g., an extended state (slide-out state)) according to various embodiments.

According to an embodiment, the first state may be referred, for example, to as a first shape, and the second state may be referred, for example, to as a second shape. For example, the first shape may include a normal state, a reduced state, a retracted state, a closed state, a slide-in state, etc., and the second shape may include an extended state, an opened state, a slide-out state, etc. Further, according to an embodiment, the electronic device 100 may be in a third state which is an intermediate state between the first state and the second state. For example, the third state may be called a third shape, and the third shape may include a free-stop state.

Referring to FIGS. 1 and 2, the electronic device 100 according to various embodiments may include a first housing 110 and a second housing 120. According to an embodiment, the second housing 120 may move in a designated direction, for example, a first direction (x direction), from the first housing 110. For example, the second housing 120 may slide a designated distance (e.g., a second width (w2)) in the first direction (x direction) from the first housing 110. According to an embodiment, the second housing 120 may reciprocate the designated distance (e.g., a second width (w2)) in the first direction (x direction) from the first housing 110 and a second direction (−x direction). Although throughout this disclosure the second housing is predominantly referred to as moving/sliding with respect to the first housing, it may also be considered that the first housing moves/slides with respect to the second housing.

In various embodiments of the disclosure, a state in which the second housing 120 has slid in the first direction (x direction) from the first housing 110 may be referred to as a second state (e.g., an extended state) (or a slide-out state) of the electronic device 100. In various embodiments, a state in which the second housing 120 has slid toward the first housing 110, for example, in the second direction (−x direction) opposite to the first direction (x direction) may be referred to as a first state (e.g., a retracted state) (or slide-in state) of the electronic device 100. The second housing may also be considered to be proximal (closest) to the first housing or abutting the first housing in the first state. The second housing may also be considered to be distal to (furthest from) the first housing or separated from the first housing in the second state. The first state may alternatively be referred to as the closed state and the second state as the open state, where in the closed state a minimum area of the rollable display is viewable and in the open state a maximum area of the rollable display is viewable. The third state may refer to a state where the second housing is between the proximal and distal positions relative to the first housing.

The electronic device 100 according to various embodiments may be switched to the first state (e.g., the reduced state) and/or the second state (e.g., the extended state) manually by a user or automatically through a driving mechanism (e.g., a driving motor, a speed-reducing gear module, and/or a gear assembly) disposed in the first housing 110 or the second housing 120. According to an embodiment, operation of the driving mechanism may be triggered based on a user input. According to an embodiment, the user input for triggering the operation of the mechanism may include, for example, and without limitation, a touch input, a force touch input, and/or a gesture input, for the like, through a rollable display 130. In an embodiment, the user input for triggering the operation of the mechanism may include, for example, and without limitation, a voice input, an input of a physical button exposed to the outside of the first housing 110 or the second housing 120, a user gesture that moves the rollable display 130 in a designated direction (e.g., the first direction (x direction)) while pressing a portion of the rollable display 130, which is visually exposed (hereinafter, the term "visually exposed" may be used interchangeably with the term "visible") to the outside, or the like.

According to an embodiment, the electronic device 100 may be referred to as a slidable electronic device 100 because the second housing 120 can slide, or may be referred to as a rollable electronic device 100 because the rollable display 130 is at least partially configured to be rolled, based on sliding of the second housing 120, in the second housing 120 (or the first housing 110). According to an embodiment, the electronic device 100 may include a foldable electronic device and/or a stretchable electronic device. For example, "the foldable electronic device", "the slidable electronic device", "the stretchable electronic device" and/or "the rollable electronic device", or the like, may refer to an electronic device in which the bending deformation of the rollable display 130 is possible, and thus at least a portion thereof can be folded or can be wound or rolled, or the region thereof can be at least partially extended and/or can be received in a housing (e.g., the first housing 110 or the second housing 120). The foldable electronic device, the slidable electronic device, the stretchable electronic device, and/or the rollable electronic device may extend and use a screen display region by unfolding a display or exposing the wider area of the display to the outside according to a user' need.

According to an embodiment, in the electronic device 100, the second housing 120 may be coupled to the first housing 110 to at least partially slide from the first housing 110.

According to an embodiment, the first housing 110 of the electronic device 100 may include side members (e.g., side housing portions) 110a and 110b surrounding the side surface of the electronic device 100. According to an embodiment, the side members 110a and 110b of the first housing 110 may include: a first side member 110a which is exposed to the outside without being inserted into the second housing 120 in the first state (e.g., the retracted state) and/or the second state (e.g., the extended state) of the electronic device 100; and a second side member 110b, at least a portion of which is inserted into and/or drawn out of the inner space of the second housing 120 through one side surface of the second housing 120. For example, the second side member 110b of the first housing 110 may not be visually exposed (e.g., visible) to the outside in the first state (e.g., the retracted state), but may be visually exposed to the outside in the second state (e.g., the extended state).

According to an embodiment, although not illustrated, the entirety or at least a part of the second housing 120 may be inserted into and/or drawn out of the first housing 110. For example, although not illustrated, when the second housing 120 slides in the first direction (x direction), a portion of the second housing 120 may be drawn out of the inner space of the first housing 110. For example, although not illustrated, when the second housing 120 slides in the second direction (−x direction) opposite to the first direction (x direction), the portion of the second housing 120 may be inserted into the inner space of the first housing 110 and may not be visually exposed to the outside.

According to an embodiment, the second housing 120 may support a portion (e.g., a second portion 130b) of the rollable display 130, and may extend or reduce the display area of the rollable display 130 depending on sliding of the second housing 120.

According to various embodiments, the electronic device 100 may include the rollable display 130 disposed to be supported by the first housing 110 and the second housing 120.

According to an embodiment, the rollable display 130 may include: a first portion 130a supported by the first housing 110; and a second portion 130b extending from the first portion 130a and supported by a bendable member (e.g., a bendable support, refer to FIG. 3) 350.

According to an embodiment, the second portion 130b of the rollable display 130 may be disposed such that, when the electronic device 100 is in the first state (e.g., the retracted state), the second portion 130b is inserted into the inner space of the second housing 120 (or the first housing 110) and is not visually exposed to the outside. When the electronic device 100 is in the second state (e.g., the extended state), the second portion 130b of the rollable display 130 may be exposed to the outside so as to extend from the first portion 130a while being supported by the bendable member 350.

According to an embodiment, in the first state (e.g., the retracted state), the first portion 130a of the rollable display 130 is visually exposed, and thus the display area of the rollable display 130 may have a first width (w1).

According to an embodiment, in the second state (e.g., the extended state), the first portion 130a and the second portion 130b of the rollable display 130 are exposed, and thus the display area of the rollable display 130 may have a third width (w3) that is larger than the first width (w1) by the second width (w2). For example, in the second state (e.g., the extended state), the display area of the rollable display 130 may be extended by the second width (w2) that may be the maximum width of the second portion 130b.

In various embodiments of the disclosure, the first portion 130a of the rollable display 130 may be always visually exposed (e.g., visible) to the outside regardless of the movement of the second housing 120, and thus may be referred to as a "fixed display region". In various embodiments, the second portion 130b of the rollable display 130 may be exposed to the outside or may be inserted into the second housing 120 (or the first housing 110) and may not be visually exposed (e.g., visible) to the outside, based on the movement of the second housing 120, and thus may be referred to, for example, as a "variable display region".

According to various embodiments, although not illustrated, the electronic device 100 may include a sensor module (e.g., the sensor module 3776 in FIG. 37), a camera module (e.g., the camera module 3780 in FIG. 37), or the like.

According to an embodiment, the sensor module (e.g., an illumination sensor) may be disposed below the rollable display 130 (e.g., in the −z direction from the rollable display 130), and may detect an external environment based on information (e.g., light) received through the rollable display 130.

According to an embodiment, the sensor module may include, for example, and without limitation, at least one among a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, an illumination sensor, a proximity sensor, an ultrasonic sensor, or the like.

According to an embodiment, the camera module may include, for example, and without limitation, one or more lenses (e.g., a wide-angle lens, an ultra wide-angle lens, or a telephoto lens) and image sensors, or the like. In an embodiment, the camera module may include an infrared (IR) camera (e.g., a time-of-flight (TOF) camera or a structured light camera), or a light detection and ranging (LiDAR) sensor. For example, the camera module may include an image sensor and/or lenses for time-of-flight (TOF). According to an embodiment, the IR camera may operate as at least a part of the sensor module, and the TOF camera may operate as at least a part of a sensor module for sensing the distance between the camera module and a subject.

Various examples in accordance with the disclosure are set forth below.

An electronic device according to various example embodiments may include: a first housing; a second housing configured to slide in a first direction from the first housing in a second state and, in a first state, to slide in a second direction opposite to the first direction so as to be coupled to the first housing; a rollable display including a display area varying depending on sliding of the second housing, the rollable display including a first portion, which is always visible to the outside in the first state and the second state, and a second portion which is visible to the outside in the second state and the movement of which is guided by a bendable support; a sliding support configured to slide according to the movement of the second housing and supporting the second portion by supporting the bendable support in the second state; a bracket including a recess providing a space into which the sliding support is configured to slide in the first state; and a support plate disposed above the space to support the first portion.

The electronic device of the immediately preceding paragraph, the front surface of the bracket, opposite to the first portion of the rollable display, may include: a first surface; a first recess having a height less than a height of the first surface and in which the support plate is seated; and at least one second recess having a height less than the height of the first recess and into or from which the sliding support is configured to be inserted or drawn.

The electronic device of any of the preceding two paragraphs, the electronic device may further include an adhesive member comprising an adhesive configured to attach the support plate to the first recess.

The electronic device of any of the preceding three paragraphs, the adhesive member may include at least one slit formed by removing portions corresponding to the second recess.

The electronic device of any of the preceding four paragraphs, the sliding support may include: multiple sliding bars arranged in the first direction and configured to be inserted into or drawn out of the second recess; and a support bar connecting, at one end thereof, the multiple sliding bars to each other and arranged in a third direction perpendicular to the first direction, wherein the multiple sliding bars support multiple hinge bars of the bendable member, arranged in the third direction.

The electronic device of any of the preceding five paragraphs, a protrusion may be formed on each of one end and the other end of each of the sliding bars.

The electronic device of any of the preceding six paragraphs, the protrusion may be formed to come into contact with the second recess.

The electronic device of any of the preceding seven paragraphs, the second recess may include a third recess disposed between one end and another end of the second recess and having a height less than a height of the second recess.

The electronic device of any of the preceding eight paragraphs, the electronic device may further include a cushion member comprising a cushioning material at least partially surrounding the edge of the first recess adjacent to the first surface.

The electronic device of any of the preceding nine paragraphs, the cushion member may be disposed between the edge of the support plate and a side wall formed between the first surface and the first recess.

The electronic device of any of the preceding ten paragraphs, the cushion member comprise at least one of a rubber or urethane material.

The electronic device of any of the preceding eleven paragraphs, the second portion of the rollable display may be configured to slide into the first housing or the second housing based on guiding by the bendable support in the first state.

The electronic device of any of the preceding twelve paragraphs, the material of the support plate may include at least one of metal, stainless steel (SUS), a laminated member including SUS and Al which are alternately disposed, stainless steel of a low carbon steel material, copper, and copper alloy (Cu alloy).

The electronic device of any of the preceding thirteen paragraphs, a Teflon sheet or a Teflon coating may be disposed on at least a partial surface of the support plate facing the sliding support.

The electronic device of any of the preceding fourteen paragraphs, the thickness of the support plate may be substantially equal to the difference between the height of the recess and the height of the first surface of the bracket opposite to the first portion of the rollable display.

The electronic device of any of the preceding fifteen paragraphs, the height of the upper surface of the support plate may be substantially equal to the height of the first surface of the bracket.

The electronic device of any of the preceding sixteen paragraphs, a step may be formed between the first recess and the second recess, and a protrusion portion protruding toward the center of the second recess 312*b* may be formed on a side wall disposed at both sides of the second recess.

The electronic device of any of the preceding seventeen paragraphs, the side wall may include: a first side wall extending from one side of the second recess; and a second side wall extending from another side of the second recess. The protrusion portion may include: a first protrusion portion protruding from the first side wall toward the center of the second recess; and a second protrusion portion protruding from the second side wall toward the center of the second recess.

The electronic device of any of the preceding eighteen paragraphs, an opening configured to visually expose at least a portion of the second recess may be formed between the first protrusion portion and the second protrusion portion.

The electronic device of any of the preceding nineteen paragraphs, each of the sliding bars may have a first width, the second recess may have a second width larger than the first width, and the opening may have a third width that is less than the first width.

Figure 3:
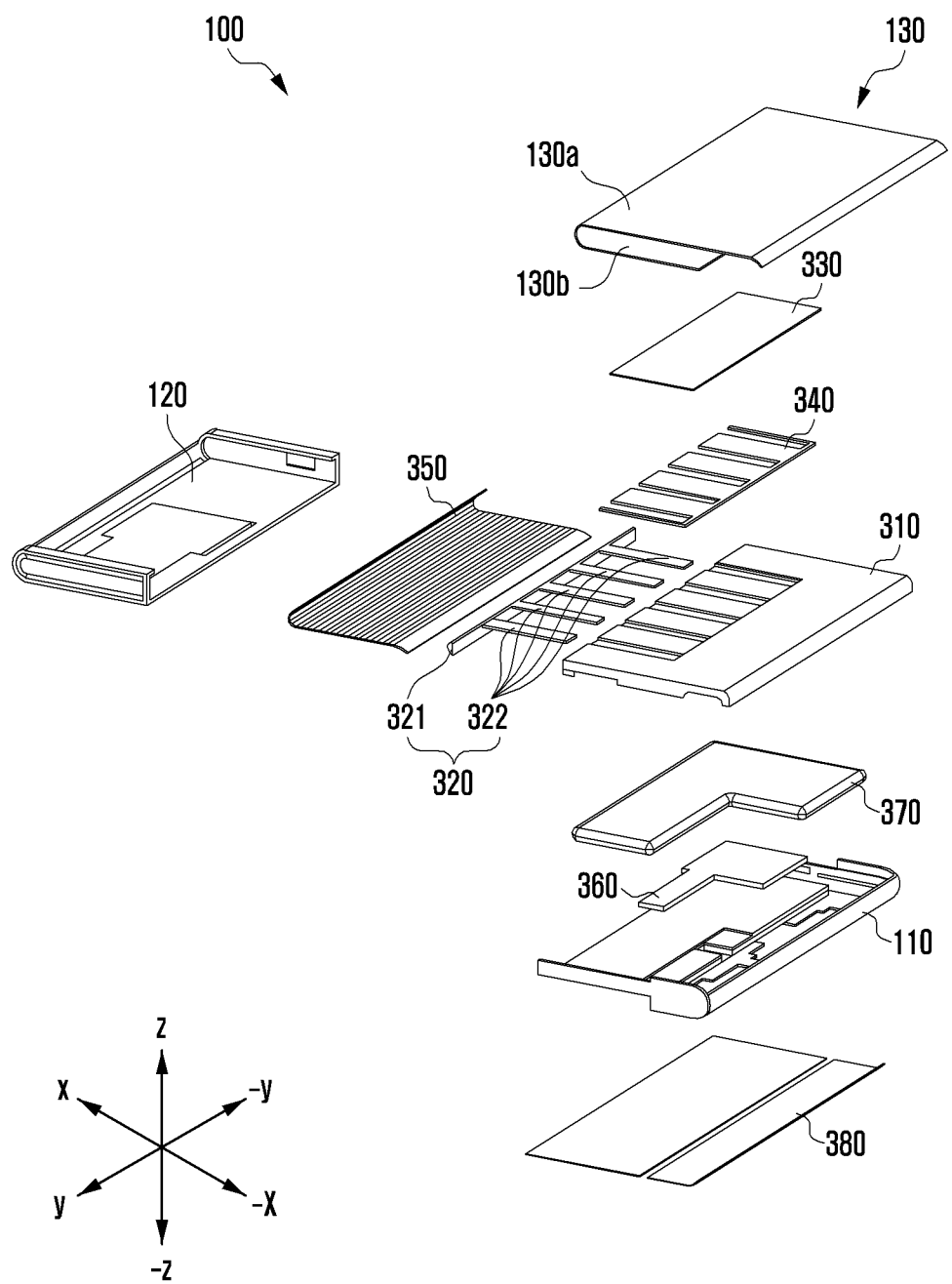
FIG. 3 is an exploded perspective view of an electronic device according to various embodiments.

FIG. 3 is an exploded perspective view of the electronic device 100 according to various embodiments.

The electronic device 100 illustrated in FIG. 3 may include an example which is at least partially similar to or different from that of the electronic device 100 illustrated in FIGS. 1 and 2. Hereinafter, in relation to FIG. 3, a description will be made of features of the electronic device 100, which have not been described in FIGS. 1 and 2 or are different from those in FIGS. 1 and 2.

Referring to FIG. 3, an electronic device (e.g., the electronic device 100 in FIG. 1) according to various embodiments may include a first housing 110 and a second housing 120.

According to an embodiment, a bracket 310, a battery 370, and/or a substrate 360 (e.g., a printed circuit board (PCB), a flexible PCB (FPCB), or a rigid-flexible PCB (RFPCB) may be disposed in the first housing 110.

According to an embodiment, as described in greater detail below with reference to FIGS. 4 and 5, a support plate 330 may be seated on a portion of the front surface of the bracket 310. According to an embodiment, the support plate 330 may be coupled to a portion (e.g., the first recess 312a in FIG. 4) of the front surface of the bracket 310 by the adhesive member (e.g., including an adhesive material) 340. According to an embodiment, the support plate 330 may support a portion (e.g., the first portion 130a) of the rollable display 130 at the portion (e.g., the first recess 312a in FIG. 4) of the front surface of the bracket 310 coupled to a sliding support 320.

According to an embodiment, the bracket 310 may be formed integrally with the first housing 110. According to an embodiment, the bracket 310 may be disposed as a component that is different from the first housing 110. In this case, the bracket 310 may be coupled to the first housing 110 by being assembled with a portion of the first housing 110.

According to an embodiment, the bracket 310 may be formed of, for example, a metal material and/or a non-metal (e.g., polymer) material. According to an embodiment, the bracket 310 may support a portion (e.g., the first portion 130a) of the rollable display 130 through the front surface (e.g., in the +z direction) of the bracket 310.

According to an embodiment, a processor (e.g., the processor 3720 in FIG. 37), a memory (e.g., the memory 3730 in FIG. 37), and/or an interface (e.g., reference numeral 3777 in FIG. 37) may be mounted on the substrate 360. The processor (e.g., the processor 3720 in FIG. 37) may include at least one of, for example, and without limitation, a central processing unit, an application processor, a graphic processing device, an image signal processor, a sensor hub processor, a communication processor, or the like.

According to an embodiment, the memory (e.g., the memory 3730 in FIG. 37) may include, for example, a volatile memory or a non-volatile memory.

According to an embodiment, the interface (e.g., reference numeral 3777 in FIG. 37) may include, for example, a high definition multimedia interface (HDMI), a universal serial bus (USB) interface, an SD card interface, and/or an audio interface. The interface, for example, may electrically or physically connect the electronic device 100 to an external electronic device, and may include a USB connector, an SD card/MMC connector, or an audio connector.

According to an embodiment, the battery 370 is a device configured to supply power to at least one element of the electronic device 100, and may include, for example, a non-rechargeable primary battery, a rechargeable secondary battery, a fuel cell, or the like. At least a portion of the battery 370 may be disposed on substantially the same plane as, for example, the substrate 360. According to an embodiment, the battery 370 may be disposed integrally with the electronic device 100 in the electronic device 100. In another example, the battery 370 may also be disposed to be able to be attached to or detached from the electronic device 100.

According to an embodiment, an antenna (not shown) may be disposed in the first housing 110. For example, the antenna may be disposed between the bracket 310 and a rear cover 380 of the first housing 110. The antenna may include, for example, a near-field communication (NFC) antenna, a wireless charging antenna, and/or a magnetic secure transmission (MST) antenna. The antenna, for example, may perform short-range communication with an external device or may transmit or receive power to or from the external device in a wireless manner.

According to an embodiment, the rear surface of the first housing 110 (e.g., a surface of the first housing 110 facing a −z direction) may be coupled to the rear cover 380. According to an embodiment, the rear cover 380 may be formed of a substantially opaque material. According to an embodiment, the rear cover 380 may be formed of, for example, coated or colored glass, ceramic, polymer, metal (e.g., aluminum, stainless steel, or magnesium), or a combination of at least two of the materials. According to an embodiment, the rear cover 380 may be coupled to side members (e.g., the side members 110a and 110b in FIG. 2) of the first housing 110, or may be integrated with the side members 110a and 110b of the first housing 110.

Although not illustrated, the electronic device 100 may further include a second rear cover (not shown) coupled to the rear surface (e.g., a surface of the second housing 120 facing a −z direction) of the second housing 120. In this case, the second rear cover may be formed of a material that is substantially identical to that of the rear cover 380.

According to an embodiment, a sliding support 320 or a bendable member 350 may be disposed in the second housing 120.

According to an embodiment, the sliding support 320 may include: multiple sliding bars (or ribs) 322 which are arranged in a first direction (x direction); and a support bar 321 which connects, at one end thereof, the multiple sliding bars 322 to each other and is arranged in a third direction (y direction) perpendicular to the first direction (x direction). According to an embodiment, the multiple sliding bars 322 may be disposed while being spacing apart from each other, and the support bar 321 may be disposed at one-side ends of the multiple sliding bars 322. According to an embodiment, the support bar 321 may, for example, have a rod shape or a cylindrical shape arranged in the third direction (y direction).

According to an embodiment, the electronic device 100 may include the bendable member 350 (or bendable support member, e.g., a bendable support) (e.g., multi joint hinge module) which is coupled to the end of the second housing 120, supports at least a portion of the rollable display 130, and is capable of being bent. According to an embodiment, when the second housing 120 slides in the first housing 110, the bendable member 350 may be at least partially inserted into or drawn out of the inner space of the second housing 120 while supporting the rollable display 130.

According to an embodiment, the bendable member 350 may be inserted into or drawn out of the inner space of the second housing 120 based on the movement or rotation of the sliding support 320 disposed in the second housing 120.

Although not illustrated, according to an embodiment, the bendable member 350 may be coupled to the end of the first housing 110. For example, the bendable member 350 may be drawn out of the inner space of the first housing 110 according to sliding of the second housing 120 in the first direction (x direction), and may be inserted into the inner space of the first housing 110 according to sliding of the second housing 120 in a second direction (−x direction).

In the electronic device 100 according to various embodiments, at least one of the elements described with reference to FIG. 3 may be omitted, or another element may be additionally included.

Figure 4:
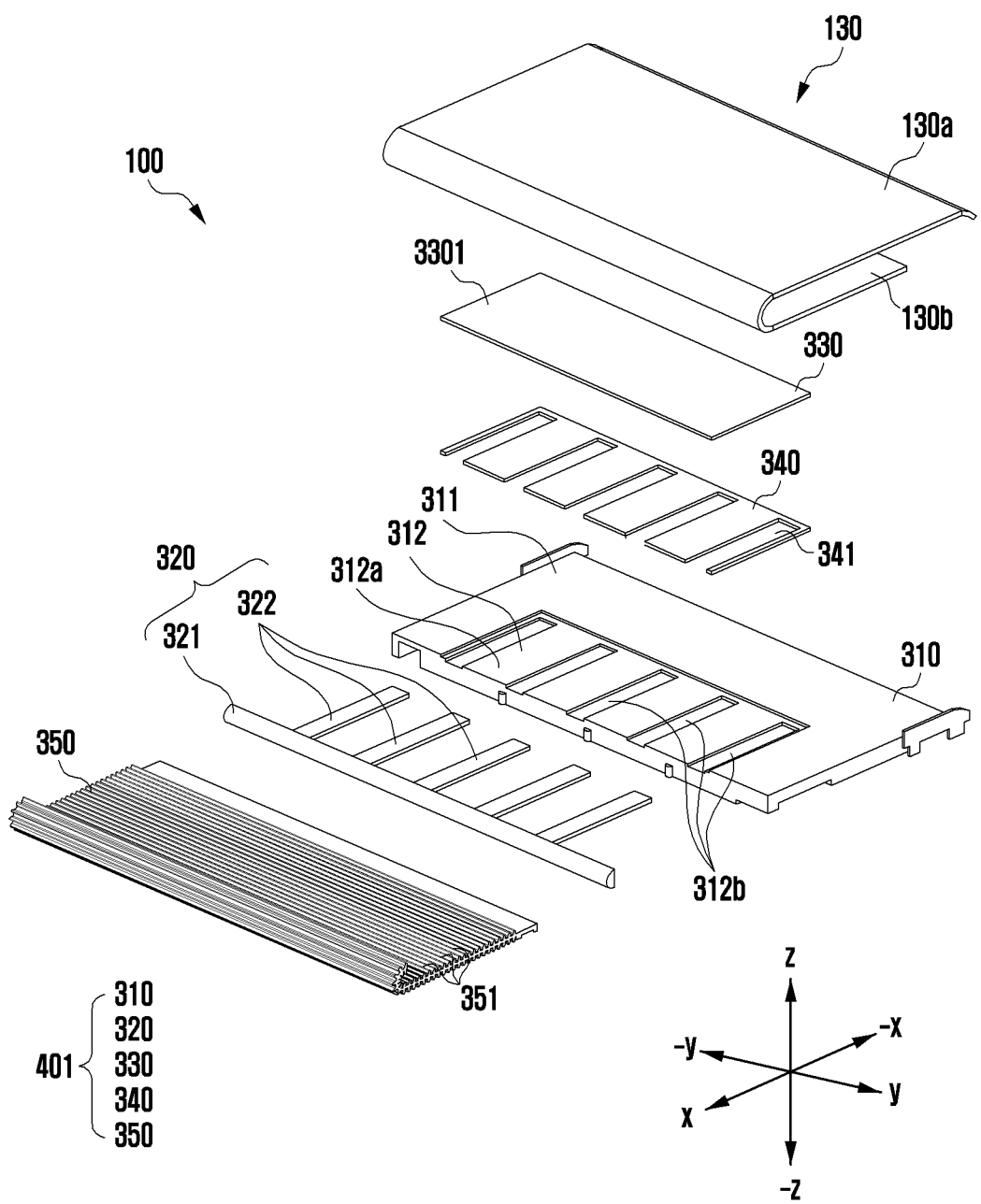
FIG. 4 is an exploded perspective view illustrating a display support member of an electronic device according to various embodiments.

FIG. 4 is an exploded perspective view illustrating a display support member 401 of the electronic device 100 according to various embodiments.

The electronic device 100 illustrated in FIG. 4 may include an embodiment which is at least partially similar to or different from that of the electronic device 100 illustrated in FIGS. 1, 2 and 3. Hereinafter, in relation to FIG. 4, a description will be made of features of the electronic device 100, which have not been described in FIGS. 1, 2 and 3 or are different from those in FIGS. 1 and 2.

Referring to FIG. 4, an electronic device (e.g., the electronic device 100 in FIG. 1) according to various embodiments may include: the bracket 310; a support plate 330 seated on a portion of the front surface of the bracket 310; an adhesive member 340 configured to couple the support plate 330 to the portion of the bracket 310; a sliding support 320 coupled to the portion of the bracket 310 according to sliding of the second housing 120; and/or a bendable member 350 configured to support a portion (e.g., the second portion 130*b*) of the rollable display 130 while being supported by the sliding support 320.

In various embodiments, the elements referenced above may include members configured to support the rollable display 130, and thus may be referred to as the "display support member 401". For example, the display support member 401 according to various embodiments of the disclosure may include a bracket 310, a support plate 330, an adhesive member 340, a sliding support 320, and/or a bendable member 350. According to various embodiments, the types and the number of components (or instruments) of the "display support member" are not limited to the above-described examples, and may be variously changed depending on the shape of a housing of the electronic device or a manner in which a portion of the housing slides.

According to an embodiment, the bracket 310 and the support plate 330 may be components configured to substantially support a first portion 130*a* of a rollable display 130. For example, the bracket 310 and the support plate 330 may support the first portion 130*a* of the rollable display 130 in a first state and a second state of the electronic device 100.

According to an embodiment, the sliding support 320 and the bendable member 350 may be components for substantially supporting a second portion 130*b* of the rollable display 130. For example, the sliding support 320 and the bendable member 350 may support the second portion 130*b* of the rollable display 130 in the second state of the electronic device 100. In the second state of the electronic device 100, the sliding support 320 may support at least a portion of the bendable member 350, and the bendable member 350 may support the second portion 130*b* of the rollable display 130.

According to an embodiment, depending on sliding of a second housing (e.g., the second housing 120 in FIG. 3), the sliding support 320 may be inserted into a portion (e.g., a recess 312) of the bracket 310, or may be separated from the portion (e.g., a recess 312) of the bracket 310. For example, multiple sliding bars 322 of the sliding support 320 may slide into the portion (e.g., a recess 312) of the bracket 310 in the first state (e.g., the retracted state). For example, the multiple sliding bars 322 of the sliding support 320 may slide out from the portion (e.g., a recess 312) of the bracket 310 in the second state (e.g., the extended state). According to an embodiment, the bracket 310 may include at least one second recess 312*b* in which the multiple sliding bars 322 of the sliding support 320 are inserted and seated in the first state (e.g., the retracted state).

According to an embodiment, the bendable member 350 may support a portion (e.g., the second portion 130*b*) of the rollable display 130 while being supported by the sliding support 320. According to an embodiment, the bendable member 350 may be a component which includes multiple hinge bars 351 (e.g., hinge bars 351 in FIG. 7A) coupled to each other and arranged in a third direction (e.g., y direction) perpendicular to the first direction (e.g., x direction) in which the second housing 120 slides. According to an embodiment, the multiple hinge bars 351 may be connected to each other in a hinge coupling manner. The bendable member 350 according to various embodiments may be referred to as the term "multi-joint hinge", "multi-bar assembly", or "hinge bar assembly".

According to an embodiment, the front surface (e.g., a surface facing a +z direction) of the bracket 310 may include a first surface 311 and a recess 312 formed in a portion adjacent to the sliding support 320. According to an embodiment, the support plate 330 may be seated in the recess 312 of the bracket 310.

According to an embodiment, the support plate 330 is seated in the recess 312 of the bracket 310, and thus an upper surface 3301 of the support plate 330 may be formed substantially parallel to the first surface 311 of the bracket 310. For example, the first surface 311 of the bracket 310 and the upper surface 3301 of the support plate 330 may support the first portion 130*a* of the rollable display 130.

According to an embodiment, the recess 312 of the bracket 310 may include: a first recess 312*a* supporting the support plate 330; and multiple second recesses 312*b*, the number of which may be equal to the number of multiple sliding bars 322, formed at a portion of the first recess 312*a* and formed to correspond to the shape (e.g., length and/or height) of the multiple sliding bars 322 of the sliding support 320. According to an embodiment, the first recess 312*a* may have a height less than a height of the first surface 311, and the second recesses 312*b* may have heights less than a height of the first recess 312*a*. According to an embodiment, the multiple second recesses 312*b* may be formed in a direction in which the multiple sliding bars 322 extend or in a direction in which the multiple sliding bars 322 slide. For example, in the illustrated example, the multiple sliding bars 322 may move in the x direction and the −x direction, and the multiple second recesses 312*b* may be formed in the x direction or the −x direction.

According to an embodiment, the height of a step formed between the first recess 312*a* and the first surface 311 is formed to correspond to the thickness of the support plate 330, and thus, when the support plate 330 is seated on the first recess 312*a*, the upper surface 3301 of the support plate 330 and the first surface 311 of the bracket 310 may be formed substantially parallel to each other.

According to an embodiment, the second recesses 312*b* may be formed to correspond to the shape (e.g., length and/or height) of the multiple sliding bars 322 of the sliding support 320, and thus may have a structure in which the multiple sliding bars 322 are inserted into or drawn out in a sliding manner. For example, the height of a step formed between the first recess 312*a* and the second recesses 312*b* may be formed to be greater than the heights of the multiple sliding bars 322. According to an embodiment, although not illustrated, rail-shaped grooves (not shown) for guiding the movement of the multiple sliding bars 322 may be formed in the second recesses 312*b*.

According to an embodiment, the material of the support plate 330 may include, for example, and without limitation, metal, stainless steel (SUS), CLAD (e.g., a laminated member including SUS and Al which are alternated disposed), a member having the same steel sheet property as SUS, or the like, and thus may stably support the rollable display 130 and may diffuse heat generated from the rollable display 130 or components around the rollable display 130.

According to an embodiment, the support plate 330 may be made, for example, and without limitation, of stainless steel of a low carbon steel material, copper, and/or copper alloy (Cu alloy), or the like. For example, the support plate 330 may be made of a low carbon material so as not to be corroded due to a failure in the generation of an oxide film by chemical reaction between carbon (C) and chromium (Cr).

According to an embodiment, a subsidiary material (material) configured to reduce friction or noise caused by sliding of the sliding support 320 may be disposed on the surface of the support plate 330, which faces the sliding support 320. According to an embodiment, the subsidiary material may include, for example, and without limitation, a Teflon sheet or a Teflon coating, or the like.

According to an embodiment, the support plate 330 may be attached to the recess 312 of the bracket 310 by the adhesive member 340. According to an embodiment, the adhesive member 340 may include, for example, and without limitation, a double-sided adhesive film. In an embodiment, the adhesive member 340 may include, for example, and without limitation, a thermoreactive adhesive, a photoreactive adhesive, and/or a normal adhesive, or the like. According to an embodiment, the adhesive member 340 may include multiple slits 341 formed by removing portions overlapping (or corresponding to) the second recesses 312b. For example, the adhesive member 340 may be formed at a portion overlapping (or corresponding to) the first recess 312a, and thus may attach the first recess 312a and the support plate 330 to each other.

According to an embodiment, a sliding structure (not shown) may be further included between the bracket 310 and the second housing (e.g., the second housing 120 in FIG. 3) so as to support (guide) coupling therebetween and movement of the second housing. For example, the sliding structure (not shown) may include at least one elastic structure (e.g., the elastic structure 3111 in FIG. 32), and when the second housing moves a designated distance by external force, may switch from the first state (e.g., the retracted state) to the second state (e.g., the extended state) without any further external force due to the at least one elastic structure (e.g., the elastic structure 3111 in FIG. 32). For example, the at least one elastic structure (e.g., the elastic structure 3111 in FIG. 32) may be implemented based on various elastic members such as a torsion spring.

According to an embodiment, the sliding support 320 may include: multiple sliding bars 322 arranged in a first direction (x direction); and the support bar 321 which connects, at one end thereof, the multiple sliding bars 322 to each other and are arranged in a third direction (y direction) perpendicular to the first direction (x direction). According to an embodiment, the multiple sliding bars 322 may be disposed while being spaced apart from each other, and the support bar 321 may be disposed at one-side ends of the multiple sliding bars 322. According to an embodiment, the support bar 321 may have a rod shape or a cylindrical shape arranged in the third direction (y direction).

According to an embodiment, the surface of the support bar 321 may include a curved surface which is rolled up by the second portion 130b of the rollable display 130. According to an embodiment, the curved surface of the support bar 321 may be configured to support (guide) movement of the second portion 130b of the rollable display 130. According to an embodiment, the curvature of the curved surface of the support bar 321 may form the rotation radius of the second portion 130b of the rollable display 130. According to an embodiment, the curvature of the curved surface of the support bar 321 may be configured based on a radius (R) value which corresponds to the minimum curvature radius of the rollable display 130 in which plastic deformation of the rollable display 130 does not occur. In an embodiment, although not illustrated, the electronic device 100 may have a structure in which the support bar 321 is viewable from the outside of the electronic device 100. In this case, the curvature of the curved surface of the support bar 321 is a factor which forms a portion of the exterior of the electronic device 100, and may be variously designed and changed. For example, a portion of the rollable display 130 may form a partial side surface of the electronic device 100 and, in this case, the curvature of the support bar 321 disposed to correspond to the partial side surface of the electronic device 100 may at least partially affect the shape of a portion of the rollable display 130 which forms the exterior of the electronic device 100 at the partial side surface of the electronic device 100.

According to an embodiment, the sliding support 320 may move in a second direction (-x direction) in which the bracket 310 is positioned or in the first direction (x direction) opposite to that of the bracket 310 depending on the movement of the second housing 120. For example, the sliding support 320 may move in the first direction (x direction) according to sliding of the second housing 120 in the first direction (x direction), and may move in the second direction (-x direction) according to sliding of the second housing 120 in the second direction (-x direction).

According to an embodiment, the electronic device 100 may further include a flexible printed circuit board (FPCB) (not shown) which electrically connects the rollable display 130 and the substrate 360. For example, the flexible printed circuit board (not shown) may be electrically connected to the substrate through an opening formed in the bracket 310.

Figure 5:
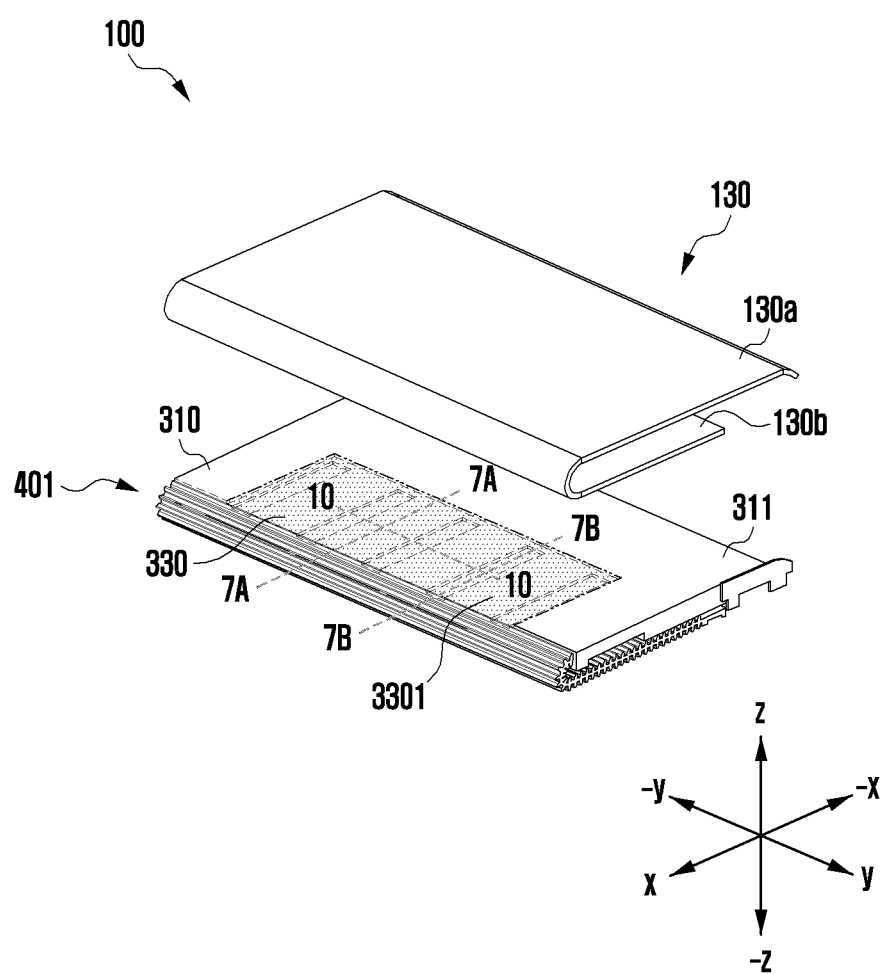
FIG. 5 is a combined perspective view of a display support member in a first state according to various embodiments.

FIG. 5 is a combined perspective view of the display support member 401 in a first state according to various embodiments.

The electronic device 100 illustrated in FIG. 5 may include an embodiment which is at least partially similar to or different from that of the electronic device 100 illustrated in FIGS. 1, 2, 3 and 4. Hereinafter, in relation to FIG. 5, a description will be made of features of the electronic device 100, which have not been described in FIGS. 1, 2, 3 and 4 or are different from those in FIGS. 1, 2, 3 and 4.

Referring to FIG. 5, in the case of the display support member 401 (e.g., the display support member 401 in FIG. 4) of an electronic device (e.g., the electronic device 100 in FIG. 1) in the first state (e.g., the retracted state), the first surface 311 of the bracket 310 and the support plate 330 seated in a recess (e.g., the recess 312 in FIG. 4) of the bracket 310 may support the first portion 130a of the rollable display 130.

According to an embodiment, in the first state (e.g., the retracted state), the first portion 130a of the rollable display 130 may be visible to the outside, and the second portion 130b thereof may at least partially slide into the second housing 120 according to guiding by the sliding support 320. For example, the first portion 130a of the rollable display 130, which is visible to the outside, may be substantially supported by the first surface 311 of the bracket 310 and the support plate 330 seated in the recess 312 of the bracket 310.

According to an embodiment, in the first state (e.g., the retracted state) of the electronic device 100, the multiple sliding bars 322 of the sliding support 320 may slide into the multiple second recesses 312b of the bracket 310.

According to an embodiment, the support plate 330 may be seated in a first recess 312a having a height greater than a height of the multiple second recesses 312b, and thus the upper surface 3301 of the support plate 330 may be disposed substantially parallel to the first surface 311 of the bracket 310.

According to an embodiment, the support plate 330 is formed to have a thickness which is substantially equal to the difference between the height of the first recess 312a and the height of the first surface 311 of the bracket 310. Therefore, the upper surface 3301 of the support plate 330 and the first surface 311 of the bracket 310 may be disposed substantially parallel to each other.

According to an embodiment, in the first state (e.g., the retracted state) of the electronic device 100, the first portion 130a of the rollable display 130 may be seated on the upper surface 3301 of the support plate 330 and the first surface 311 of the bracket 310, which are formed substantially parallel to each other.

Figure 8:
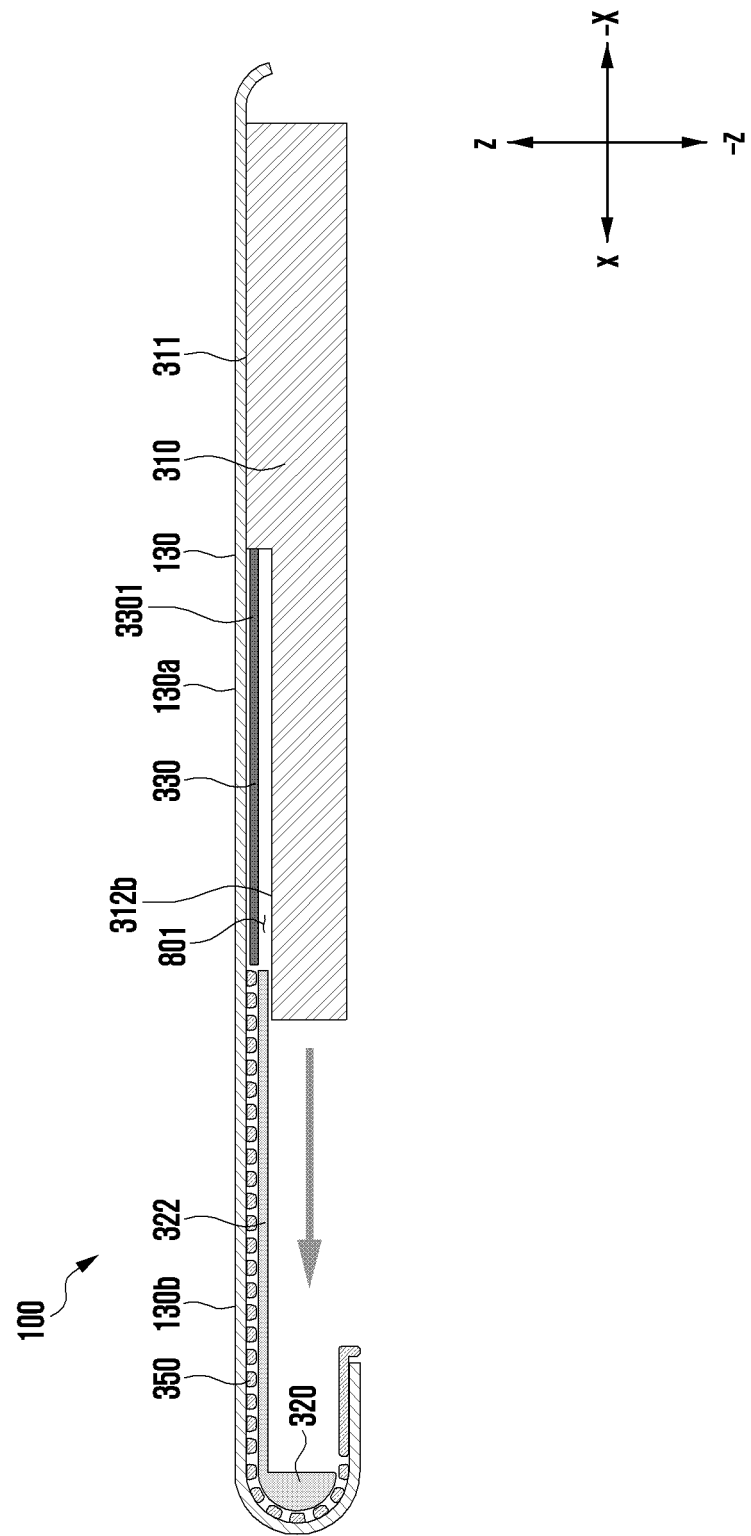
FIG. 8 is a cross-sectional view of a display support member in a second state of an electronic device according to various embodiments.
Figure 9:
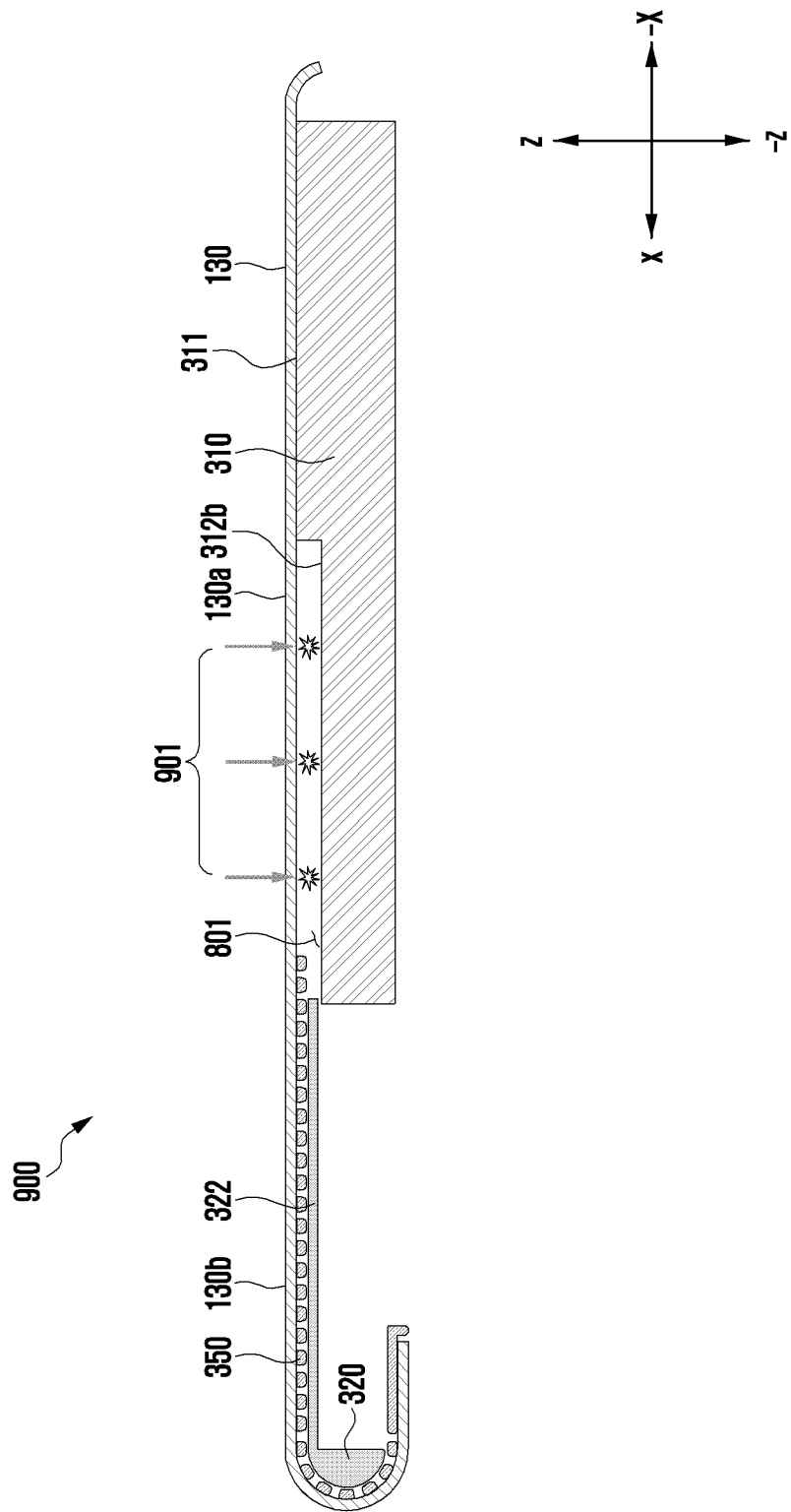
FIG. 9 is a cross-sectional view of a display support member in a second state of an electronic device in a comparative example.

According to an embodiment, in the first state (e.g., the retracted state), the support plate 330 is disposed so as to compensate for the height difference between the first surface 311 of the bracket 310 and the recess 312, and thus sagging or drooping in the downward direction (e.g., in a −z direction) by external pressure (e.g., pressure applied in the −z direction, the external pressure 901 of FIG. 9) of a portion of the first portion 130a of the rollable display 130, which is placed to overlap the support plate 330 with reference to a z-axis, is prevented and/or reduced. In the above description, that the support plate 330 is disposed so as to compensate for the height difference between the first surface 311 of the bracket 310 and the recess 312 may imply that the support plate 330 is disposed such that the height of the first surface 311 of the bracket 310 is equal to the height of the upper surface 3301 of the support plate 330 in order for the rollable display 130 to be supported by a substantially flat surface. For example, the bracket 310 may include the recess 312 for providing a space (e.g., the space 801 in FIG. 8) into which the multiple sliding bars 322 slide in the first state of the electronic device 100, and disposing the support plate 330 so as to correspond to the recess 312 may compensate for the height reduced by the recess 312.

Figure 6A:
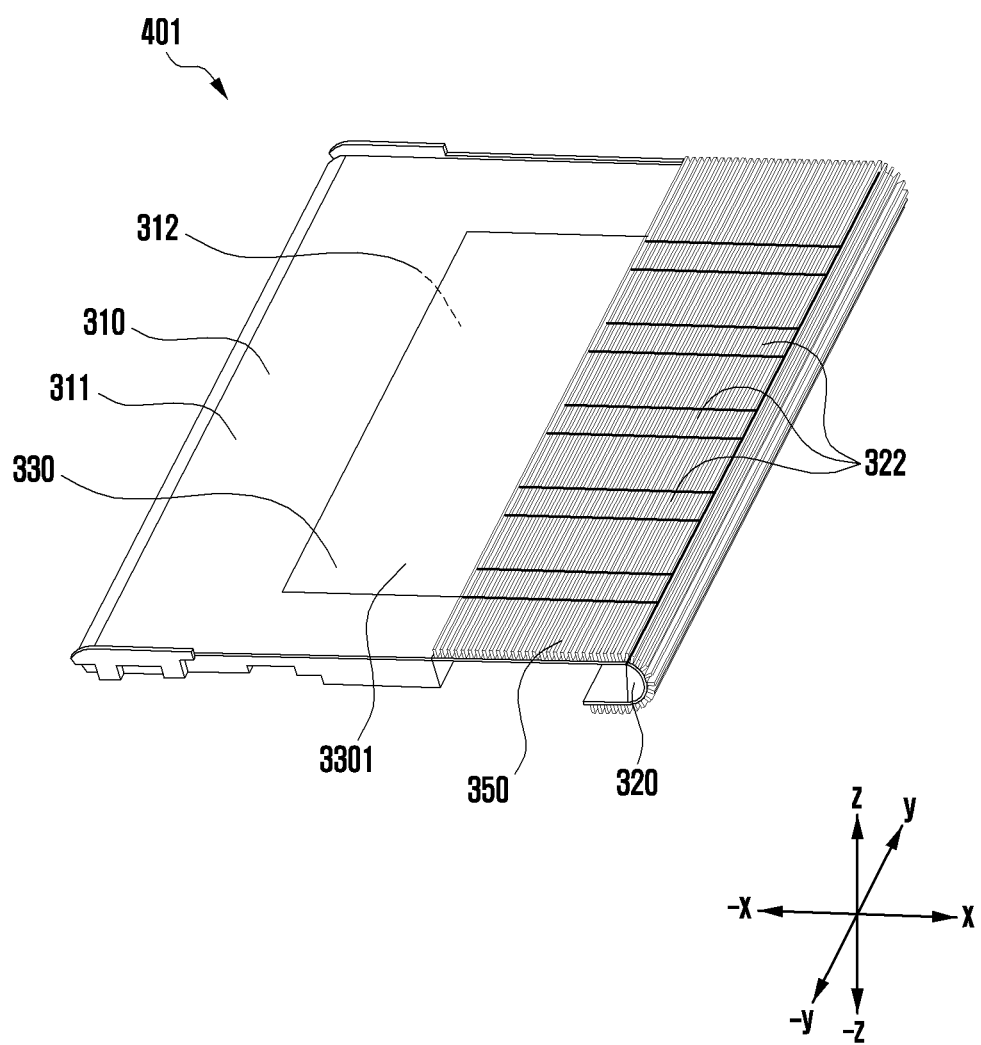
FIG. 6A is a front perspective view of a display support member in a second state according to various embodiments.
Figure 6B:
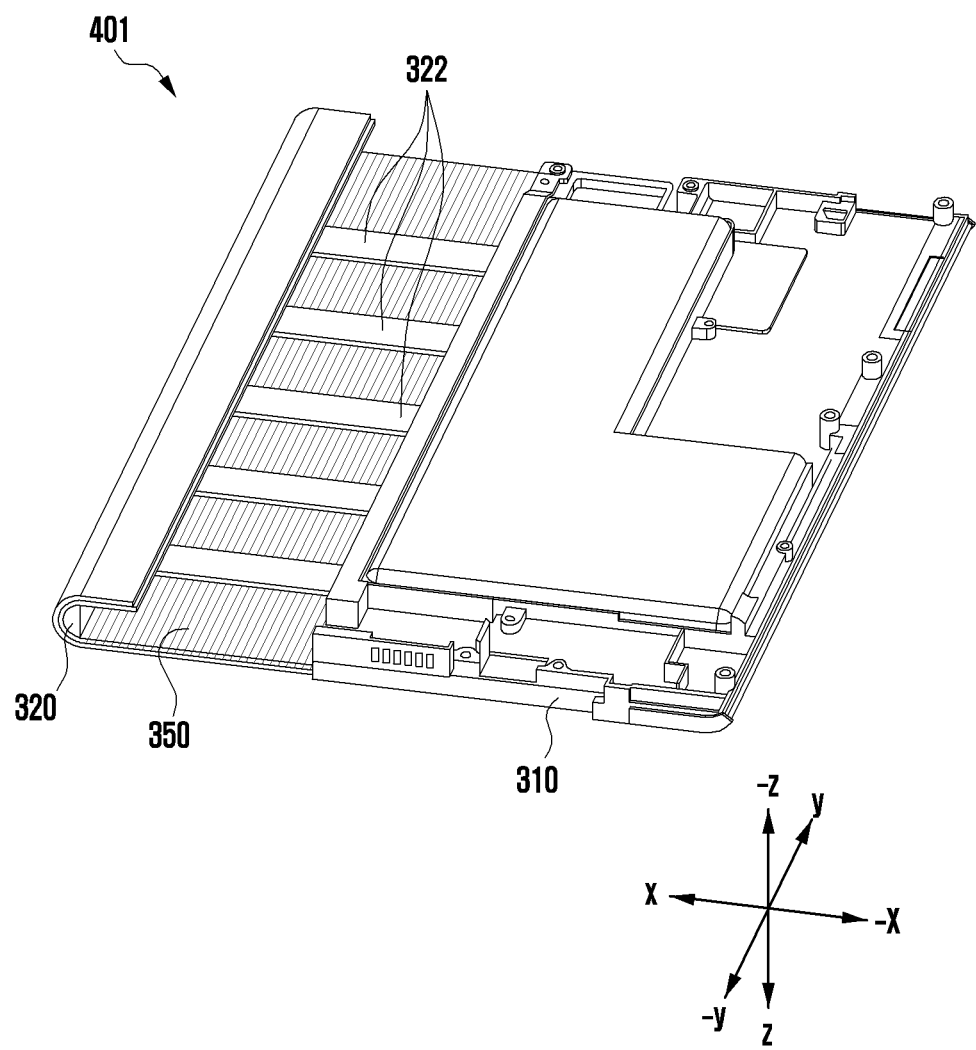
FIG. 6B is a rear perspective view of a display support member according in a second state according to various embodiments.

FIGS. 6A and 6B are combined perspective views of the display support member 401 in a second state according to various embodiments. For example, FIG. 6A is a front perspective view of the display support member 401 in the second state according to various embodiments, and FIG. 6B is a rear perspective view of the display support member 401 in the second state according to various embodiments.

The display support member 401 illustrated in FIGS. 6A and 6B may include an embodiment which is at least partially similar to or different from that of the display support member 401 illustrated in FIGS. 3, 4 and 5. Hereinafter, in relation to FIGS. 6A and 6B, a description will be made of features of the display support member 401, which have not been described in FIGS. 3, 4 and 5 or are different from those in FIGS. 3, 4 and 5.

Referring to FIGS. 6A and 6B, in the case of a display support member (e.g., the display support member 401 in FIG. 4) of an electronic device (e.g., the electronic device 100 in FIG. 1) in the second state (e.g., the extended state), the first surface 311 of the bracket 310 and the support plate 330 seated in the recess 312 of the bracket 310 may support the first portion 130a of the rollable display 130, and the bendable member 350 supported by the sliding support 320 may support the second portion 130b of the rollable display 130.

According to an embodiment, in the second state (e.g., the extended state), the first portion 130a and the second portion 130b of the rollable display 130 may be visible to the outside. For example, the first portion 130a of the rollable display 130, which is visually exposed to the outside, may be supported by the first surface 311 of the bracket 310 and the support plate 330 seated in the recess 312 of the bracket 310, and the second portion 130b of the rollable display 130, which is visually exposed to the outside, may be supported by the bendable member 350 which is substantially supported by the sliding support 320.

According to an embodiment, in the second state of the electronic device 100, the first portion 130a of the rollable display 130 may be seated on the upper surface 3301 of the support plate 330 and the first surface 311 of the bracket 310, which are formed substantially parallel to each other.

According to an embodiment, in the second state of the electronic device 100, the multiple sliding bars 322 of the sliding support 320 may slide out of the second recess 312b of the bracket 310. According to an embodiment, the multiple sliding bars 322, which have slid out of the multiple second recesses 312b, may support the bendable member 350, and the bendable member 350 may support the second portion 130b of the rollable display 130. For example, the multiple sliding bars 322, which have slid out of the second recesses 312b, may support the bendable member 350, thereby supporting the second portion 130b of the rollable display 130.

According to an embodiment, in the second state, the support plate 330 is disposed so as to compensate for the height difference between the first surface 311 of the bracket 310 and the recess 312, and thus sagging or drooping in the downward direction (e.g., in a −z direction) by external pressure (e.g., pressure applied in the −z direction, the external pressure 901 in FIG. 9) of a part of the first portion 130a of the rollable display 130, which is placed to overlap the support plate 330 with reference to a z-axis, may be prevented and/or reduced. For example, the height of the recess 312 is formed to be larger than the height of the first surface 311 of the bracket 310, and thus a space (e.g., the space 801 in FIG. 8) for receiving the multiple sliding bars 322 in the first state may be formed in a region corresponding to the recess 312. According to an embodiment, the space (e.g., the space 801 in FIG. 8) receives the multiple sliding bars 322 in the first state of the electronic device 100, but is empty in the second state of the electronic device 100. If the space (e.g., the space 801 in FIG. 8) is empty, at least a portion of the rollable display 130, which is disposed to overlap the space (e.g., the space 801 in FIG. 8), may sag or droop by pressure which presses the rollable display 130 in the downward direction (e.g., in the −z direction). In the electronic device 100 according to various embodiments, disposing the support plate 330 so as to correspond to the recess 312 may reduce the phenomenon in which a portion of the rollable display 130 sags or droops by pressure which presses the rollable display 130 in the downward direction (e.g., in the −z direction). For example, in the second state of the electronic device 100, the space (e.g., the space 801 in FIG. 8) formed by the recess 312 is empty, but the support plate 330 is seated above the space (e.g., the space 801 in FIG. 8) (e.g., in the z direction) and thus a structure of supporting the rollable display 130 may be strengthened.

According to an embodiment, the direction in which the multiple hinge bars 351 of the bendable member 350 are disposed may be perpendicular to the direction in which the multiple sliding bars 322 supporting the same are disposed. According to an embodiment, the direction in which the multiple hinge bars 351 are disposed is perpendicular to the direction in which the multiple sliding bars 322 are disposed, and thus the bendable member 350 may have a strengthened support structure against pressure applied in the downward direction (e.g., the −z direction) in the second state. According to an embodiment, in the second state, due to the structure, the bendable member 350 has the strengthened support structure against pressure applied in the downward direction (e.g., the −z direction), and thus the second portion 130b of the rollable display 130 may be prevented from sagging or drooping in the downward direction (e.g., the −z direction).

According to an embodiment, the shapes of the multiple sliding bars 322 are not limited to the illustrated embodiment, and the shapes and/or positions of the multiple sliding bars 322 may be changed depending on various embodiments. For example, the multiple sliding bars 322 may be spaced apart from each other at different intervals rather than a designated interval. For example, the multiple sliding bars 322 may be disposed such that intervals therebetween are a first interval, a second interval smaller than the first interval, the second interval, and the first interval from a −y direction toward a +y direction. For example, the multiple sliding bars 322 may be disposed to be symmetrical about the x-axis at the center of the sliding support 320. According to various embodiments, the multiple sliding bars 322 may be disposed to be asymmetrical about the x-axis at the center of the sliding support 320. For example, the multiple sliding bars 322 may be disposed at a first interval in the −y direction and at a second intervals larger than the first interval in the +y direction about the x-axis at the center of the sliding support 320.

Figure 7A:
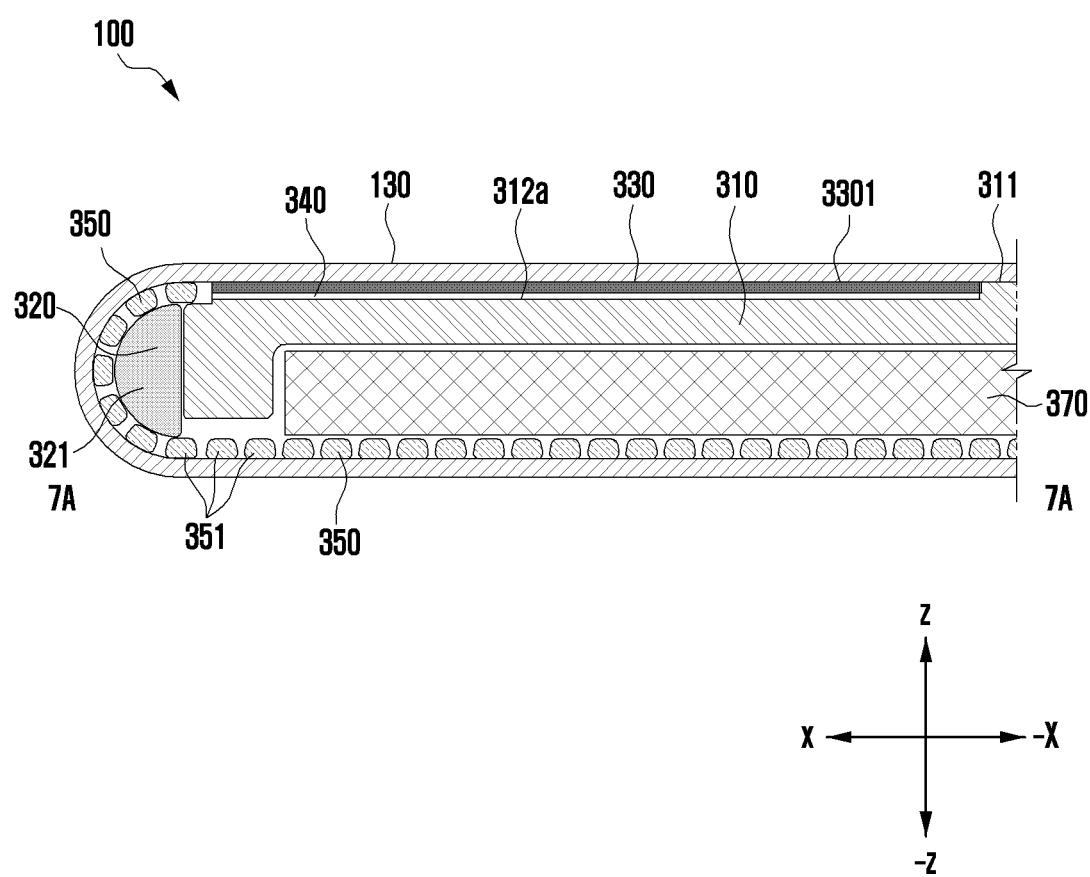
FIG. 7A is a cross sectional view of a display support member, taken along line 7A-7A in FIG. 5 according to various embodiments.
Figure 7B:
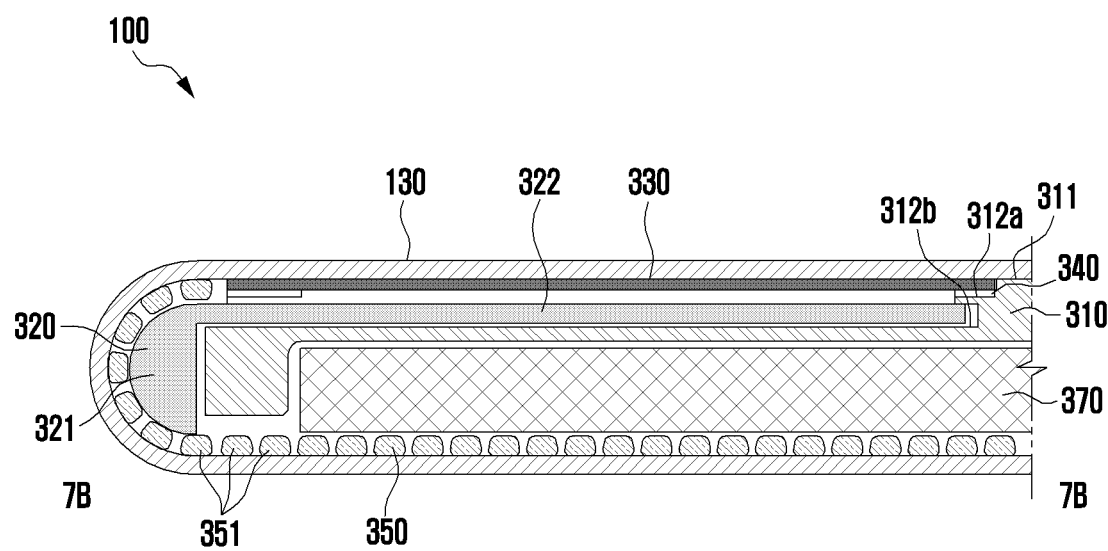
FIG. 7B is a cross sectional vies of a display support member, taken along line 7B-7B in FIG. 5 according to various embodiments.
Figure 7B:
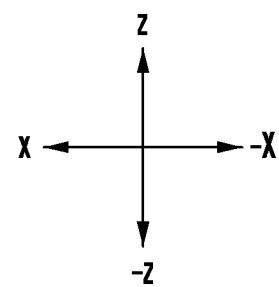

FIGS. 7A and 7B are cross-sectional views of the display support member 401 in the first state according to various embodiments.

For example, FIG. 7A is a cross sectional view of the display support member 401, taken along line 7A-7A in FIG. 5 according to various embodiments, and FIG. 7B is a cross sectional view of the display support member 401, taken along line 7B-7B in FIG. 5 according to various embodiments.

The electronic device 100 illustrated in FIGS. 7A and 7B may include an embodiment which is at least partially similar to or different from that of the electronic device 100 illustrated in FIGS. 1, 2, 3, 4 and 5. Hereinafter, in relation to FIGS. 7A and 7B, a description will be made of features of the electronic device 100, which have not been described in FIGS. 1, 2, 3, 4 and 5 or are different from those in FIGS. 1, 2, 3, 4 and 5.

Referring to FIGS. 7A and 7B, in the first state (e.g., the retracted state) of the electronic device 100 according to an embodiment, the multiple sliding bars 322 of the sliding support 320 may slide into the second recess 312b of the bracket 310.

According to an embodiment, the support plate 330 may be seated in the first recess 312a having a height greater than a height of the multiple second recesses 312b, and thus the upper surface 3301 of the support plate 330 may be disposed substantially parallel to the first surface 311 of the bracket 310.

According to an embodiment, the support plate 330 is formed to have a thickness which is substantially equal to the height difference between the height of the first recess 312a and the height of the first surface 311 of the bracket 310, and thus the upper surface 3301 of the support plate 330 and the first surface 311 of the bracket 310 may be disposed substantially parallel to each other.

According to an embodiment, in the first state (e.g., the retracted state) of the electronic device 100, the first portion 130a of the rollable display 130 may be seated on the upper surface 3301 of the support plate 330 and the first surface 311 of the bracket 310, which are formed substantially parallel to each other.

According to an embodiment, the adhesive member 340 may be disposed between the first recess 312a and a portion of the support plate 330. According to an embodiment, the first recess 312a and the portion of the support plate 330 may be attached to each other by the adhesive member 340.

According to an embodiment, in the adhesive member 340, portions overlapping (corresponding to) the second recess 312b may be removed.

According to an embodiment, the height difference between the first surface 311 of the bracket 310 and the first recess 312a may be substantially equal to the thickness of the support plate 330 (or the sum of the thickness of the support plate 330 and the thickness of the adhesive member 340).

According to an embodiment, in the first state (e.g., the retracted state), the support plate 330 is disposed to compensate for the height difference between the first surface 311 of the bracket 310 and the first recess 312a and the height difference the first surface 311 and the second recess 312b, and thus sagging or drooping in the downward direction (e.g., in a −z direction) by external pressure (e.g., pressure applied in the −z direction, the external pressure 901 in FIG. 9) of a portion of the first portion 130a of the rollable display 130, which is placed to overlap the support plate 330 with reference to a z-axis, may be prevented and/or reduced. For example, the bracket 310 may include the second recess 312b for providing a space (e.g., the space 801 in FIG. 8) into which the multiple sliding bars 322 slide in the first state of the electronic device 100, and the support plate 330 is disposed on the first recess 312a and/or the second recess 312b, and thus the phenomenon in which the rollable display 130 sags or droops in the downward direction (e.g., in the −z direction) by external pressure (e.g., pressure applied in the −z direction, the external pressure 901 in FIG. 9) may be reduced. The support plate 330 may be formed such that a portion thereof corresponding to the first recess 312a and the second recess 312b is substantially equal to the height of the first surface 311 of the bracket 310. Therefore, the first portion 130a of the rollable display 130 may be supported by a substantially flat surface at a portion corresponding to the bracket 310, and may be tightly supported without drooping due to external pressure (e.g., pressure applied in the −z direction, the external pressure 901 in FIG. 9).

In FIGS. 7A and 7B, reference numeral 370, which has not been described, may correspond to a battery 370 (e.g., the battery 370 in FIG. 3) which is received in the inner space of the bracket 310.

FIG. 8 is a cross-sectional view of the display support member 401 in a second state of the electronic device 100 according to various embodiments. FIG. 9 is a cross-sectional view of the display support member 401 in a second state of the electronic device 900 in a comparative example.

The electronic device 100 illustrated in FIG. 8 may include an embodiment which is at least partially similar to or different from that of the electronic device 100 illustrated in FIGS. 1, 2, 3, 4 and 5.

Referring to FIG. 8, in the case of a display support member (e.g., the display support member 401 in FIG. 4) of an electronic device (e.g., the electronic device 100 in FIG. 1) in the second state (e.g., the extended state), the first surface 311 of the bracket 310 and the support plate 330 seated in a first recess (e.g., the first recess 312a in FIG. 7A) of the bracket 310 may support the first portion 130a of the rollable display 130, and the bendable member 350 supported by the sliding support 320 may support the second portion 130b of the rollable display 130.

According to an embodiment, in the second state of the electronic device 100, the first portion 130a of the rollable display 130 may be seated on the upper surface 3301 of the support plate 330 and the first surface 311 of the bracket 310, which are formed substantially parallel to each other.

According to an embodiment, in the second state, the support plate 330 is disposed so as to compensate for the height difference between the first surface 311 of the bracket 310 and the second recess 312b, and thus sagging or drooping in the downward direction (e.g., in a −z direction) by external pressure (e.g., pressure applied in the −z direction, the external pressure 901 in FIG. 9) of a portion of the first portion 130a of the rollable display 130, which is placed to overlap the support plate 330 with reference to a z-axis, is prevented and/or reduced. For example, in the second state, the multiple sliding bars 322 slide out and thus an empty space 801 is formed in a region corresponding to the second recess 312b. According to an embodiment, the space 801 receives the multiple sliding bars 322 in the first state of the electronic device 100, but is empty in the second state of the electronic device 100. If the space 801 is empty, at least a portion of the rollable display 130, which is disposed to overlap the space 801, may sag or droop by pressure which presses the rollable display 130 in the downward direction (e.g., the −z direction). In the electronic device 100 according to various embodiments, disposing the support plate 330 may reduce the phenomenon in which a portion of the rollable display 130 sags or droops by pressure which presses the rollable display 130 in the downward direction (e.g., the −z direction). For example, in the second state of the electronic device 100, the space 801 formed by the second recess 312b is empty, but the support plate 330 may be seated above the space 801 (e.g., in the z direction), and thus a structure of supporting the rollable display 130 may be strengthened.

Unlike the electronic device 100 according to an embodiment illustrated in FIG. 8, an electronic device 900 according to the comparative example illustrated in FIG. 9 may not include the support plate 330. The electronic device 900 according to the comparative example does not include the support plate 330, and thus a structure of supporting the rollable display 130 in a partial region corresponding to the space 801 may be vulnerable. For example, in the electronic device 900 according to the comparative example, when the space 801 is empty in the second state, a portion of the rollable display 130 may sag or droop by pressure 901 which presses the rollable display 130 in the downward direction (e.g., the −z direction).

Figure 10:
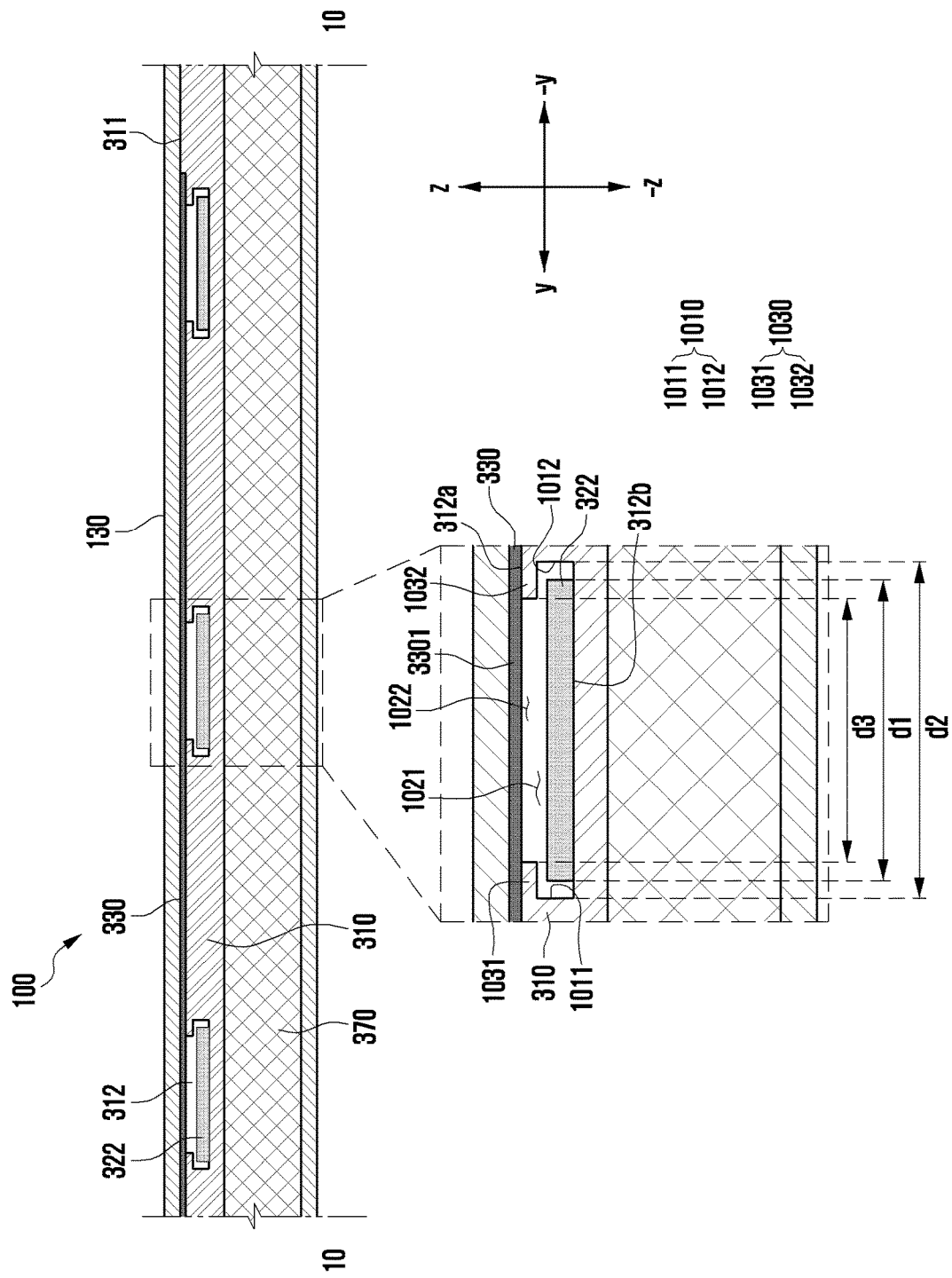
FIG. 10 is a cross-sectional view illustrating multiple sliding bars of a sliding support seated in a bracket according to various embodiments.

FIG. 10 is a cross-sectional view illustrating a state in which the multiple sliding bars 322 of the sliding support 320 are seated in the bracket 310 according to various embodiments. For example, FIG. 10 illustrates at least a part of the cross section of the center axis 401, taken along line 10-10 in FIG. 5.

The electronic device 100 illustrated in FIG. 10 may include an embodiment which is at least partially similar to or different from that of the electronic device 100 illustrated in FIGS. 1, 2, 3, 4 and 5.

Referring to FIG. 10, in a first state (e.g., the retracted state) of the electronic device 100 according to an embodiment, the multiple sliding bars 322 of the sliding support 320 may slide into the multiple second recesses 312b of the bracket 310.

According to an embodiment, the support plate 330 may be seated in the first recess 312a having a larger height than the multiple second recesses 312b, and thus the upper surface 3301 of the support plate 330 may be disposed substantially parallel to the first surface 311 of the bracket 310.

According to an embodiment, in the first state (e.g., the retracted state) of the electronic device 100, the first portion 130a of the rollable display 130 may be seated on the upper surface 3301 of the support plate 330 and the first surface 311 of the bracket 310, which are formed substantially parallel to each other.

According to an embodiment, the width of each of the second recesses 312b, providing a space 1021 in which a corresponding sliding bar 322 slides, may be larger than the width of the sliding bar 322. According to an embodiment, the sliding bar 322 may have a first width (d1), and the second recess 312b may have a second width (d2) that is larger than the first width (d1).

According to an embodiment, a protrusion portion 1030, which has substantially the same height as the first recess 312a and protrudes from each of both sides of the second recess 312b toward the center of the second recess 312b, may be formed on a side wall 1010 forming a step between the first recess 312a and the second recess 312b. According to an embodiment, a first protrusion portion 1031 may be formed on a first side wall 1011 extending from one side of the second recess 312b, wherein the first protrusion portion 1031 protrudes from a portion of the first side wall 1011 toward the center of the second recess 312b (e.g., in the −y direction from the first side wall 1011) and has substantially the same height as the first recess 312a. According to an embodiment, a second protrusion portion 1032 may be formed on a second side wall 1012 extending from the other side of the second recess 312b, wherein the second protrusion portion 1032 protrudes from a portion of the second side wall 1012 toward the center of the second recess 312b (e.g., in the +y direction from the second side wall 1012) and has substantially the same height as the first recess 312a. According to an embodiment, an opening 1022, through which the second recess 312b is at least partially viewable, may be formed between the first protrusion portion 1031 and the second protrusion portion 1032, and the width of the opening 1022 may have a third width (d3) that is smaller than the first width (d1) of the sliding bar 322. According to various embodiments, the third width (d3) may be formed to be about 8 mm-about 10 mm, and the shape of the protrusion portion 1030, corresponding to the difference between the first width (d1) and the third width (d3), is not limited to the illustrated example, and may be variously formed. For example, the sizes (e.g., lengths) of the first protrusion portion 1031 and the second protrusion portion 1032 may be asymmetrically formed, and the size of the first protrusion portion 1031 may be larger than the size of the second protrusion portion 1032. Further, the size of the second protrusion portion 1032 may be formed such that the second protrusion portion 1032 is substantially parallel to the second side wall 1012 in the z-axis direction.

In the electronic device 100 according to an embodiment, the protrusion portion 1030 may be formed on the side wall 1010 forming a step between the first recess 312a and the second recess 312b, thereby preventing the movement of the sliding bar 322 which has slid in the second recess 312b. For example, the opening 1022 formed by the protrusion portion 1030 has the third width (d3) and the sliding bar 322 has the first width (d1) that is larger than the third width (d3). Therefore, in the space 1021 formed by the second recess 312b, the sliding bar 322 may slide in a direction in which the second recess 312b is formed. For example, the sliding bar 322 has the first width (d1) larger than the third width (d3) of the opening 1022, and may thus be prevented from moving in the vertical direction (e.g., the z direction or the −z direction).

In FIG. 10, reference numeral 370, which has not been described, may correspond to a battery 370 (e.g., the battery 370 in FIG. 3) which is received in the inner space of the bracket 310.

Figure 11:
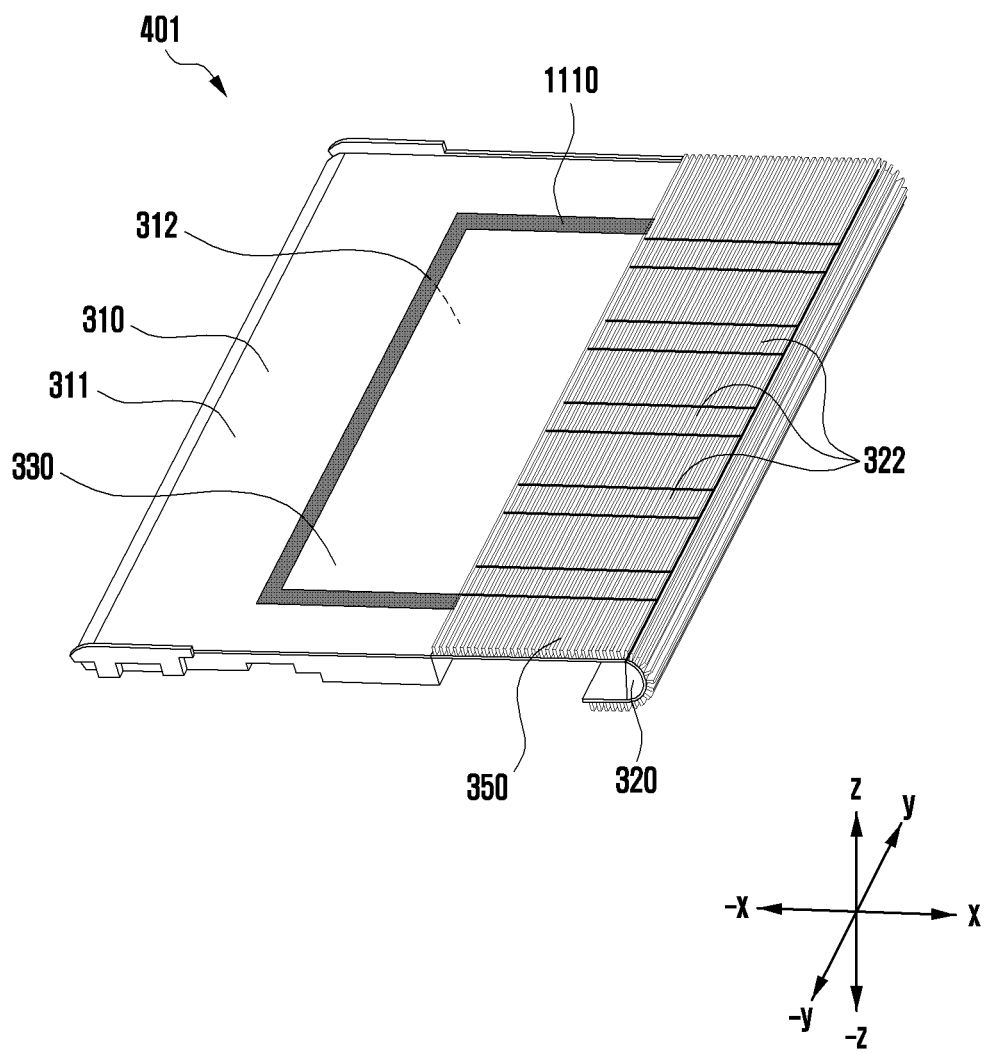
FIG. 11 is a front perspective view of a display support member according to various embodiments.
Figure 12:
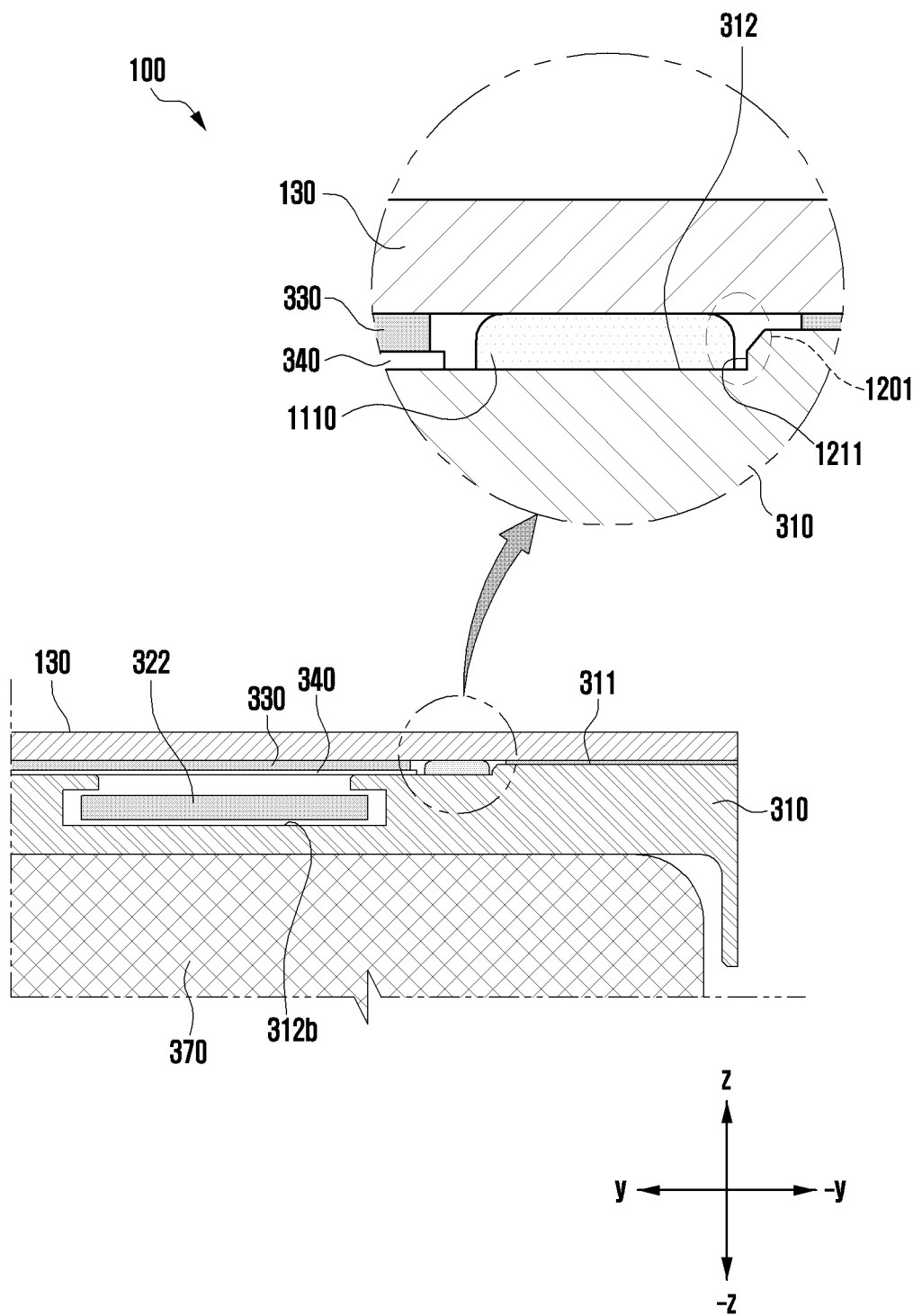
FIG. 12 is a cross-sectional view illustrating a cushion member included in a display support member according to various embodiments.

FIG. 11 is a front perspective view of the display support member 401 according to various embodiments. FIG. 12 is a cross-sectional view illustrating a cushion member included in the display support member 401 according to various embodiments.

The electronic device 100 illustrated in FIGS. 11 and 12 may include an embodiment which is at least partially similar to or different from that of the electronic device 100 illustrated in FIGS. 1, 2, 3, 4 and 5. Hereinafter, in relation to FIGS. 11 and 12, a description will be made of features of the electronic device 100, which have not been described in FIGS. 1, 2, 3, 4 and 5 or are different from those in FIGS. 1, 2, 3, 4 and 5.

Referring to FIGS. 11 and 12, in the display support member 401 (e.g., the display support member 401 in FIG. 4) according to an embodiment, a cushion member 1110 may be disposed adjacent to a side wall 1211 between the first surface 311 of the bracket 310 and the recess 312.

According to an embodiment, the cushion member 1110 may be formed to surround the edge of the recess 312 (e.g., the edge of the first recess 312a), which is adjacent to the first surface 311. According to an embodiment, the cushion member 1110 may be disposed adjacent to the side wall 1211 which is formed between the first surface 311 and the first recess 312a in which the support plate 330 is seated.

According to an embodiment, the cushion member 1110 may be formed of a material such as rubber or urethane. The cushion member 1110 according to an embodiment may be placed adjacent to the end of the support plate 330 (e.g., the edge of the support plate 330) which is seated in the recess 312 of the bracket 310, and thus may prevent and/or reduce the rollable display 130 from being damaged (e.g., dented or torn) by a collision between the edge of the support plate 330 and the side wall 1211 which is formed between the first recess 312a and the first surface 311.

According to an embodiment, the cushion member 1110 may reduce a defect in which a gap 1201 between the first recess 312a and the first surface 311, which may occur during a component assembly process, is viewed from the outside through at least a portion of the rollable display 130. For example, the cushion member 1110 may reduce the width of the gap 1201 between the first recess 312a and the first surface 311, which may be generated during the component assembly process, and may thus reduce a defect in which the gap 1201 is viewable from the outside.

According to an embodiment, although not illustrated, the cushion member 1110 may not only be disposed adjacent to the side wall 1211 between the first surface 311 and the first recess 312a in which the support plate 330 is seated, but may also be disposed to cover at least a portion of the first surface 311. For example, the cushion member 1110 may be disposed to surround the support plate 330 while covering a portion of the first surface 311 adjacent to the edge of the support plate 330.

According to an embodiment, although not illustrated, the cushion member 1110 may not only be disposed adjacent to the side wall 1211 between the first surface 311 and the first recess 312a in which the support plate 330 is seated, but may also be disposed to cover at least a portion of the support plate 330. For example, the cushion member 1110 may be disposed to cover at least a portion of the support plate 330 along the edge of the plate 330.

In FIG. 12, reference numeral 370, which has not been described, may correspond to a battery 370 (e.g., the battery 370 in FIG. 3) which is received in the inner space of the bracket 310.

Figure 13:
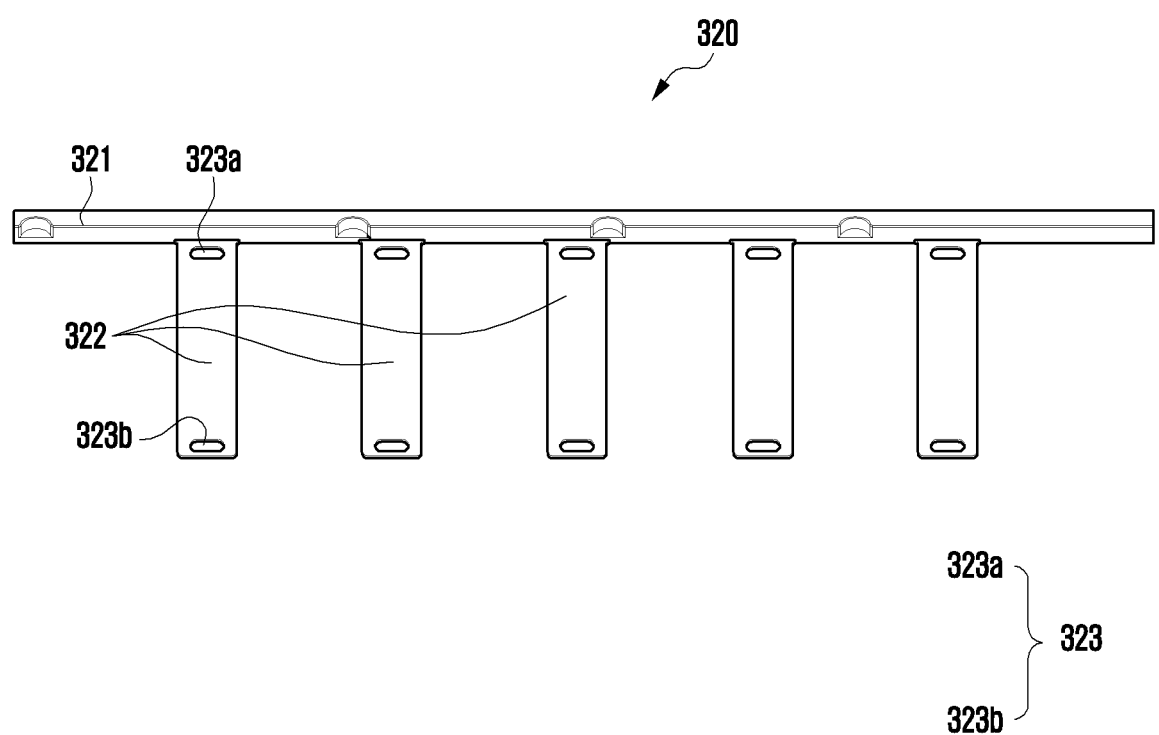
FIG. 13 is a diagram illustrating an example sliding support according to various embodiments.
Figure 14:
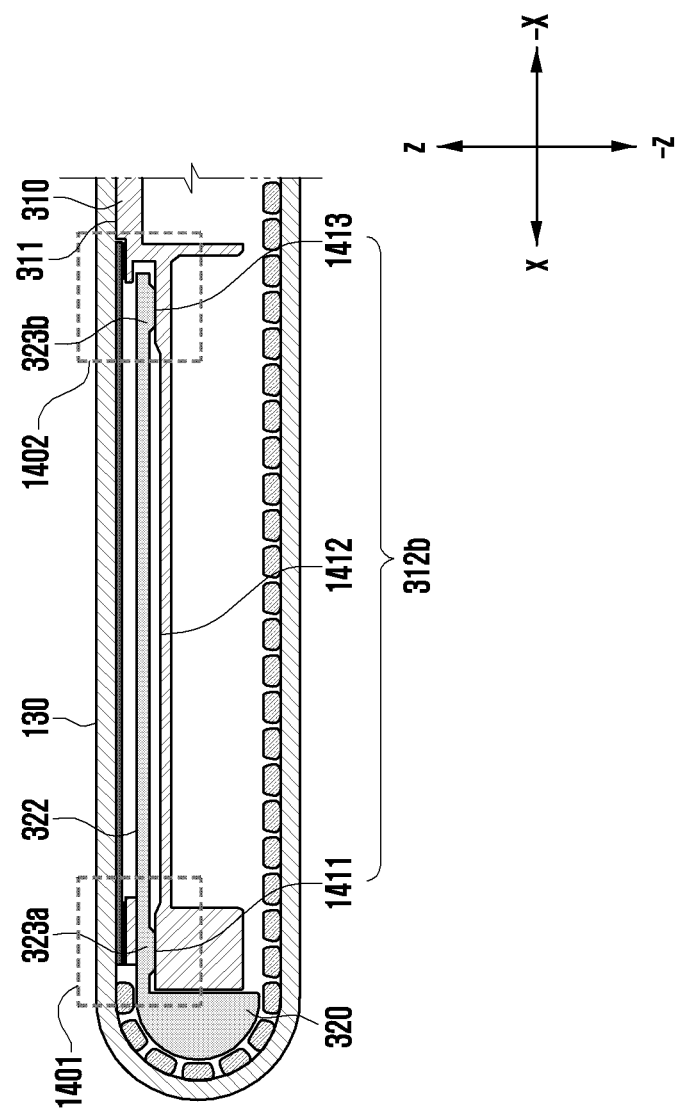
FIG. 14 is a cross-sectional view of a display support member in a first state according to various embodiments.
Figure 15:
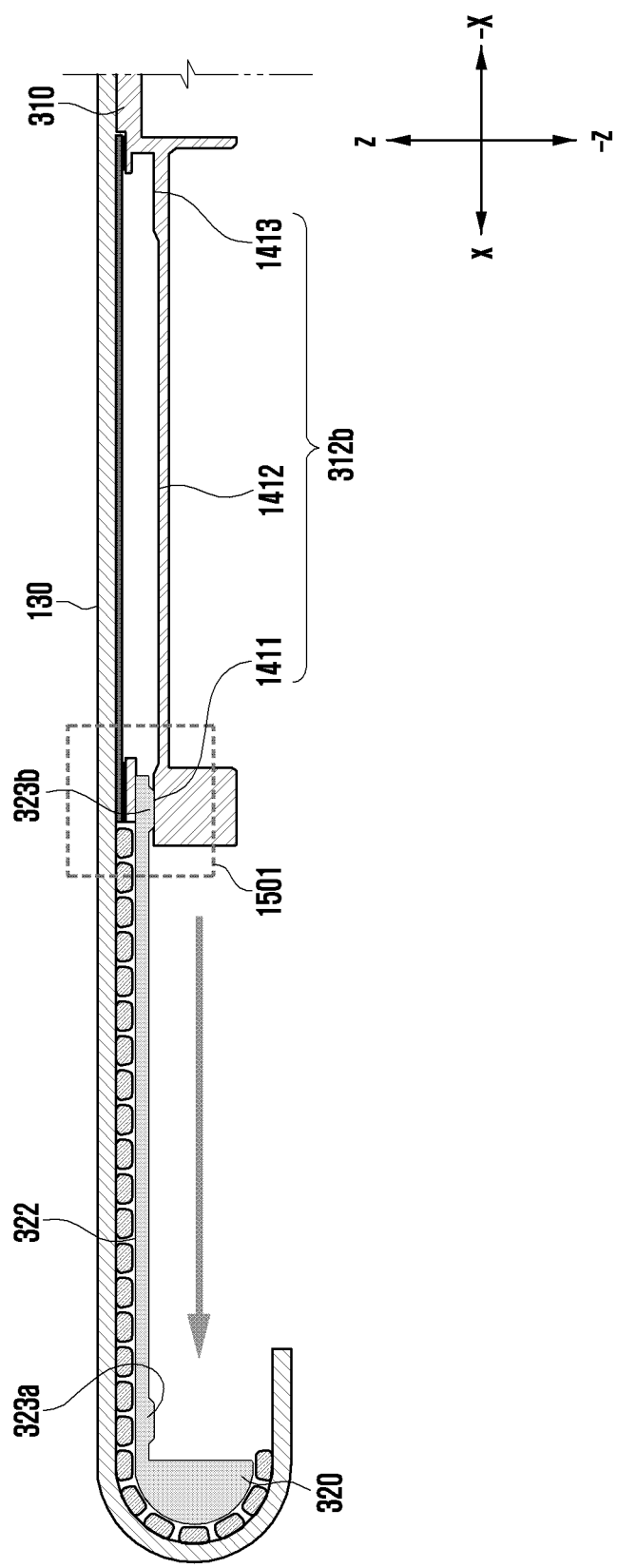
FIG. 15 is a cross-sectional view of a display support member in a second state according to various embodiments.

FIG. 13 is a diagram illustrating the sliding support 320 according to various embodiments. FIG. 14 is a cross-sectional view of the display support member 401 in a first state according to various embodiments. FIG. 15 is a cross-sectional view of the display support member 401 in a second state according to various embodiments. According to an embodiment, the electronic device 100 illustrated in FIGS. 14 and 15 may be an electronic device 100 including the sliding support 320 according to an embodiment, which has been described with reference to FIG. 13.

The sliding support 320 illustrated in FIG. 13 may include an embodiment which is at least partially similar to or different from that of the sliding support 320 illustrated in FIGS. 3, 4 and 5. Hereinafter, in relation to FIG. 13, a description will be made of features of the sliding support 320, which have not been described in FIGS. 3, 4 and 5 or are different from those in FIGS. 3, 4, and 5. The electronic device 100 illustrated in FIGS. 14 and 15 may include an embodiment which is at least partially similar to or different from that of the electronic device 100 illustrated in FIGS. 1, 2, 3, 4 and 5. Hereinafter, in relation to FIGS. 14 and 15, a description will be made of features of the electronic device 100, which have not been described in FIGS. 1, 2, 3, 4 and 5 or are different from those in FIGS. 1, 2, 3, 4 and 5.

Referring to FIGS. 13, 14 and 15, in the sliding support 320 (e.g., the sliding support 320 in FIG. 3) according to an embodiment, a protrusion 323 (e.g., a protrusion portion) may be formed on each of the multiple sliding bars 322. For example, the protrusion 323 may be formed of a material that is substantially identical to those of the multiple sliding bars 322, or may be formed of a material having a cushion function, such as rubber or urethane. According to an embodiment, the protrusion 323 may include a subsidiary material such as low-friction resin, Teflon, or a fluoropolymer.

According to an embodiment, at least one protrusion 323 may be formed on each of the multiple sliding bars 322. For example, the at least one protrusion 323 may be formed downward (e.g., in the −z direction) from each of the multiple sliding bars 322.

According to an embodiment, the protrusion 323 may play the role of preventing and/or reducing the movement of the sliding support 320 when the sliding support 320 is inserted into or drawn out of a portion of the bracket 310.

According to an embodiment, the protrusion 323 may include at least one first protrusion 323a formed at one end of each of the multiple sliding bars 322, and/or at least one second protrusion 323b formed at the other end of each of the multiple sliding bars 322. For example, the first protrusion 323a may be formed on each sliding bar 322, and may be formed on one end of the sliding bar 322, which is closest to the support bar 321. The second protrusion 323b may be formed on each sliding bar 322, and may be formed on the other end of the sliding bar 322, which is farthest from the support bar 321.

Referring to FIG. 14, in a first state (e.g., a retracted state), the first protrusion 323a and the second protrusion 323b may be placed at one end 1411 and the other end 1413 of a second recess 312b in which each of the multiple sliding bars 322 is seated, respectively, thereby preventing and/or reducing the movement of the sliding support 320. For example, the first protrusion 323a is brought into contact with one end 1411 of the second recess 312b, as illustrated in part 1401 in FIG. 14, and the second protrusion 323b is brought into contact with the other end 1413 of the second recess 312b, as shown in part 1402 in FIG. 14, whereby, moving of the sliding support 320 may be prevented and/or reduced.

Referring to FIG. 15, in a second state (e.g., an extended state), the first protrusion 323a may be drawn out from the bracket 310. According to an embodiment, in the second state (e.g., the extended state), the second protrusion 323b may be brought into contact with one end 1411 of the second recess 312b, as shown in part 1501 in FIG. 15, thereby preventing and/or reducing the movement of the sliding support 320.

According to various embodiments, the second recess 312b may include a release region 1412 for smooth movement of each of the multiple sliding bars 322, including the first protrusion 323a and the second protrusion 323b. For example, the release region 1412 (or a third recess) of the second recess 312b may be formed between one end 1411 and the other end 1413 of the second recess 312b, and may be a third recess 1412 having a smaller height than one end 1411 and the other end 1413 of the second recess 312b. In the electronic device 100 according to various embodiments of the disclosure, when a portion of the rollable display 130 slides out, the rollable display 130 may be stably supported, and thus may not sag even when the rollable display 130 is pressed from the outside.

Figure 16:
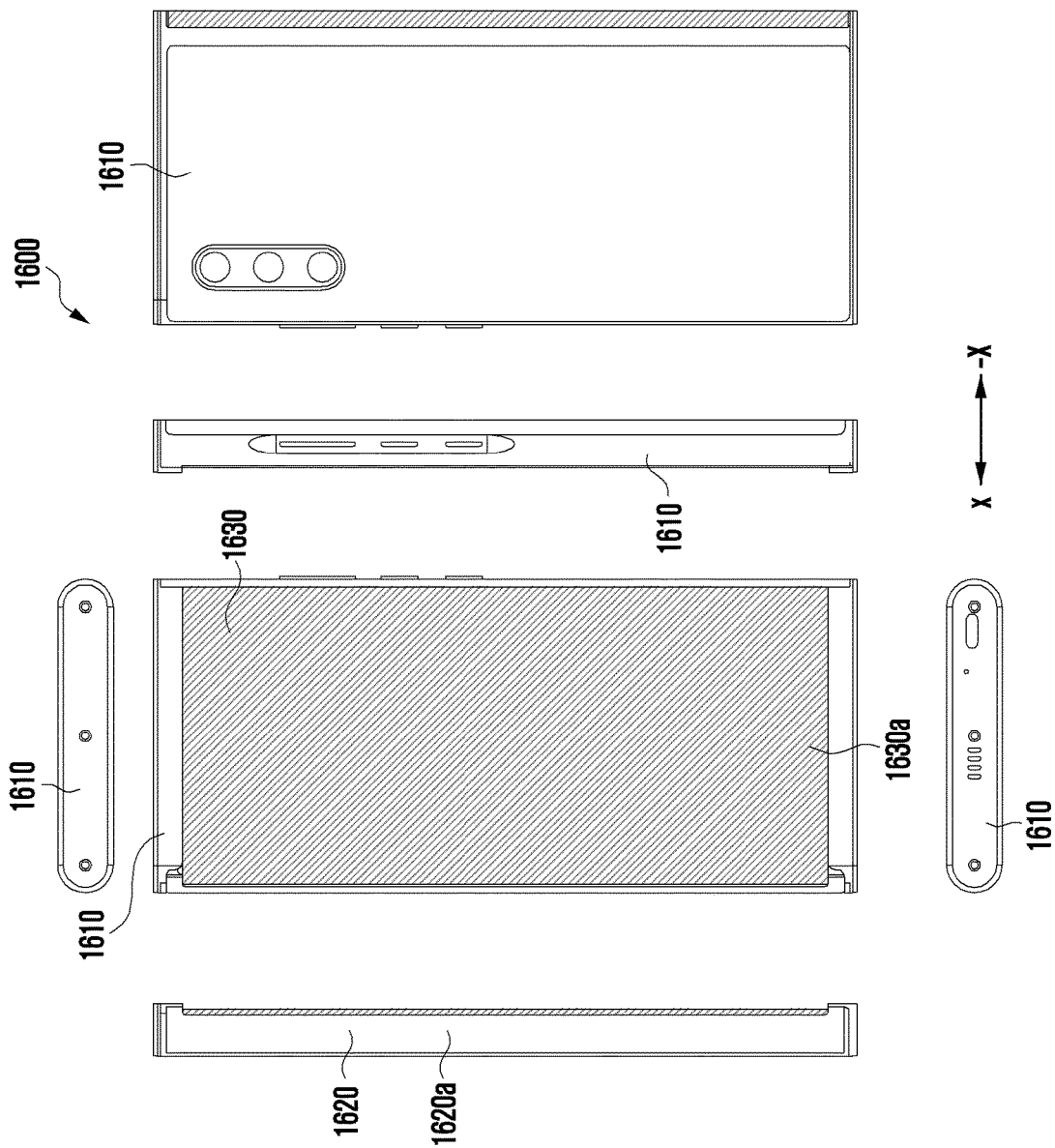
FIG. 16 is a diagram illustrating a first state of an electronic device according to various embodiments.

FIG. 16 is a diagram illustrating a first state of an electronic device according to various embodiments.

Figure 17:
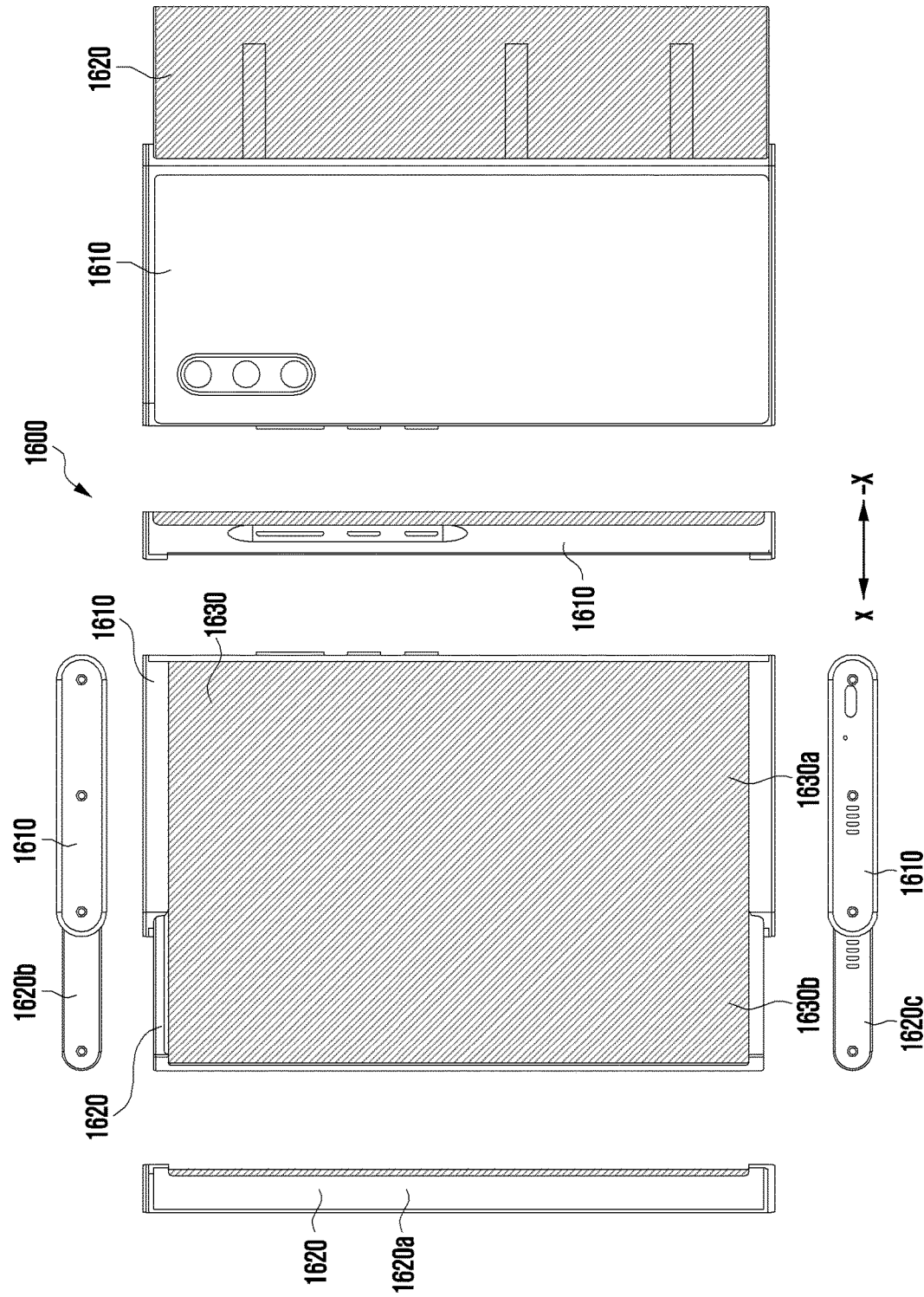
FIG. 17 is a diagram illustrating a second state of an electronic device according to various embodiments.

FIG. 17 is a diagram illustrating a second state of an electronic device according to various embodiments.

Figure 18:
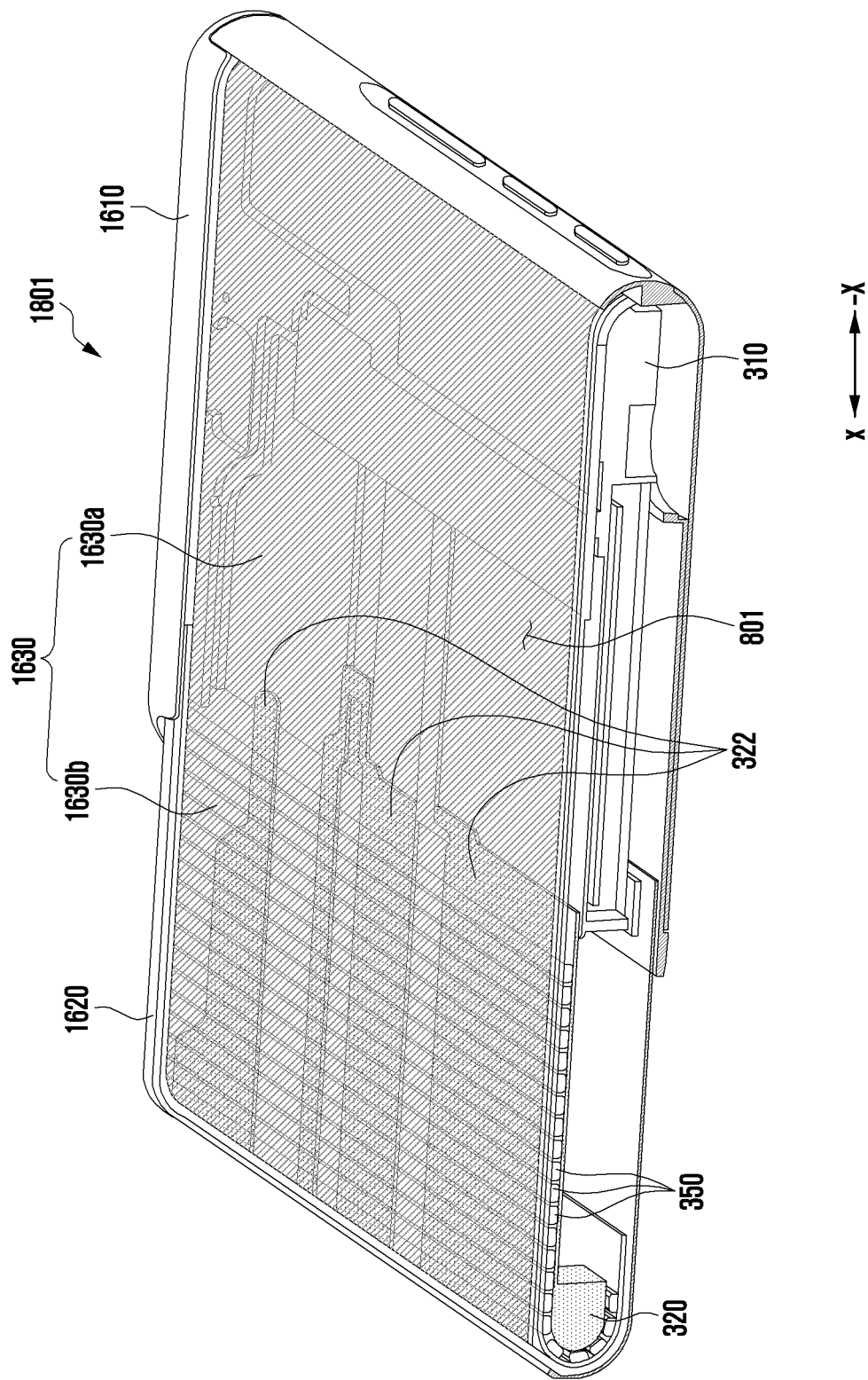
FIG. 18 is a perspective view illustrating a display support member of the electronic device illustrated in FIGS. 16 and 17 according to various embodiments.

FIG. 18 is a perspective view illustrating a display support member of the electronic device illustrated in FIGS. 16 and 17 according to various embodiments.

The electronic device 1600 illustrated in FIGS. 16, 17 and 18 may include an embodiment which is at least partially similar to or different from that of the electronic device 100 or a component (or instrument) of the electronic device 100, illustrated in FIGS. 1 to 15. Hereinafter, an embodiment in relation to FIGS. 16, 17 and 18, will be described.

Referring to FIGS. 16 and 17, an electronic device 1600 according to an embodiment may include a first housing 1610 and a second housing 1620.

According to an embodiment, the second housing 1620 may slide in a first direction (x direction) from the first housing 1610 in a second state, and, in a first state, slide in a second direction (−x direction) opposite to the first direction (x direction) to be coupled to the first housing 1610.

According to an embodiment, in the first state, the second housing 1620 is inserted into the inner space of the first housing 1610, and thus only one side member (e.g., a first side member 1620a) of the second housing 1620 may be visually exposed to the outside. According to an embodiment, the second housing 1620 may include: a first side member 1620a; a second side member 1620b disposed to be connected to one end of the first side member 1620a; and a third side member 1620c disposed to be connected to the other end of the first side member 1620a and disposed opposite to the second side member 1620b.

According to an embodiment, in the first state, the second housing 1620 is inserted into the inner space of the first housing 1610, and thus the first side member 1620a may be visually exposed to the outside, and the second side member 1620b and the third side member 1620c may not be visually exposed to the outside.

According to an embodiment, in the second state, the second housing 1620 is drawn out of the inner space of the first housing 1610, and thus at least some of the first side member 1620a, the second side member 1620b, and the third side member 1620c may be visually exposed to the outside.

According to an embodiment, the electronic device 1600 may include a rollable display 1630, the display area of which varies depending on the movement of the second housing 1620. The rollable display 1630 may include: a first portion 1630a which is visually exposed to the outside in the first state and the second state; and a second portion 1630b which is visually exposed to the outside in the second state and the movement of which is guided by the bendable member 350.

Referring to FIG. 18, the electronic device 1600 according to an embodiment may include a display support member 1801 configured to support the rollable display 1630. According to an embodiment, the display support member 1801 illustrated in FIG. 18 may include an embodiment which is substantially identical to or different from that of the display support member 401 described with reference to FIGS. 5, 6A and 6B.

According to an embodiment, the display support member 1801 may include a bracket 310 (e.g., the bracket 310 in FIG. 6A), a support plate (not shown) (e.g., the support plate 330 in FIG. 6A), a sliding support 320 (e.g., the sliding support 320 in FIG. 6A), and/or a bendable member 350 (e.g., the bendable member 350 in FIG. 6A).

According to an embodiment, the bracket 310 may be disposed in the first housing 1610, and may include a recess which provides a space 801 into which at least a portion of the sliding support 320 slides.

According to an embodiment, the sliding support 320 may move according to sliding of the second housing 1620. According to an embodiment, a portion of the sliding support 320, for example, sliding bars 322 of the slide support member 320, may be inserted into or drawn out of the recess of the bracket 310.

According to an embodiment, in the second state, the sliding bars 322 of the sliding support 320 may support the bendable member 350, thereby supporting the second portion 1630b of the rollable display 1630.

According to an embodiment, an unillustrated support plate (not shown) (e.g., the support plate 330 in FIG. 6A) may be disposed above the space 801 formed by the recess of the bracket 310. For example, the structure or shape of the support plate (not shown) may be substantially identical to or at least partially similar to the structure or shape of the support plate 330, described with reference to FIGS. 4 to 6B. Although not illustrated, the seated structure of the support plate (not shown) is substantially identical to or at least partially similar to the seated structure of the support plate 330, described with reference to FIGS. 4 to 6B.

Figure 19:
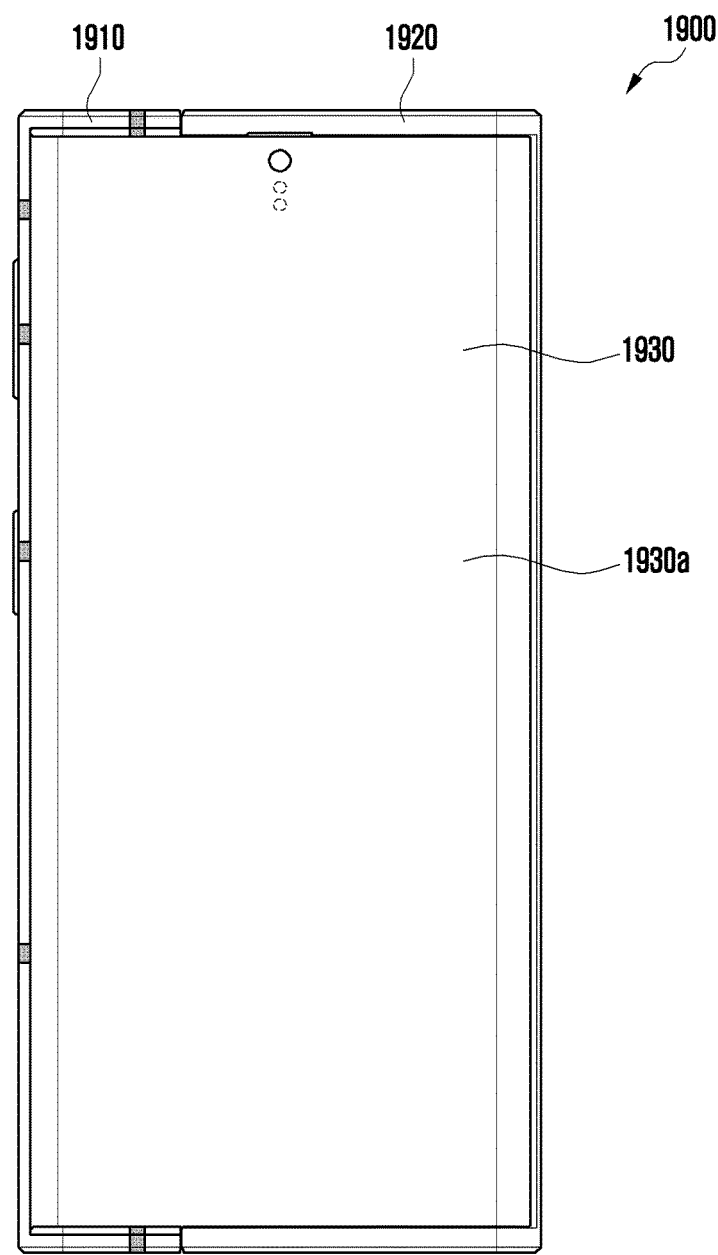
FIG. 19 is a diagram illustrating a first state of an electronic device according to various embodiments.
Figure 19:
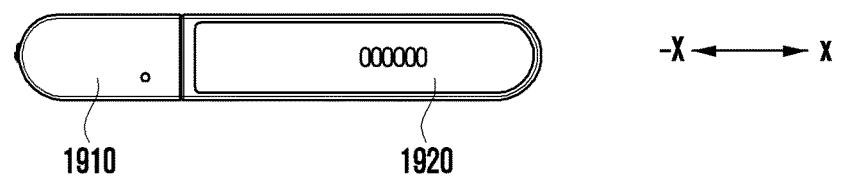

FIG. 19 is a diagram illustrating a first state of an electronic device 1900 according to various embodiments.

Figure 20:
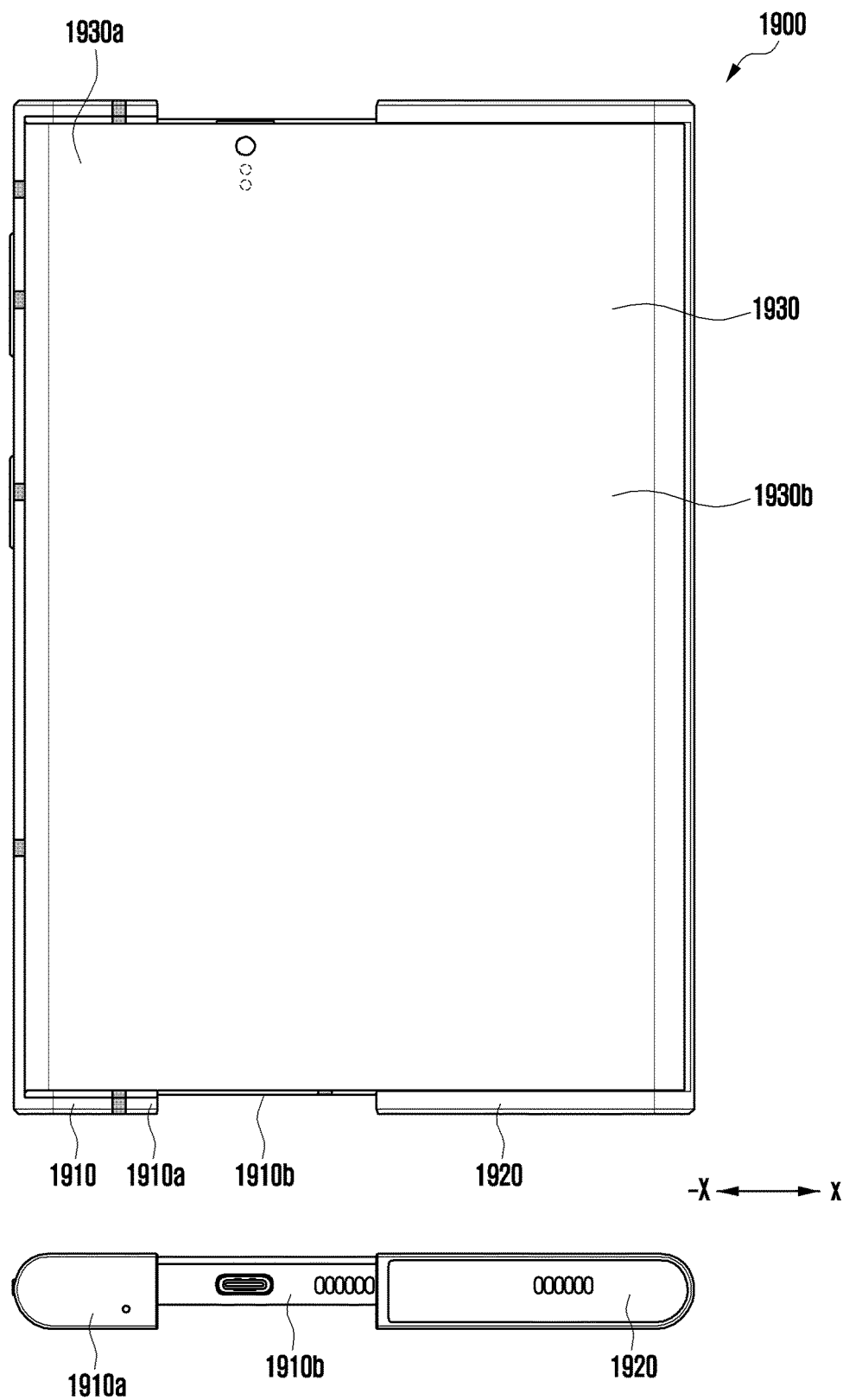
FIG. 20 is a diagram illustrating a second state of the electronic device according to various embodiments.

FIG. 20 is a diagram illustrating a second state of the electronic device 1900 according to various embodiments.

Figure 21:
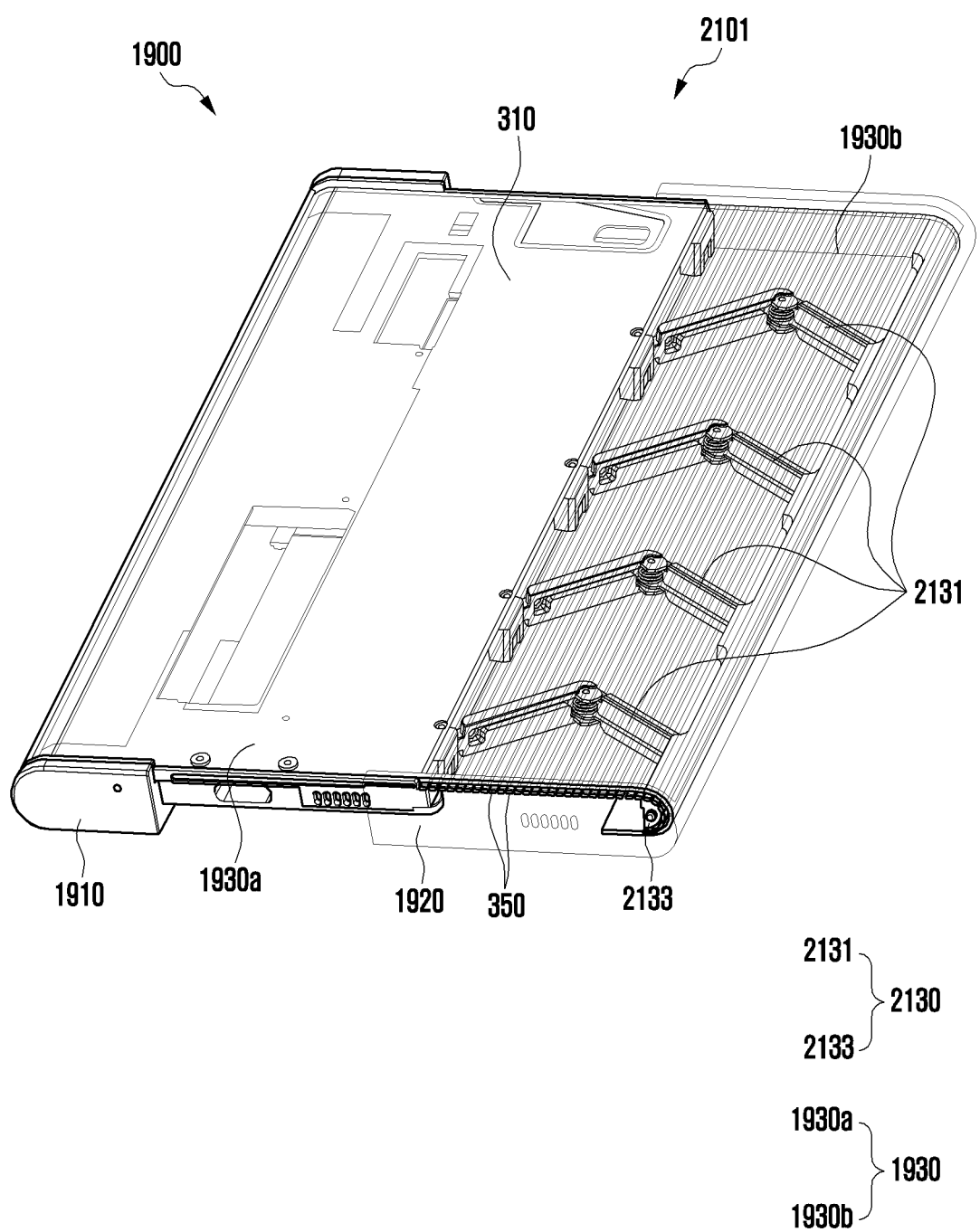
FIG. 21 is a perspective view illustrating a display support member of the electronic device illustrated in FIGS. 19 and 20 according to various embodiments.

FIG. 21 is a perspective view illustrating a display support member of the electronic device 1900 illustrated in FIGS. 19 and 20 according to various embodiments.

Figure 22:
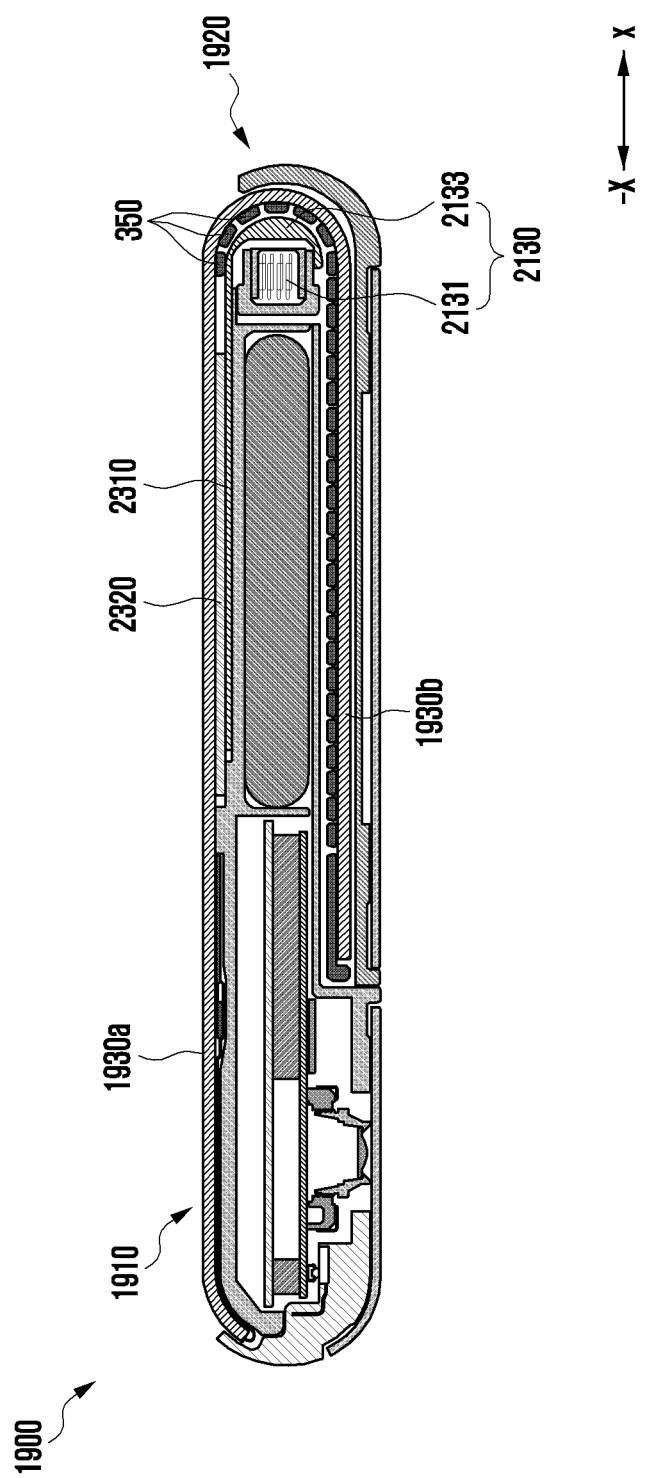
FIG. 22 is a cross-sectional view illustrating the first state of the electronic device illustrated in FIG. 19 according to various embodiments.

FIG. 22 is a cross-sectional view illustrating the first state of the electronic device 1900, illustrated in FIG. 19 according to various embodiments.

Figure 23:
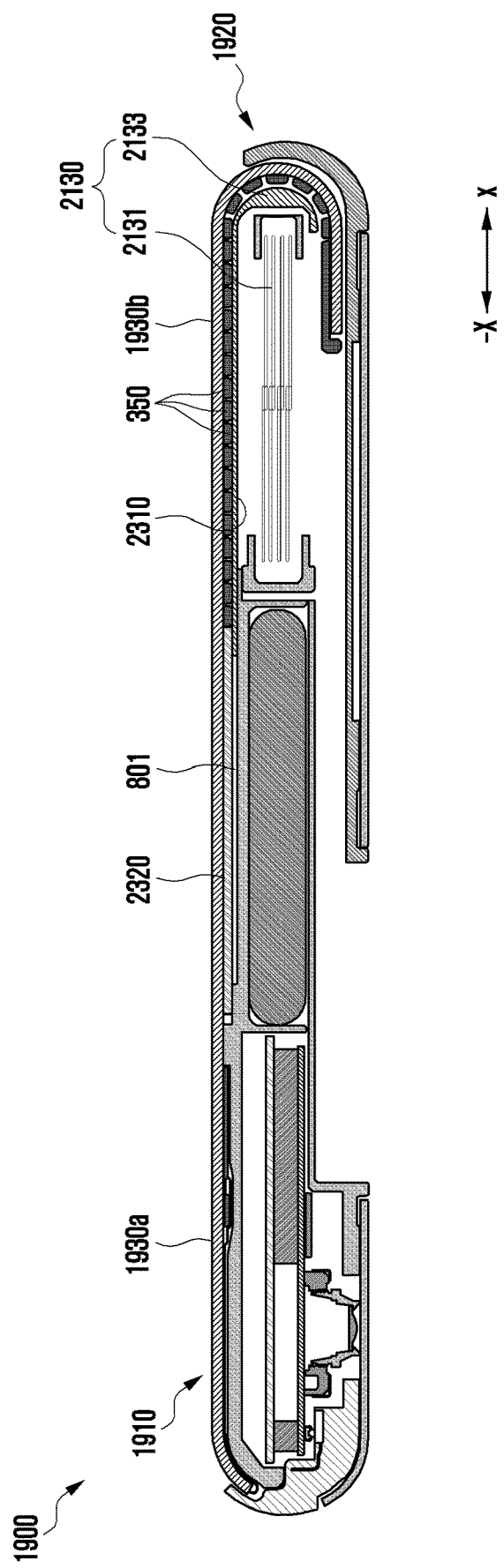
FIG. 23 is a cross-sectional view illustrating the second state of the electronic device illustrated in FIG. 20 according to various embodiments.

FIG. 23 is a cross-sectional view illustrating the second state of the electronic device 1900, illustrated in FIG. 20 according to various embodiments.

The electronic device 1900 illustrated in FIGS. 19, 20, 21, 22 and 23 may include an embodiment which is at least partially similar to or different from that of the electronic device 100 or a component (or instrument) of the electronic device 100, illustrated in FIGS. 1 to 15. Hereinafter, an embodiment in relation to FIGS. 19 to 23, will be described.

Referring to FIGS. 19 and 20, the electronic device 1900 according to an embodiment may include a first housing 1910 and a second housing 1920.

According to an embodiment, the second housing 1920 may slide in a first direction (x direction) from the first housing 1910 in the second state, and, in the first state, may slide in a second direction (−x direction) opposite to the first direction (x direction) to be coupled to the first housing 1910.

According to an embodiment, the first housing 1910 may include side members 1910a and 1910b at least partially surrounding the side surface of the electronic device 1900. According to an embodiment, the side members 1910a and 1910b of the first housing 1910 may include: a first side member 1910a, which is not inserted into the second housing 1920 and is exposed to the outside in the first state (e.g., the retracted state) and/or the second state (e.g., the extended state) of the electronic device 1900; and a second side member 1910b, which is at least partially inserted into and/or drawn out of the inner space of the second housing 1920. For example, the second side member 1910b of the first housing 1910 may not be visually exposed to the outside in the first state (e.g., the retracted state) and is visually exposed to the outside in the second state (e.g., the extended state).

According to an embodiment, the electronic device 1900 may include a rollable display 1930, the display area of which varies depending on the movement of the second housing 1920. The rollable display 1930 may include: a first portion 1930a, which is always visible to the outside in the first state and the second state; and a second portion 1930b, which is visible to the outside in the second state and the movement of which is guided by a bendable member 350.

Referring to FIG. 21, the electronic device 1900 according to an embodiment may include a bracket 310, a folding support member 2130, or the bendable member 350, which functions as a display support member 2101 configured to support the rollable display 1930.

According to an embodiment, the bracket 310 may be disposed in the first housing 1910, and may be disposed to correspond to the first portion 1930a of the rollable display 1930 in the first state and the second state.

According to an embodiment, in the second state, the folding support member 2130 may support the bendable member 350, thereby supporting the second portion 1930b of the rollable display 1930. According to an embodiment, the folding support member 2130 may include: multiple folding members 2131; and a support bar 2133 disposed at one-side ends of the multiple folding members 2131 to connect the multiple folding members 2131 to each other. According to an embodiment, the other-side ends of the multiple folding members 2131 may be fixed to one side of the bracket 310.

According to an embodiment, the folding support member 2130 may be disposed such that, in the first state, the multiple folding members 2131 are folded and brought into contact with one side surface of the bracket 310. According to an embodiment, in the case of the folding support member 2130, in the second state, the multiple folding members 2131 may be unfolded and arranged while being spaced apart from the one side surface of the bracket 310.

Referring to FIGS. 22 and 23, the folding support member 2130 according to an embodiment may further include a sliding support 2310, which is connected to the support bar 2133 and slides according to the movement of the support bar 2133. According to an embodiment, the sliding support 2310 may be inserted into or drawn out of a recess of the bracket 310 according to folding or unfolding of the multiple folding members 2131.

According to an embodiment, in the second state, the sliding support 2310 of the folding support member 2130 may be placed above the folding members 2131, and may support the bendable member 350, thereby supporting the second portion 1930b of the rollable display 1930.

According to an embodiment, a support plate 2320 may be disposed above a space 801 formed by the recess of the bracket 310. For example, the structure or shape of the support plate 2320 may be substantially identical to or at least partially similar to the structure or shape of the support plate 330, described with reference to FIGS. 4, 5, 6A and 6B. Although not illustrated, the seated structure of the support plate 2320 may be substantially identical to or at least partially similar to the seated structure of the support plate 330, described with reference to FIGS. 4 to 6B.

Figure 24:
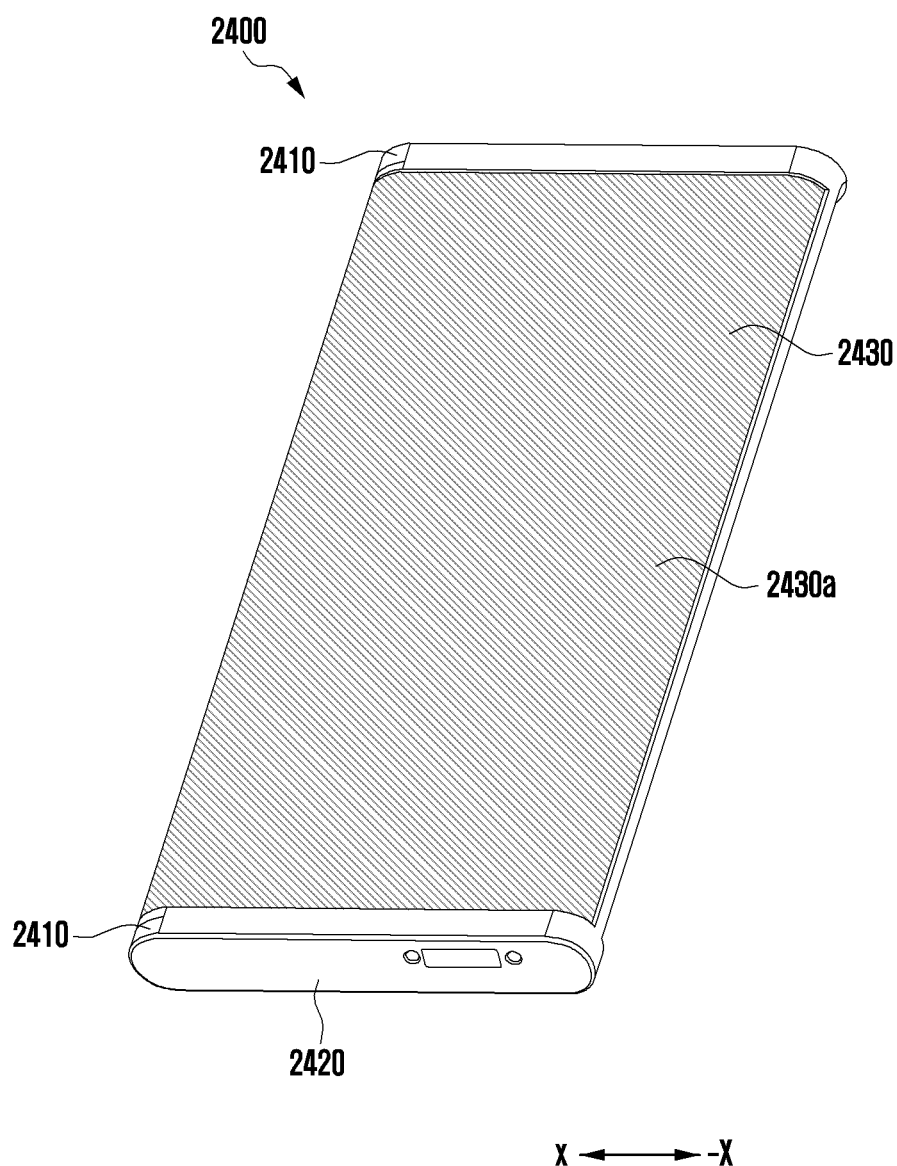
FIG. 24 is a diagram illustrating a first state of an electronic device according to various embodiments.

FIG. 24 illustrates a first state of an electronic device 2400 according to various embodiments.

Figure 25:
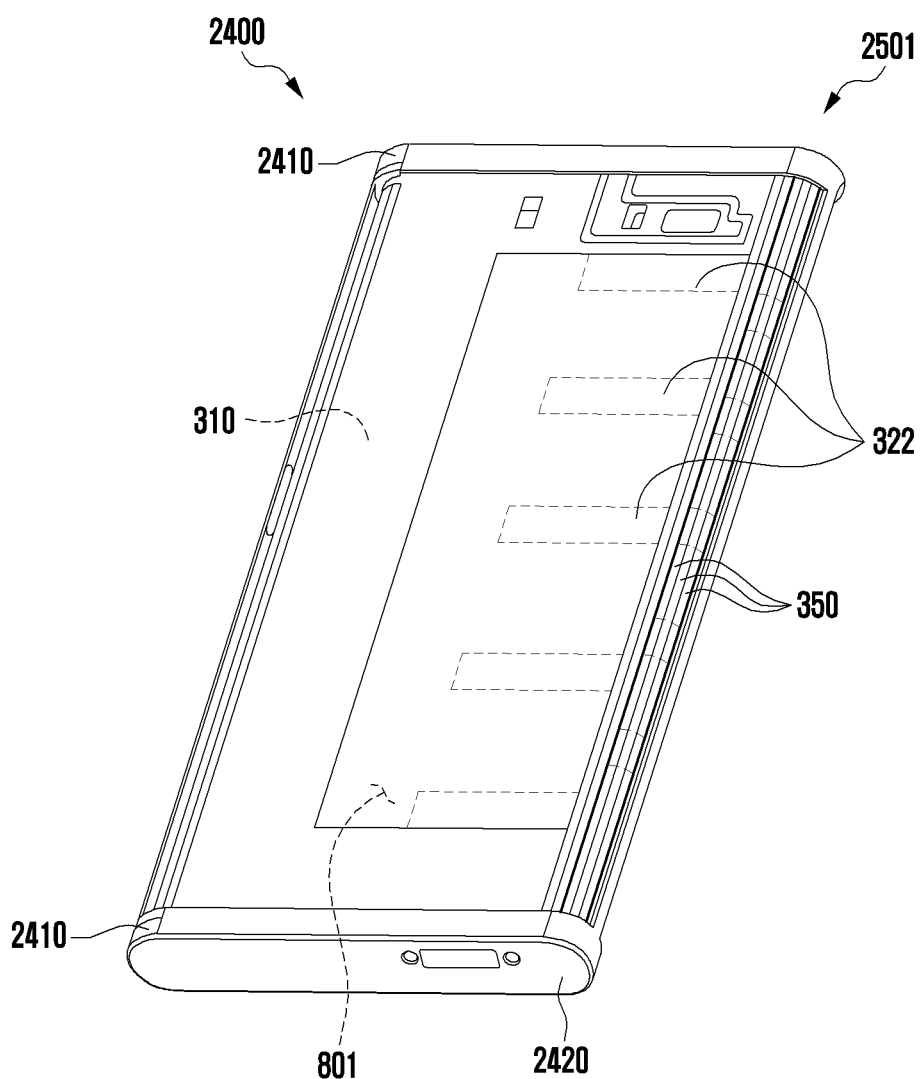
FIG. 25 is a perspective view illustrating a display support member in the first state of the electronic device, illustrated in FIG. 24 according to various embodiments.

FIG. 25 is a perspective view illustrating a display support member in the first state of the electronic device 2400, illustrated in FIG. 24 according to various embodiments.

Figure 26:
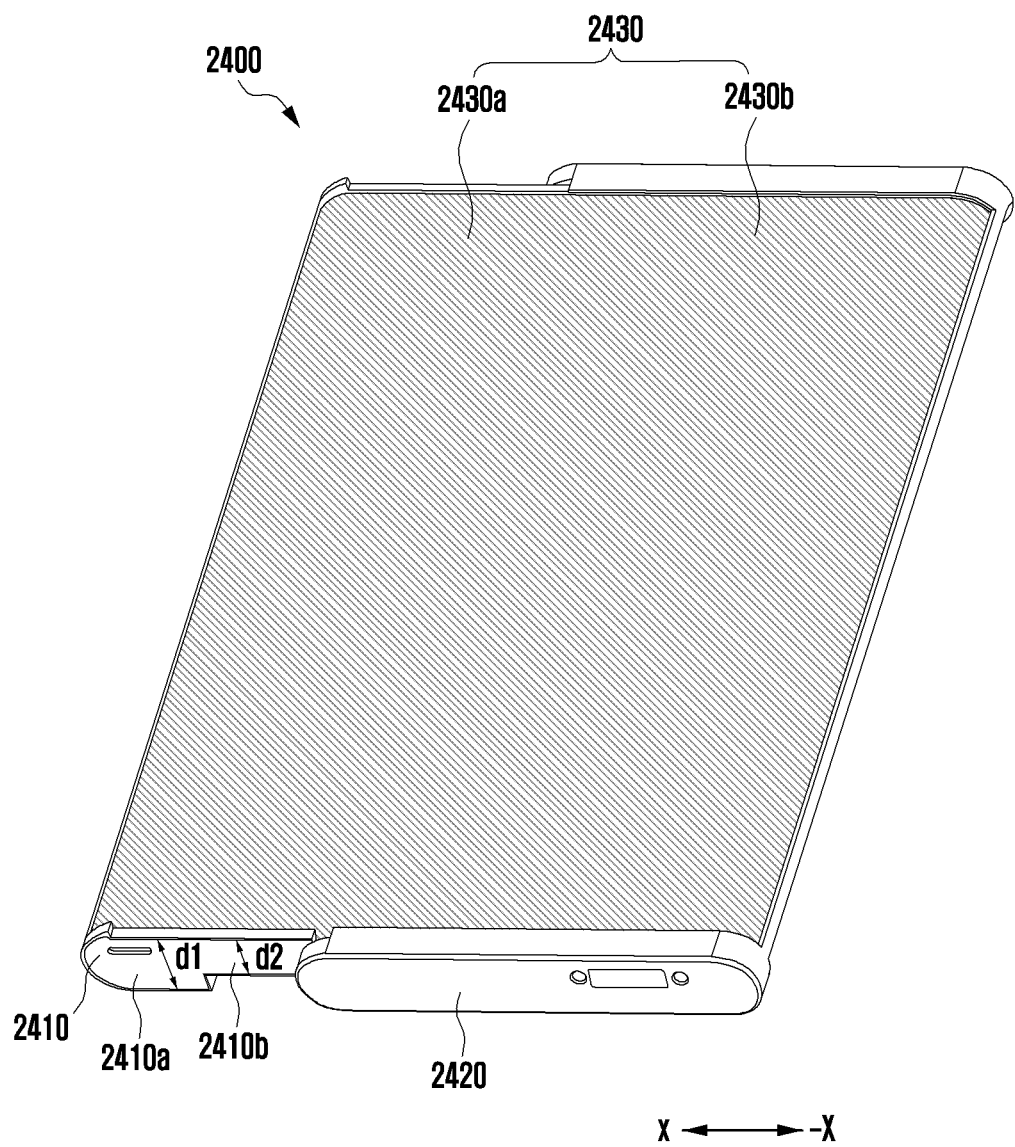
FIG. 26 is a diagram illustrating a second state of an electronic device according to various embodiments.

FIG. 26 is a perspective view illustrating a second state of the electronic device 2400 according to various embodiments.

Figure 27:
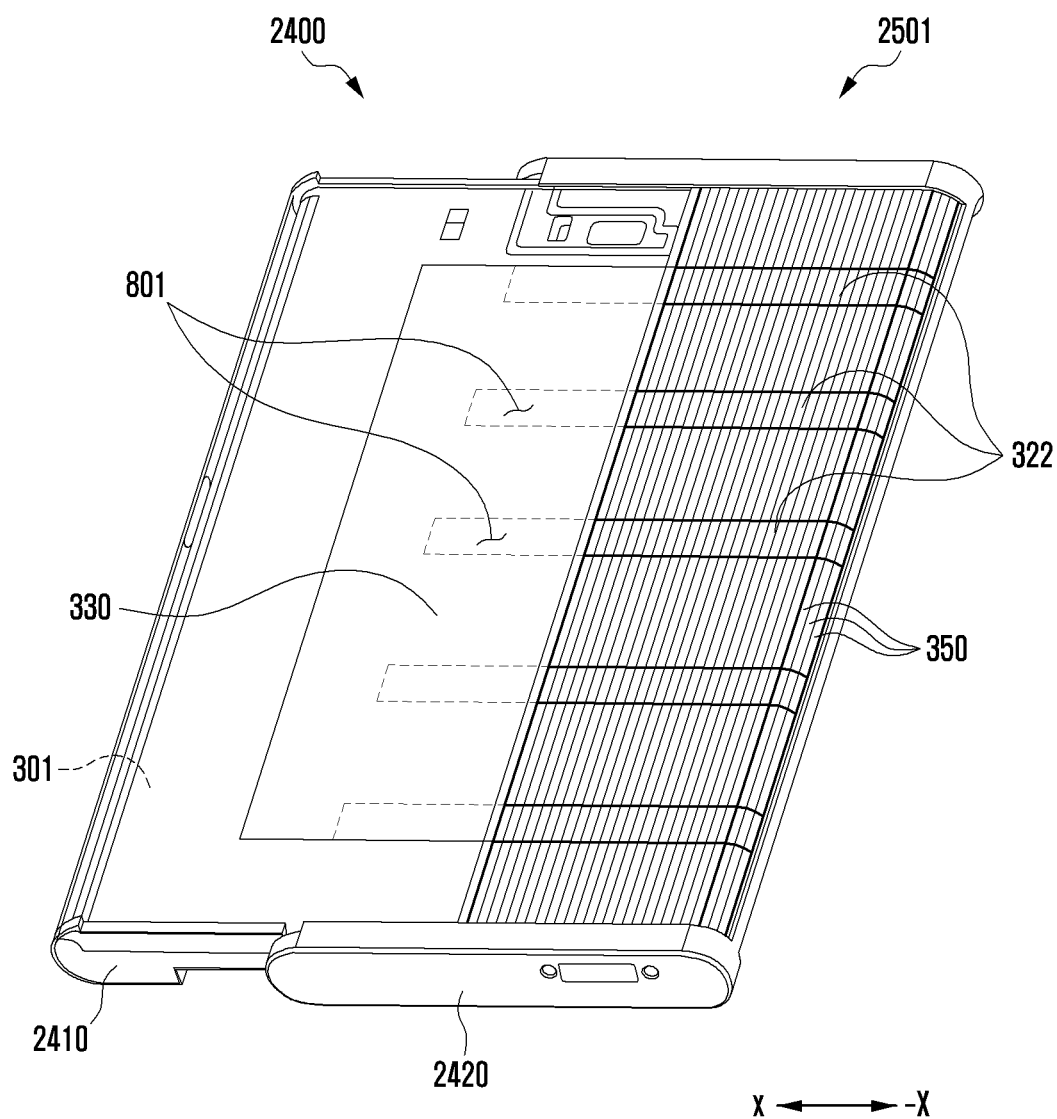
FIG. 27 is a perspective view illustrating a display support member in the second state of the electronic device, illustrated in FIG. 26 according to various embodiments.

FIG. 27 is a perspective view illustrating the display support member in the second state of the electronic device 2400, illustrated in FIG. 26 according to various embodiments.

Figure 28:
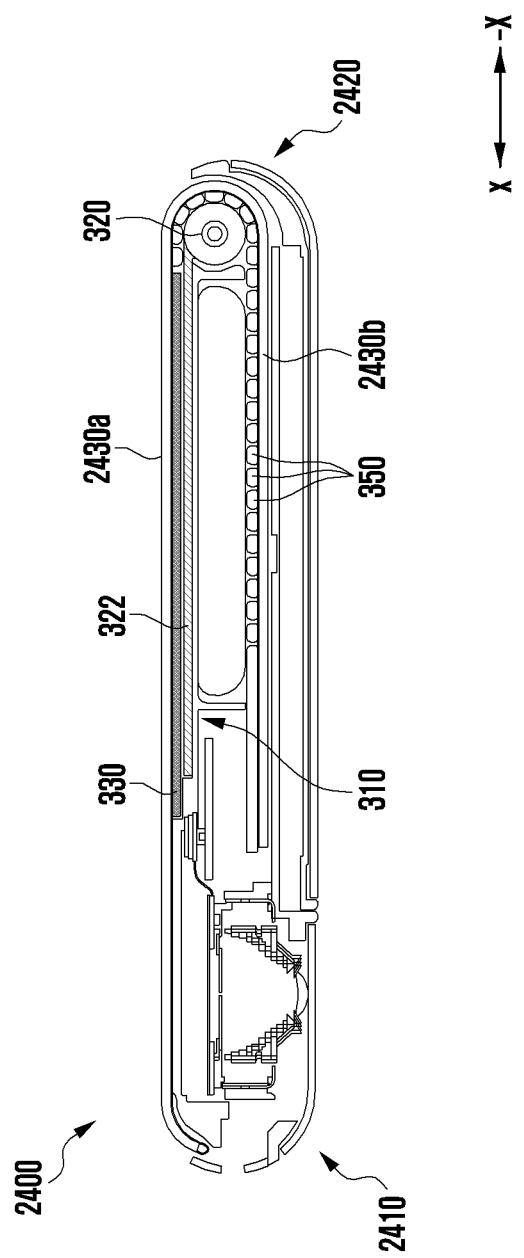
FIG. 28 is a cross-sectional view illustrating the first state of the electronic device illustrated in FIG. 24 according to various embodiments.

FIG. 28 is a cross-sectional view showing the first state of the electronic device 2400, illustrated in FIG. 24 according to various embodiments.

Figure 29:
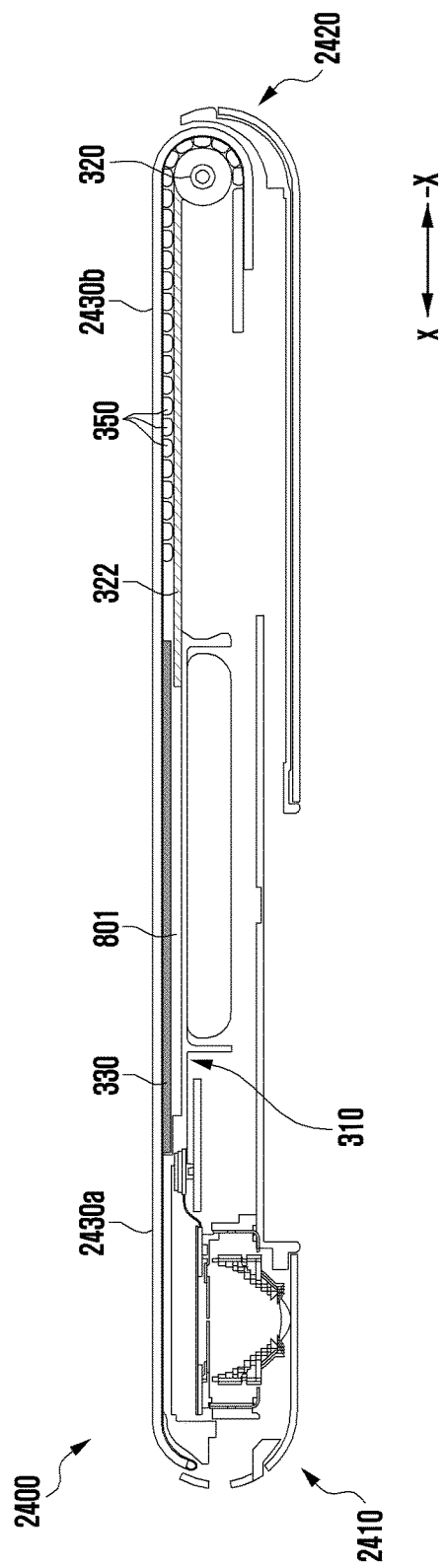
FIG. 29 is a cross-sectional view illustrating the second state of the electronic device illustrated in FIG. 26 according to various embodiments.

FIG. 29 is a cross-sectional view illustrating the second state of the electronic device 2400, illustrated in FIG. 26 according to various embodiments.

The electronic device 2400 illustrated in FIGS. 24, 25, 26, 27, 28 and 29 may include an embodiment which is at least partially similar to or different from that of the electronic device 100 or a component (or instrument) of the electronic device 100, illustrated in FIGS. 1 to 15. Hereinafter, an embodiment in relation to FIGS. 24, 25, 26, 27, 28 and 29, will be described.

Referring to FIGS. 24 to 29, the electronic device 2400 according to an embodiment may include a first housing 2410 and a second housing 2420.

According to an embodiment, in the second state, the first housing 2410 may slide in a first direction (x direction) from the second housing 2420, and, in the first state, may slide in a second direction (−x direction) opposite to the first direction (x direction) so as to be coupled to the second housing 2420.

According to an embodiment, in the first state, the first housing 2410 is inserted into the inner space of the second housing 2420, and thus only one side member of the first housing 2410 may be visible to the outside. According to an embodiment, the first housing 2410 may include a first side member 2410a and a second side member 2410b, which slide, in the first state, into the inner space of the second housing 2420 so as not to be visible to the outside and slide, in the second state, out of the inner space of the second housing 2420 so as to be visible to the outside.

According to an embodiment, the first side member 2410a may have a first thickness (d1), and the second side member 2410b may have a second thickness (d2) that is less than the first thickness (d1). According to an embodiment, the second side member 2410b may be disposed to be closer to the second housing 2420 than the first side member 2410a is. For example, when the electronic device switches the second state to the first state, the second side member 2410b may slide into the inner space of the second housing 2420 first, and then the first side member 2410a may slide into the inner space of the second housing 2420.

According to an embodiment, the electronic device 2400 may include a rollable display 2430, the display area of which varies depending on the movement of the first housing 2410. The rollable display 2430 may include: a first portion 2430a always visible to the outside in the first state and the second state; and a second portion 2430b which is visible to the outside in the second state and the movement of which is guided by a bendable member 350. For example, the second portion 2430b may be supported by the bendable member 350 in the second state.

Referring to FIGS. 25 and 27, the electronic device 2400 according to an embodiment may include a display support member 2501 configured to support the rollable display. According to an embodiment, the display support member 2501 illustrated in FIGS. 25 and 27 may include an embodiment which is substantially identical or similar to that of the display support member 401 described with reference to FIGS. 5, 6A and 6B.

According to an embodiment, the display support member 2501 may include a bracket 310 (e.g., the bracket 310 in FIG. 6A), a support plate 330 (e.g., the support plate 330 in FIG. 6A), a sliding support 320 (e.g., the sliding support 320 in FIG. 6A) including multiple sliding bars 322 (e.g., the sliding bars 322 in FIG. 6A), or the bendable member 350 (e.g., the bendable member 350 in FIG. 6A).

According to an embodiment, the bracket 310 may be disposed in the first housing 2410, and may include a recess which provides a space 801 in which the sliding support 320 can slide.

According to an embodiment, the support plate 330 may be disposed above the space 801 formed by the recess of the bracket 310. According to an embodiment, the support plate 330 may play the role of supporting the first portion 2430a of the rollable display 2430 in the first state and the second state. For example, the structure or shape of the support plate 330 may be substantially identical to or at least partially similar to the structure or shape of the support plate 330, described with reference to FIGS. 4, 5, 6A and 6B. Although not illustrated, the seated structure of the support plate 330 may be substantially identical to or at least partially similar to the seated structure of the support plate 330, described with reference to FIGS. 4 to 6B.

According to an embodiment, as illustrated in FIG. 28, the sliding support 320 may include the multiple sliding bars 322 which are inserted into the recess in the first state. For example, the multiple sliding bars 322 may be inserted into the bracket 310 through the recess positioned below the support plate 330.

According to an embodiment, as illustrated in FIG. 29, in the second state, the multiple sliding bars 322 may slide out of the recess. According to an embodiment, in the second state, the multiple sliding bars 322 may support the bendable member 350, thereby supporting the second portion 2430b of the rollable display 2430.

According to an embodiment, in the second state, at least a portion of the first portion 2430a of the rollable display 2430 may be supported by the support plate 330. For example, in the second state, the space 801 formed by the recess is empty because the multiple sliding bars 322 are drawn out therefrom, but the support plate 330, above the empty space 801, may support the first portion 2430a of the rollable display 2430, thereby providing a strengthened support structure for the rollable display 2430.

An electronic device (e.g., an electronic device 3000 in FIG. 30) according to various example embodiments may include: a first housing (e.g., a first housing 3010 in FIG. 30); a second housing (e.g., a sliding plate 3020 in FIG. 30) configured to slide in a first direction from the first housing in a second state and, in a first state, is configured to slide in a second direction opposite to the first direction to be coupled to the first housing; a rollable display (e.g., the rollable display 3030 in FIG. 30) having a display area varying depending on sliding of the second housing, the rollable display including a first portion, which, in the first state and the second state, is supported by the second housing and is visible to the outside, and a second portion which, in the second state, is visible to the outside, is configured to slide out of the first housing, and is supported by a bendable support (e.g., a bendable member 350 in FIG. 36); a bracket (e.g., a bracket 310 in FIG. 32) positioned in the first housing and including a recess providing a space (e.g., a space 801 in FIG. 32) in which at least one elastic structure including a material configured to provide elastic force and (e.g., an elastic structure 3111 in FIG. 32) configured to guide sliding of the second housing; and a support plate (e.g., a support plate 330 in FIG. 34) disposed between the first portion and the space in the second state, and, in the second state, is configured to support the bendable support to support the second portion.

Figure 30:
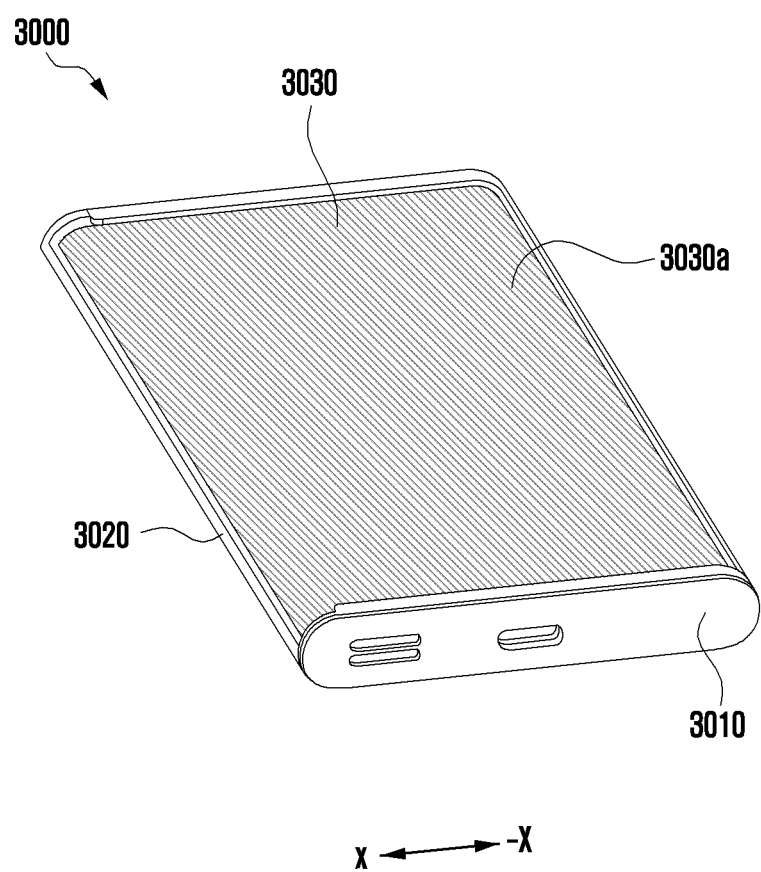
FIG. 30 is a diagram illustrating a first state of an electronic device according to various embodiments.

FIG. 30 is a perspective view illustrating a first state of an electronic device 3000 according to various embodiments.

Figure 31:
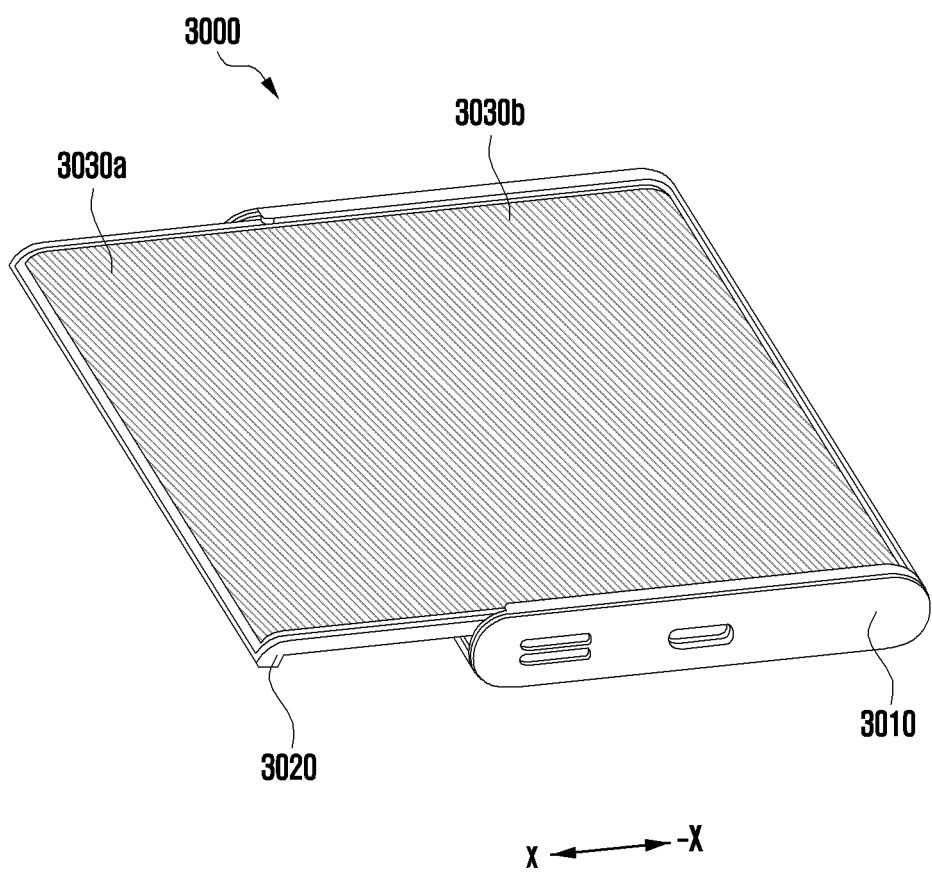
FIG. 31 is a diagram illustrating a second state of an electronic device according to various embodiments.

FIG. 31 illustrates a second state of the electronic device 3000 according to an embodiment.

Figure 32:
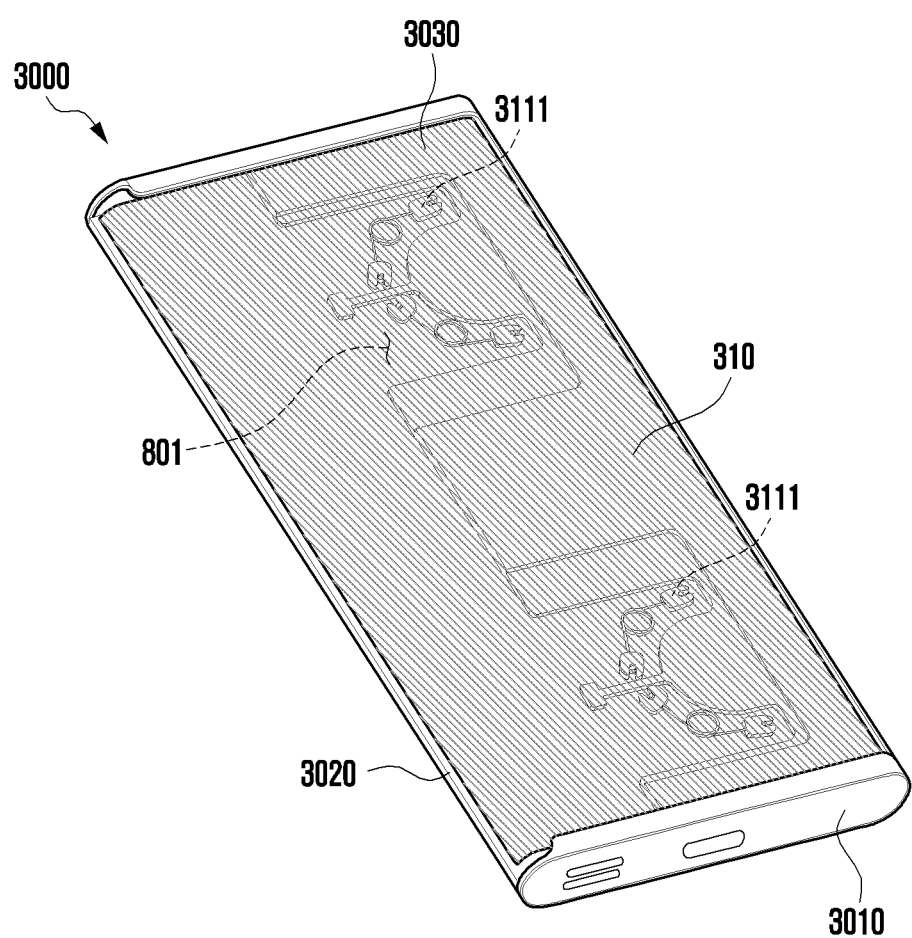
FIG. 32 is a perspective view illustrating a bracket and an elastic structure, which are placed in a housing, in the first state of the electronic device illustrated in FIG. 30 according to various embodiments.

FIG. 32 is a perspective view illustrating a bracket 310 and an elastic structure, which are placed in a housing, in the first state of the electronic device 3000, illustrated in FIG. 30 according to various embodiments.

Figure 33:
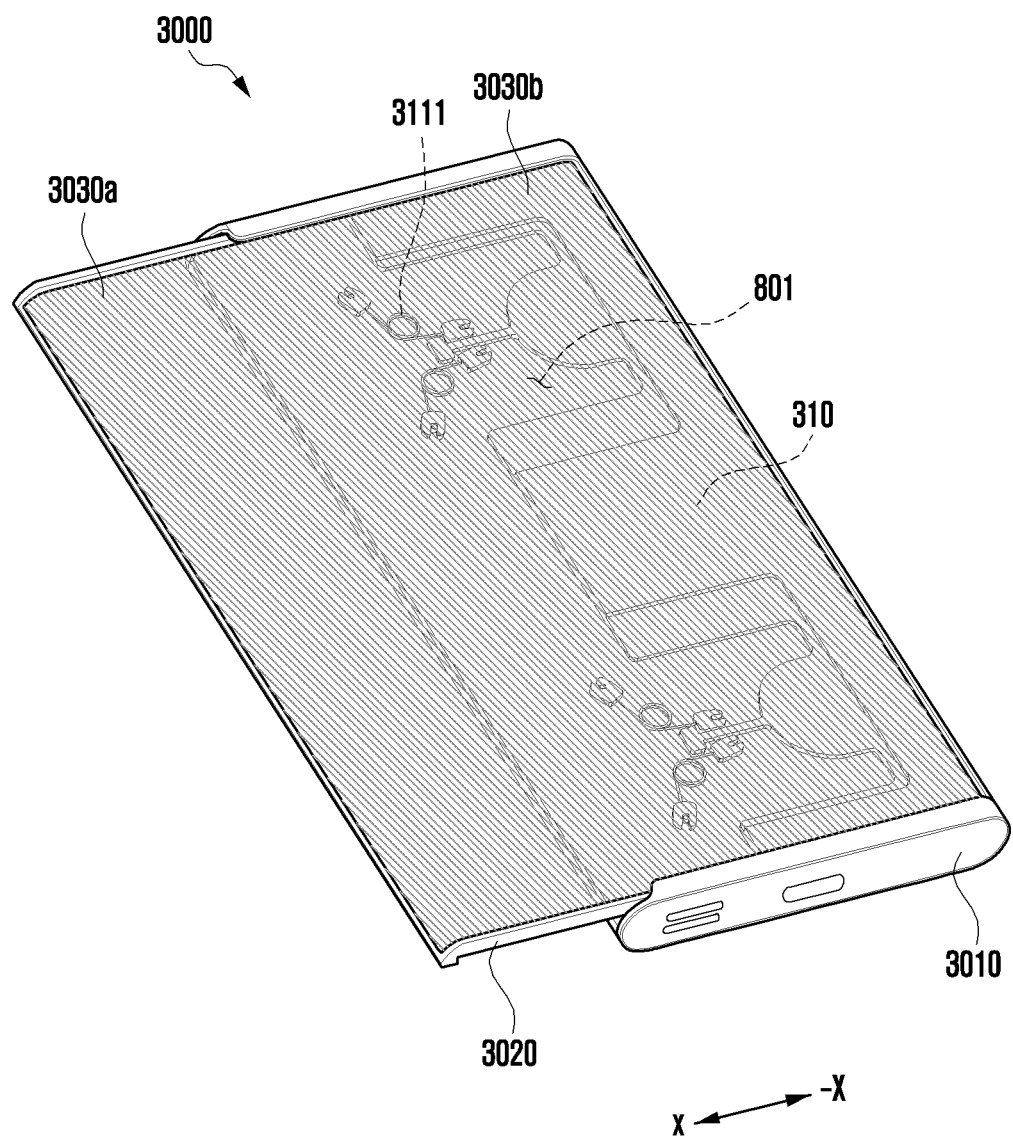
FIG. 33 is a perspective view illustrating a bracket and an elastic structure, which are placed in a housing, in the second state of the electronic device illustrated in FIG. 31 according to various embodiments.

FIG. 33 is a perspective view illustrating the bracket 310 and the elastic structure, which are placed in the housing, in the second state of the electronic device 3000, illustrated in FIG. 31 according to various embodiments.

Figure 34:
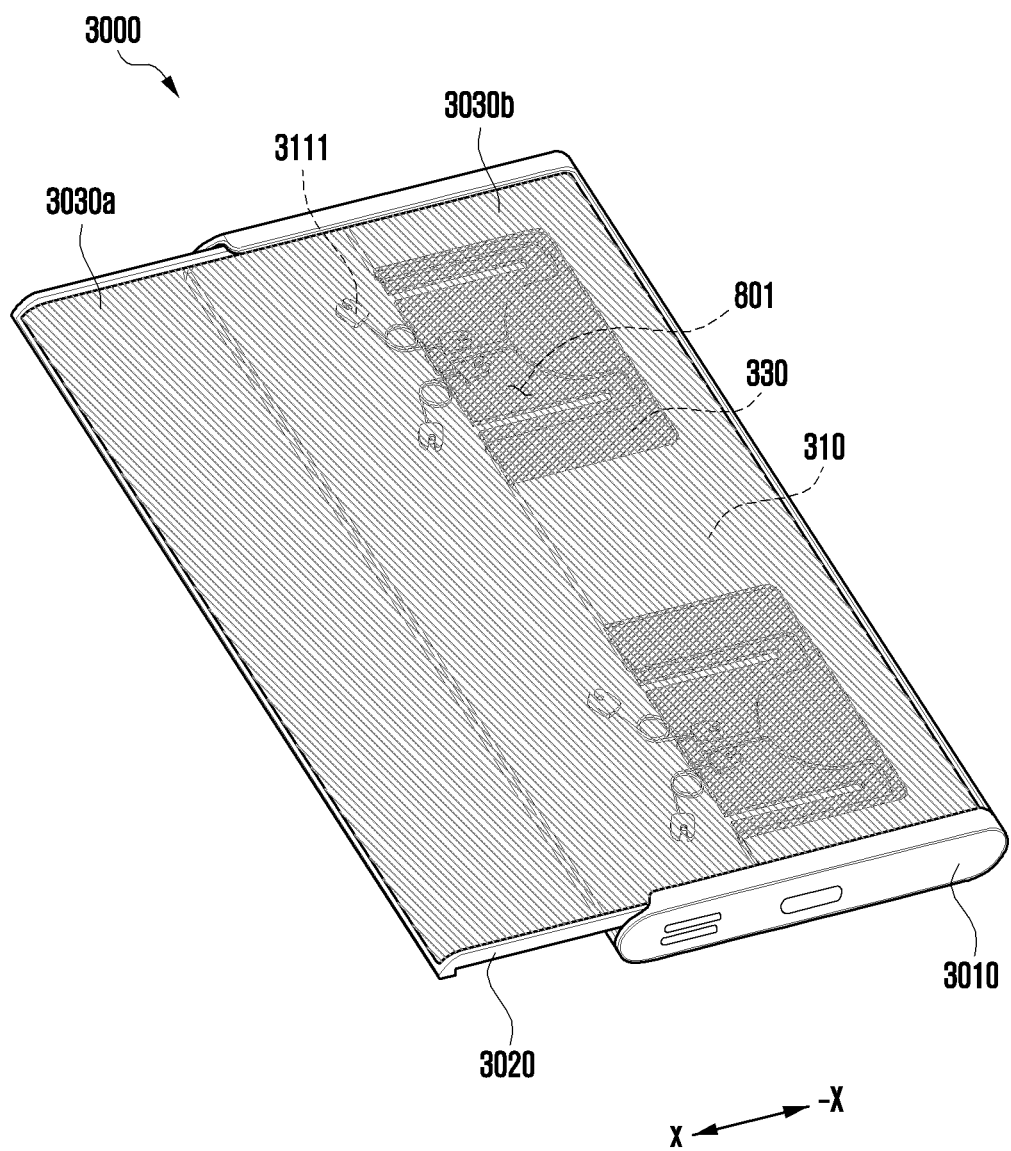
FIG. 34 is a perspective view illustrating a display support member in the second state of the electronic device illustrated in FIG. 31 according to various embodiments.

FIG. 34 is a perspective view illustrating a display support member in the second state of the electronic device 3000, illustrated in FIG. 31 according to various embodiments.

Figure 35:
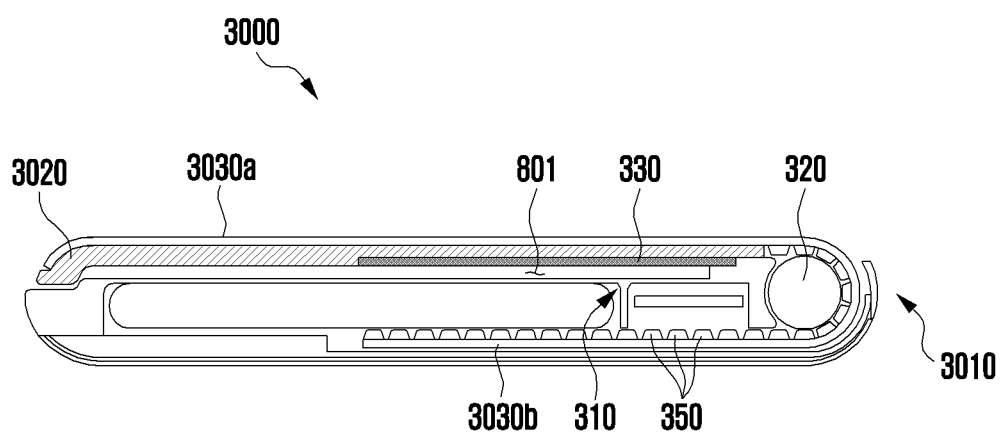
FIG. 35 is a cross-sectional view illustrating the first state of the electronic device illustrated in FIG. 30 according to various embodiments.

FIG. 35 is a cross-sectional view illustrating the first state of the electronic device 3000, illustrated in FIG. 30 according to various embodiments.

Figure 36:
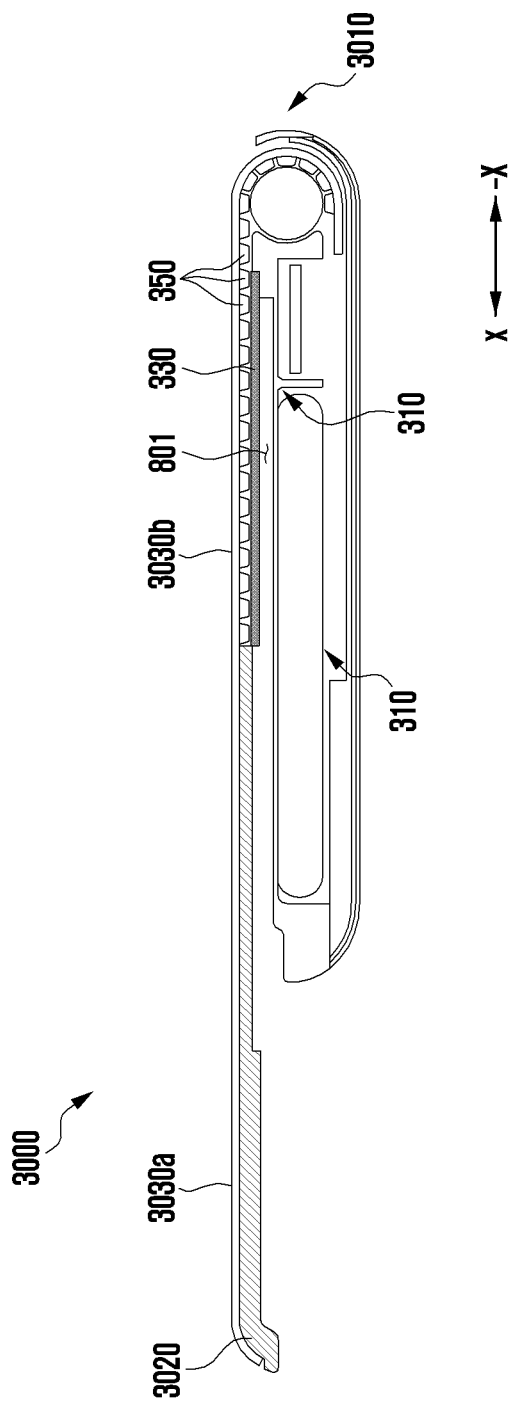
FIG. 36 is a cross-sectional view illustrating the second state of the electronic device illustrated in FIG. 31 according to various embodiments.

FIG. 36 is a cross-sectional view illustrating the second state of the electronic device 3000, illustrated in FIG. 31 according to various embodiments.

The electronic device 3000 illustrated in FIGS. 30, 31, 32, 33, 34, 35 and 36 may include an embodiment which is at least partially similar to or different from that of the electronic device 100 or a component (or instrument) of the electronic device 100, illustrated in FIGS. 1 to 15. Hereinafter, a description in relation to FIGS. 30, 31, 32, 33, 34, 35 and 36, will be described.

Referring to FIGS. 30 and 31, the electronic device 3000 according to an embodiment may include a first housing 3010 and a sliding plate 3020.

According to an embodiment, the sliding plate 3020 may slide, in the second state, in a first direction (x direction) from the first housing 3010, and in the first state, may slide in a second direction (−x direction) opposite to the first direction (x direction) to be coupled to the first housing 3010. According to various embodiments of the disclosure, the sliding plate 3020 may be referred to as a "second housing 3020".

According to an embodiment, in the first state, the sliding plate 3020 is inserted into the inner space of the first housing 3010, and thus only a portion of the sliding plate 3020 (e.g., the end of the sliding plate 3020 positioned in the first direction (x direction)) may be visible to the outside.

According to an embodiment, the electronic device 3000 may include a rollable display 3030, the display area of which varies depending on the movement of the sliding plate 3020. The rollable display 3030 may include: a first portion 3030a, which is always visually exposed to the outside in the first state and the second state; and a second portion 3030b, which is visible to the outside in the second state and the movement of which is guided by a bendable member 350.

According to an embodiment, the first portion 3030a of the rollable display 3030 may be supported by the sliding plate 3020, and the second portion 3030b of the rollable display 3030 may be supported by the bendable member 350 which moves to the top of the bracket 310 (e.g., the top of the support plate 330) according to sliding of the sliding plate 3020. For example, in the first state and the second state, the first portion 3030a may be supported by the sliding plate 3020. For example, in the second state, the second portion 3030b may be drawn out of the inner space of the first housing 3010 and supported by the support plate 330 placed on the top surface of the bracket 310 in a position corresponding to the first housing 3010.

Referring to FIGS. 32 and 33, the electronic device 3000 according to an embodiment may include a sliding structure for supporting (guiding) the movement of the sliding plate 3020. For example, the sliding structure may include at least one elastic structure 3111. According to an embodiment, the elastic structure 3111 may provide elasticity such that when the sliding plate 3020 moves a designated distance by external force, the electronic device is capable of switching from the first state to the second state without any further external force. According to an embodiment, the elastic structure 3111 may provide elasticity such that, when the sliding plate 3020 moves a designated distance by external force, the electronic device is capable of switching from the second state to the first state without any further external force. According to an embodiment, the at least one elastic structure 3111 may include various elastic members such as a torsion spring.

According to an embodiment, the bracket 310 may be disposed in the first housing 3010 of the electronic device 3000. The bracket 310 may include a recess providing a space 801 in which the elastic structure 3111 (e.g., the torsion spring) can move. For example, the at least one elastic structure may support (guide) the movement of the sliding plate 3020 by moving along the space 801 formed by the recess.

Referring to FIGS. 34, 35 and 36, the electronic device 3000 according to an embodiment may include a support plate 330 as a part of a display support member 3101. According to an embodiment, the support plate 330 may be disposed in the space 801 which is formed by the recess and in which the elastic structure 3111 moves. According to an embodiment, the support plate 330 may play the role of supporting a portion of the first portion 3030a of the rollable display 3030 in the first state and supporting a portion of the second portion 3030b of the rollable display 3030 in the second state. For example, in the second state, the space 801 formed by the recess is empty because the elastic structure 3111 is drawn out of the recess, but the support plate 330 may support, on the empty space 801, the second portion 3030b of the rollable display 3030, thereby providing a strengthened support structure for the rollable display 3030.

The electronic device 3000 according to an embodiment may include the display support member 3101 configured to support the rollable display 3030. The display support member 3101 may include an embodiment which is substantially identical or similar to that of the display support member 401 described with reference to FIGS. 5, 6A and 6B.

According to an embodiment, the display support member 3101 may include the bracket 310 (e.g., the bracket 310 in the FIG. 6A), the support plate 330 (e.g., the support plate 330 in the FIG. 6A), a sliding support 320 (e.g., the sliding support 320 in FIG. 6A), or the bendable member 350 (e.g., the bendable member 350 in FIG. 6A), and the elements may support the rollable display 3030 together with the sliding plate 3020.

According to an embodiment, the bracket 310 may be disposed in the first housing 3010, and may include the recess providing the space 801 in which the at least one elastic structure 3111 can move.

According to an embodiment, the support plate 330 may be disposed above the space 801 formed by the recess of the bracket 310. According to an embodiment, the support plate 330 may support a portion of the first portion 3030a in the first state and support the bendable member 350 in the second state, thereby supporting at least a portion of the second portion 3030b, which has slid out.

According to an embodiment, the structure or shape of the support plate 330 may be substantially identical to or at least partially similar to the structure or shape of the support plate 330, described with reference to FIGS. 4, 5, 6A and 6B. Although not illustrated, the seated structure of the support plate 330 may be substantially identical to or at least partially similar to the seated structure of the support plate 330, described with reference to FIGS. 4, 5, 6A and 6B.

Figure 37:
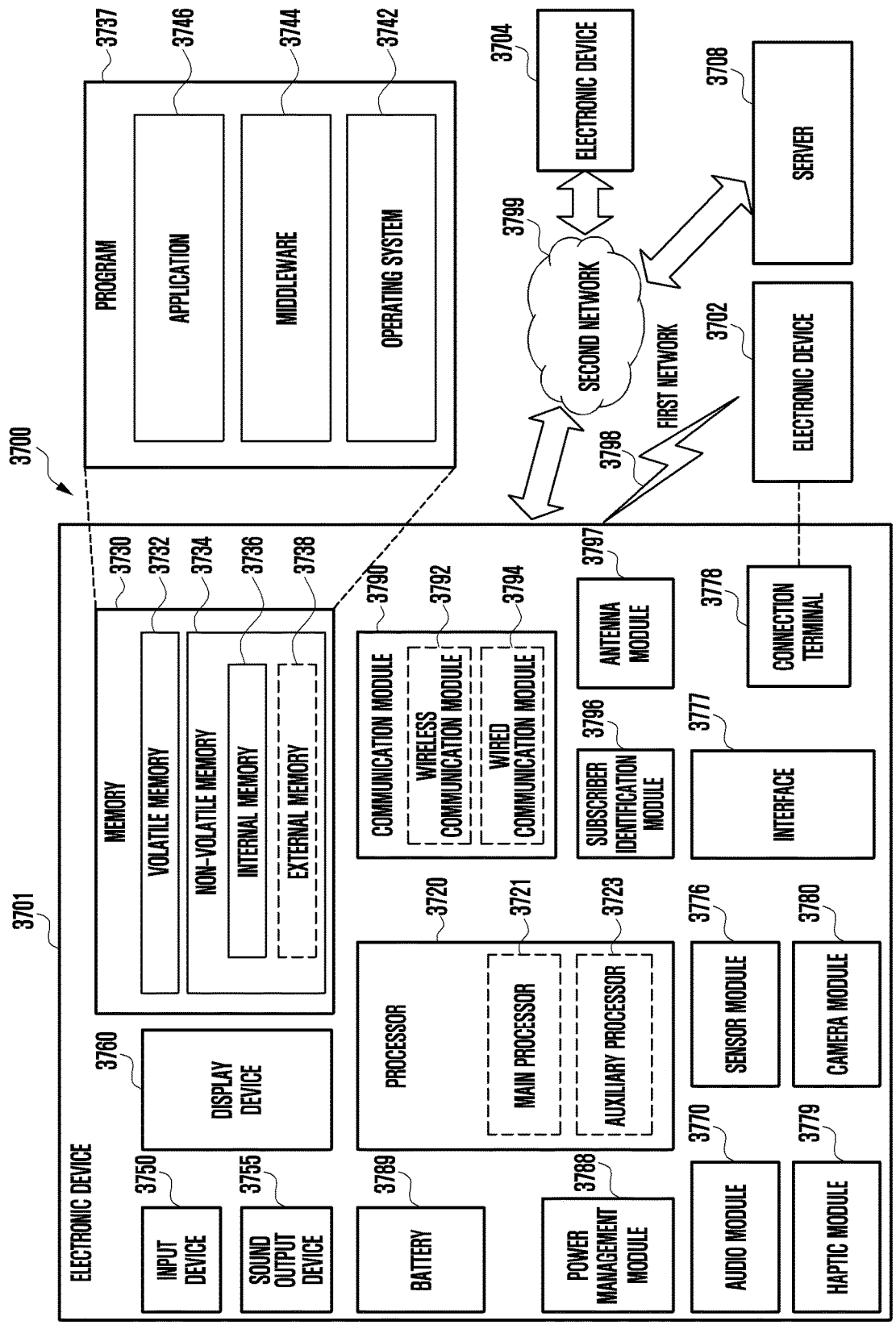
FIG. 37 is a block diagram illustrating an electronic device in a network environment according to various embodiments.

FIG. 37 is a block diagram illustrating an electronic device 3701 in a network environment 3700 according to various embodiments. Referring to FIG. 37, the electronic device 3701 in the network environment 3700 may communicate with an electronic device 3702 via a first network 3798 (e.g., a short-range wireless communication network), or at least one of an electronic device 3704 or a server 3708 via a second network 3799 (e.g., a long-range wireless communication network). According to an embodiment, the electronic device 3701 may communicate with the electronic device 3704 via the server 3708. According to an embodiment, the electronic device 3701 may include a processor 3720, memory 3730, an input module 3750, a sound output module 3755, a display module 3760, an audio module 3770, a sensor module 3776, an interface 3777, a connecting terminal 3778, a haptic module 3779, a camera module 3780, a power management module 3788, a battery 3789, a communication module 3790, a subscriber identification module (SIM) 3796, or an antenna module 3797. In some embodiments, at least one of the components (e.g., the connecting terminal 3778) may be omitted from the electronic device 3701, or one or more other components may be added in the electronic device 3701. In some embodiments, some of the components (e.g., the sensor module 3776, the camera module 3780, or the antenna module 3797) may be implemented as a single component (e.g., the display module 3760).

The processor 3720 may execute, for example, software (e.g., a program 3740) to control at least one other component (e.g., a hardware or software component) of the electronic device 3701 coupled with the processor 3720, and may perform various data processing or computation. According to an embodiment, as at least part of the data processing or computation, the processor 3720 may store a command or data received from another component (e.g., the sensor module 3776 or the communication module 3790) in volatile memory 3732, process the command or the data stored in the volatile memory 3732, and store resulting data in non-volatile memory 3734. According to an embodiment, the processor 3720 may include a main processor 3721 (e.g., a central processing unit (CPU) or an application processor (AP)), or an auxiliary processor 3723 (e.g., a graphics processing unit (GPU), a neural processing unit (NPU), an image signal processor (ISP), a sensor hub processor, or a communication processor (CP)) that is operable independently from, or in conjunction with, the main processor 3721. For example, when the electronic device 3701 includes the main processor 3721 and the auxiliary processor 3723, the auxiliary processor 3723 may be adapted to consume less power than the main processor 3721, or to be specific to a specified function. The auxiliary processor 3723 may be implemented as separate from, or as part of the main processor 3721.

The auxiliary processor 3723 may control at least some of functions or states related to at least one component (e.g., the display module 3760, the sensor module 3776, or the communication module 3790) among the components of the electronic device 3701, instead of the main processor 3721 while the main processor 3721 is in an inactive (e.g., sleep) state, or together with the main processor 3721 while the main processor 3721 is in an active state (e.g., executing an application). According to an embodiment, the auxiliary processor 3723 (e.g., an image signal processor or a communication processor) may be implemented as part of another component (e.g., the camera module 3780 or the communication module 3790) functionally related to the auxiliary processor 3723. According to an embodiment, the auxiliary processor 3723 (e.g., the neural processing unit) may include a hardware structure specified for artificial intelligence model processing. An artificial intelligence model may be generated by machine learning. Such learning may be performed, e.g., by the electronic device 3701 where the artificial intelligence is performed or via a separate server (e.g., the server 3708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 3730 may store various data used by at least one component (e.g., the processor 3720 or the sensor module 3776) of the electronic device 3701. The various data may include, for example, software (e.g., the program 3740) and input data or output data for a command related thereto. The memory 3730 may include the volatile memory 3732 or the non-volatile memory 3734.

The program 3740 may be stored in the memory 3730 as software, and may include, for example, an operating system (OS) 3742, middleware 3744, or an application 3746.

The input module 3750 may receive a command or data to be used by another component (e.g., the processor 3720) of the electronic device 3701, from the outside (e.g., a user) of the electronic device 3701. The input module 3750 may include, for example, a microphone, a mouse, a keyboard, a key (e.g., a button), or a digital pen (e.g., a stylus pen).

The sound output module 3755 may output sound signals to the outside of the electronic device 3701. The sound output module 3755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 3760 may visually provide information to the outside (e.g., a user) of the electronic device 3701. The display module 3760 may include, for example, a display, a hologram device, or a projector and control circuitry to control a corresponding one of the display, hologram device, and projector. According to an embodiment, the display module 3760 may include a touch sensor adapted to detect a touch, or a pressure sensor adapted to measure the intensity of force incurred by the touch.

The audio module 3770 may convert a sound into an electrical signal and vice versa. According to an embodiment, the audio module 3770 may obtain the sound via the input module 3750, or output the sound via the sound output module 3755 or a headphone of an external electronic device (e.g., an electronic device 3702) directly (e.g., wiredly) or wirelessly coupled with the electronic device 3701.

The sensor module 3776 may detect an operational state (e.g., power or temperature) of the electronic device 3701 or an environmental state (e.g., a state of a user) external to the electronic device 3701, and then generate an electrical signal or data value corresponding to the detected state. According to an embodiment, the sensor module 3776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3777 may support one or more specified protocols to be used for the electronic device 3701 to be coupled with the external electronic device (e.g., the electronic device 3702) directly (e.g., wiredly) or wirelessly. According to an embodiment, the interface 3777 may include, for example, a high definition multimedia interface (HDMI), a universal serial bus (USB) interface, a secure digital (SD) card interface, or an audio interface.

A connecting terminal 3778 may include a connector via which the electronic device 3701 may be physically connected with the external electronic device (e.g., the electronic device 3702). According to an embodiment, the connecting terminal 3778 may include, for example, a HDMI connector, a USB connector, a SD card connector, or an audio connector (e.g., a headphone connector).

The haptic module 3779 may convert an electrical signal into a mechanical stimulus (e.g., a vibration or a movement) or electrical stimulus which may be recognized by a user via his tactile sensation or kinesthetic sensation. According to an embodiment, the haptic module 3779 may include, for example, a motor, a piezoelectric element, or an electric stimulator.

The camera module 3780 may capture a still image or moving images. According to an embodiment, the camera module 3780 may include one or more lenses, image sensors, image signal processors, or flashes.

The power management module 3788 may manage power supplied to the electronic device 3701. According to an embodiment, the power management module 3788 may be implemented as at least part of, for example, a power management integrated circuit (PMIC).

The battery 3789 may supply power to at least one component of the electronic device 3701. According to an embodiment, the battery 3789 may include, for example, a primary cell which is not rechargeable, a secondary cell which is rechargeable, or a fuel cell.

The communication module 3790 may support establishing a direct (e.g., wired) communication channel or a wireless communication channel between the electronic device 3701 and the external electronic device (e.g., the electronic device 3702, the electronic device 3704, or the server 3708) and performing communication via the established communication channel. The communication module 3790 may include one or more communication processors that are operable independently from the processor 3720 (e.g., the application processor (AP)) and supports a direct (e.g., wired) communication or a wireless communication. According to an embodiment, the communication module 3790 may include a wireless communication module 3792 (e.g., a cellular communication module, a short-range wireless communication module, or a global navigation satellite system (GNSS) communication module) or a wired communication module 3794 (e.g., a local area network (LAN) communication module or a power line communication (PLC) module). A corresponding one of these communication modules may communicate with the external electronic device via the first network 3798 (e.g., a short-range communication network, such as Bluetooth™, wireless-fidelity (Wi-Fi) direct, or infrared data association (IrDA)) or the second network 3799 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 3792 may identify and authenticate the electronic device 3701 in a communication network, such as the first network 3798 or the second network 3799, using subscriber information (e.g., international mobile subscriber identity (IMSI)) stored in the subscriber identification module 3796.

The wireless communication module 3792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 3792 may support a high-frequency band (e.g., the mmWave band) to achieve, e.g., a high data transmission rate. The wireless communication module 3792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 3792 may support various requirements specified in the electronic device 3701, an external electronic device (e.g., the electronic device 3704), or a network system (e.g., the second network 3799). According to an embodiment, the wireless communication module 3792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 3797 may transmit or receive a signal or power to or from the outside (e.g., the external electronic device) of the electronic device 3701. According to an embodiment, the antenna module 3797 may include an antenna including a radiating element including a conductive material or a conductive pattern formed in or on a substrate (e.g., a printed circuit board (PCB)). According to an embodiment, the antenna module 3797 may include a plurality of antennas (e.g., array antennas). In such a case, at least one antenna appropriate for a communication scheme used in the communication network, such as the first network 3798 or the second network 3799, may be selected, for example, by the communication module 3790 (e.g., the wireless communication module 3792) from the plurality of antennas. The signal or the power may then be transmitted or received between the communication module 3790 and the external electronic device via the selected at least one antenna. According to an embodiment, another component (e.g., a radio frequency integrated circuit (RFIC)) other than the radiating element may be additionally formed as part of the antenna module 3797.

According to various embodiments, the antenna module 3797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 3701 and the external electronic device 3704 via the server 3708 coupled with the second network 3799. Each of the electronic devices 3702 or 3704 may be a device of a same type as, or a different type, from the electronic device 3701.

According to an embodiment, all or some of operations to be executed at the electronic device 3701 may be executed at one or more of the external electronic devices 3702, 3704, or 3708. For example, if the electronic device 3701 should perform a function or a service automatically, or in response to a request from a user or another device, the electronic device 3701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 3701. The electronic device 3701 may provide the outcome, with or without further processing of the outcome, as at least part of a reply to the request. To that end, a cloud computing, distributed computing, mobile edge computing (MEC), or client-server computing technology may be used, for example. The electronic device 3701 may provide ultra low-latency services using, e.g., distributed computing or mobile edge computing. In an embodiment, the external electronic device 3704 may include an internet-of-things (IoT) device. The server 3708 may be an intelligent server using machine learning and/or a neural network. According to an embodiment, the external electronic device 3704 or the server 3708 may be included in the second network 3799. The electronic device 3701 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 3740) including one or more instructions that are stored in a storage medium (e.g., internal memory 3736 or external memory 3738) that is readable by a machine (e.g., the electronic device 3701). For example, a processor (e.g., the processor 3720) of the machine (e.g., the electronic device 3701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first housing;

a second housing combined with at least the first housing and configured to form a first state by moving in a first direction with respect to the first housing and a second state by moving in a second direction;

a bendable support configured to be inserted into an inner space of the second housing when the second housing moves in the second direction and to be drawn out of the inner space when the second housing moves in the first direction;

a rollable display having a display area configured for varying depending on moving of the second housing, the rollable display comprising a first portion visible to the outside when the electronic device is in the first state and the second state, and a second portion visible to the outside when the electronic device is in the second state, movements of the second portion to be guided by the bendable support;

a sliding support configured to move based on movements of the second housing and to support the second portion by supporting the bendable support when the electronic device is in the second state;

a bracket comprising at least one recess providing a space for the movement of the sliding support;

a support plate disposed above the space to support the first portion, wherein the sliding support comprises:
multiple sliding bars, each of the sliding bars extending in the first direction and configured to be inserted into and/or drawn out of the at least one recess; and
a support bar configured to connect, at one end thereof, the multiple sliding bars to each other and extending in a third direction perpendicular to the first direction and configured for supporting rolling of the second portion of the display.

2. The electronic device of claim 1, wherein the bracket comprises:
a first surface facing the first portion of the rollable display and in which the at least one recess is disposed;
wherein the at least one recess includes a first recess formed in the first surface and in which the support plate is seated; and,
at least one second recess formed in the first recess and into or from which the sliding support is configured to be inserted or drawn.

3. The electronic device of claim 2, further comprising an adhesive member comprising an adhesive material configured to attach the support plate to the first recess.

4. The electronic device of claim 3, wherein the adhesive member comprises at least one slit formed in portions corresponding to the second recess.

5. The electronic device of claim 2, wherein the sliding support comprises:
multiple sliding configured to be inserted into or drawn out of the at least one second recess; and
wherein the multiple sliding bars are configured to support multiple hinge bars of the bendable support, arranged in the third direction.

6. The electronic device of claim 5, wherein a protrusion is provided on each end of each of the sliding bars.

7. The electronic device of claim 6, wherein the protrusion is configured to contact the second recess.

8. The electronic device of claim 6, wherein the second recess comprises a third recess disposed between ends of the second recess and having a height less than a height of the second recess.

9. The electronic device of claim 2, further comprising a cushion member at least partially surrounding an edge of the first recess adjacent to the first surface.

10. The electronic device of claim 9, wherein the cushion member is disposed between an edge of the support plate and a side wall formed between the first surface and the first recess.

11. The electronic device of claim 9, wherein the cushion member comprises a rubber or urethane material.

12. The electronic device of claim 1, wherein the second portion of the rollable display is configured to move into the first housing or the second housing based on guiding by the bendable support in the first state.

13. The electronic device of claim 5, wherein a step is formed between the first recess and the second recess, and a protrusion portion protruding toward a center of the second recess is formed on a side wall disposed at each of both sides of the second recess.

14. The electronic device of claim 13, wherein the side wall comprises: a first side wall extending from one side of the second recess; and a second side wall extending from another side of the second recess, and
wherein the protrusion portion comprises: a first protrusion portion protruding from the first side wall toward the center of the second recess; and a second protrusion portion protruding from the second side wall toward the center of the second recess.

15. The electronic device of claim 14, wherein an opening configured to visually expose at least a portion of the second recess is provided between the first protrusion portion and the second protrusion portion, and
wherein each of the sliding bars has a first width, the second recess has a second width greater than the first width, and the opening has a third width less than the first width.

16. The electronic device of claim 1, further comprising a cushion member at least partially surrounding an edge of the at least one recess adjacent to a first surface facing the first portion of the rollable display.

17. The electronic device of claim 9, wherein the bendable support comprises multiple hinge bars coupled to each other and arranged to a direction perpendicular to the first direction.

18. An electronic device comprising:
a first housing;
a second housing combined with the first housing and configured to form a first state by moving in a first direction with respect to the first housing and a second state by moving in a second direction;
a rollable display having a display area varying depending on moving of the second housing, the rollable display comprising a first portion visible to the outside when the electronic device is in the first state and the second state, and a second portion visible to the outside when the electronic device is in the second state, movements of the second portion to be guided by a bendable support;
a sliding support configured to move based on movements of the second housing and to support the second portion by supporting the bendable support when the electronic device is in the second state;
a bracket comprising at least one recess providing a space for the movement of the sliding support; and
a support plate disposed above the space to support the first portion,
wherein the bracket comprises:

a first surface facing the first portion of the rollable display and in which the at least one recess is disposed;

wherein the at least one recess includes a first recess formed in the first surface and in which the support plate is seated; and, at least one second recess formed in the first recess and into or from which the sliding support is configured to be inserted and/or drawn, wherein the sliding support comprises:

multiple sliding bars, each of the sliding bars extending in the first direction and configured to be inserted into and/or drawn out of the at least one recess; and a support bar configured to connect, at one end thereof, the multiple sliding bars to each other and extending in a third direction perpendicular to the first direction and for supporting rolling of the second portion of the display.

19. An electronic device comprising:

a first housing;

a second housing combined with the first housing and configured to form a first state by moving in a first direction with respect to the first housing and a second state by moving in a second direction;

a rollable display having a display area varying depending on moving of the second housing, the rollable display comprising a first portion visible to the outside when the electronic device is in the first state and the second state, and a second portion visible to the outside when the electronic device is in the second state, movements of the second portion to be guided by a bendable support;

a sliding support configured to move based on movements of the second housing and to support the second portion by supporting the bendable support when the electronic device is in the second state;

a bracket comprising at least one recess providing a space for the movement of the sliding support; and a support plate disposed above the space to support the first portion, wherein the bracket comprises:

a first surface facing the first portion of the rollable display and in which the at least one recess is disposed;

wherein the at least one recess includes a first recess formed in the first surface and in which the support plate is seated; and at least one second recess formed in the first recess and into or from which the sliding support is configured to be inserted and/or drawn, a cushion member at least partially surrounding an edge of the first recess adjacent to the first surface.

* * * * *